US006024791A

United States Patent [19]

Sonoda et al.

[11] Patent Number: 6,024,791

[45] **Date of Patent: *Feb. 15, 2000**

[54] MOLDED BODIES OF CEMENT TYPE ADMIXED AND KNEADED MATERIAL HAVING EXCELLENT BENDING STRENGTH AND COMPRESSION STRENGTH AND A METHOD OF MANUFACTURING THE SAME

[75] Inventors: Hiroki Sonoda; Kikuo Kaga, both of Tokyo; Tatsuo Nitta, Sagamihara; Masakazu Toyama, Yokohama; Seihachi Osawa, Musashimurayama; Kazumi Kato, Kumagaya, all of Japan

[73] Assignee: Mitomo Shoji Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/525,612

[22] PCT Filed: Mar. 25, 1994

[86] PCT No.: PCT/JP94/00479

§ 371 Date: Dec. 8, 1995

§ 102(e) Date: Dec. 8, 1995

[87] PCT Pub. No.: WO94/21570

PCT Pub. Date: Sep. 29, 1994

[30] Foreign Application Priority Data

| | | | |
|---|---|---|---|
| Mar. 25, 1993 | [JP] | Japan | 5-89535 |
| Jan. 31, 1994 | [JP] | Japan | 6-27465 |

[51] Int. Cl.[7] .......... C04B 7/14

[52] U.S. Cl. .......... 106/714; 106/737; 106/740; 264/333; 264/DIG. 43

[58] Field of Search .......... 264/333, DIG. 43, 264/DIG. 59; 106/600, 604, 638, 737, 740, 714

[56] References Cited

U.S. PATENT DOCUMENTS

| | | | |
|---|---|---|---|
| 3,634,567 | 1/1972 | Yang | 264/DIG. 43 |
| 3,640,754 | 2/1972 | Tauber et al. | 501/26 |
| 4,102,962 | 7/1978 | Matsui et al. | 264/DIG. 43 |

(List continued on next page.)

FOREIGN PATENT DOCUMENTS

| | | |
|---|---|---|
| 57-0165671 | 9/1982 | Japan . |
| 01-103974 | 4/1989 | Japan . |
| 05-262579 | 10/1993 | Japan . |
| 06-206745 | 1/1994 | Japan . |
| 06-173423 | 9/1994 | Japan . |

OTHER PUBLICATIONS

Database WPI, Section Ch, Week 8634, Derwent Publications Ltd., London, GB; Class A93, AN 86–221230, XP002014775 JP–A–61 151 057 (Shimizu Construction), Jul. 9, 1986.

(List continued on next page.)

*Primary Examiner*—Paul Marcantoni
*Attorney, Agent, or Firm*—Frishauf, Holtz, Goodman, Langer & Chick, P.C.

[57] ABSTRACT

An admixed and kneaded material of a mixture of a hydraulic powder, a potentially hydraulic powder, water, and fine and coarse aggregates, if necessary is molded and hardened. Then the hardened body is heat cured to form silicic acid anions of at least a trimer. This molded and hardened body has a compression strength at least 1000 kgf/cm$^2$ and a bending strength of at least 150 kgf/cm$^2$ so that hardened cement body having a high mechanical strength can be obtained without using a special reinforcing member or fiber. The hardened concrete product of this invention has a high bending strength, compression strength and modulus of elasticity. A glaze can be applied and fired to obtain beautiful concrete products.

23 Claims, 12 Drawing Sheets

U.S. PATENT DOCUMENTS

| | | | |
|---|---|---|---|
| 4,407,769 | 10/1983 | Harada et al. | 264/60 |
| 4,608,795 | 9/1986 | Neuschaffer et al. | 106/626 |
| 4,797,161 | 1/1989 | Kirchmayr et al. | 106/726 |
| 4,797,319 | 1/1989 | Yoshida et al. | 428/312.4 |
| 5,030,289 | 7/1991 | Sattler et al. | 106/805 |
| 5,168,008 | 12/1992 | Yoshida et al. | 428/295 |
| 5,228,913 | 7/1993 | Hinterwaldner et al. | 106/603 |

OTHER PUBLICATIONS

Database WPI, Section Ch, Week 8419, Derwent Publications Ltd., London, GB; Class L02, AN 84–117245, XP002014776 of JP–A–59 054 685 (Denki Kagaku Kogyo KK), Mar. 29, 1984.

Database WPI, Section Ch, Week 8427, Derwent Publications Ltd., London, GB; Class L02, AN 84–168680, XP002014777 of JP–A–59 092 958 (Kubota KK), May 29, 1984.

Patent Abstracts of Japan, vol. 014, No. 306 (C–0735), Jul. 3, 1990 of JP–A–02 102158 (Sekisui Chem. Co. Ltd.), Apr. 13, 1990.

Patent abstracts of Japan, vol. 014, No. 562 (C–0788), Dec. 13, 1990 of JP–A–02 243554 (Natl. House Ind. Co. Ltd.), Sep. 27, 1990.

MOLDED BODIES OF CEMENT TYPE ADMIXED AND KNEADED MATERIAL HAVING EXCELLENT BENDING STRENGTH AND COMPRESSION STRENGTH AND A METHOD OF MANUFACTURING THE SAME

TECHNICAL FIELD

This invention relates to a molded body of a cement type formed from an admixed and kneaded material having excellent bending strength and compression strength and a method of manufacturing the same. The molded body of this invention has excellent characterization values in the bending strength and compression strength, to provide a cement type molded body having a relatively thin thickness and small weight, and the molded body being suitable for constructing various structures. Therefore, the object of this invention provides a novel type molded body, and provides a mortar or paste and concrete product and desirable manufacturing techniques to produce the same.

BACKGROUND ART

Cement paste, mortar and concrete which are obtained by molding cement type admixed and kneaded material are now widely used for various engineering works and for constructing buildings. For constructing such engineering works and buildings various materials such as metal, wood, synthetic resin and glass. Among these materials, molded products of mortar and concrete are the most important, and are used widely as indispensable materials.

Such cement type materials have excellent compression strength and corrosion resistant strength, so that the cement type materials are widely used for constructing a base, an outer wall and a roof of buildings or the like which manifest excellent properties which can not be obtained by using other materials. More particularly, the cement type molded products can be produced at a substantially lower cost than such other materials as metals and synthetic resins. Such low cost can be obtained since the concrete products can readily be obtained by using sand, gravel and water which are natural products.

Although the cement type molded products manufactured by using mortar or concrete can be manufactured at a low cost and have excellent compression strength which can not be obtained when such other materials as metal and synthetic resin are used, the bending strength and pulling strength of the cement type molded products are low. For example, the bending strength of the cement type molded products is low, that is less than 100 kgf/cm$^2$. For this reason, the field of use of the cement type molded products is limited.

Various investigations have been made for improving the strength of the concrete type molded products. In recent years, a typical method is disclosed in Japanese Patent Publication (JP, B) No. 13,956/1988. According to the method disclosed in this publication, the quantity of a liquid (primary water) used to adhere to a fine aggregate is limited in a narrow range. Then a cement powder is admixed with the wet aggregate so as to cause the cement powder to adhere to the surface of the fine aggregate. Then a quantity of the mixing and kneading water (secondary water) is added for effecting mixing and kneading to obtain a mixture having fluidity and moldability. In this mixture, the cement powder is mixed with the secondary water to form a powder having excellent sliding property, thereby forming a close bonding state which is effective to obtain substantial strength.

However, the strength obtained by this method is the compression strength and its highest value is a most 800 kgf/cm$^2$ as shown in the Table 8 of the Publication. There is no technical reason for improving the bending strength. The actual bending strength is 70 to 115 kgf/cm$^2$ as shown in the Table 8, together with the compression strength, such low value of the bending strength does not exceed the prior technical level.

As a method of improving the bending strength of the cement type product, so called resin concrete has been proposed in which a synthetic resin is admixed with the cement type concrete. It has been reported that the bending strength has increased to 1,000 kgf/cm$^2$ or more. However, according to this method, the reason for increasing the bending strength depends upon the quality and quantity of the incorporated synthetic resin. This reason is fundamentally different than the reason involving the general purpose cement products. Furthermore, the cost of manufacturing the product incorporated with a synthetic resin increases beyond the cost of manufacturing cement products. Moreover, the mixed and kneaded material incorporated with a synthetic resin has a low flowability and moldabity and is difficult to obtain satisfactory products compatible with generally used cement products.

Various types of autoclave curing have been adapted for the cement type products. A typical autoclave curing method utilizes saturated steam having a high temperature exceeding 100° C. and a high pressure. Usually, this autoclave curing utilizes a temperature in a range of 180 to 200° C., and a pressure of 10 to 15 kgf/cm$^2$. The principal materials utilized in the autoclave products consist of cement, lime and a suitable quantity of a siliceous material. Where a water hardenable mixed and kneaded material is cured in a high pressure auto clave at a temperature of 100~200° C., and at a temperature of 10~15 kgf/cm$^2$ such products as fine crystallized gel of CHS(1), tobermorite dicalcium silicate hydrate ($C_2SH$), $\alpha C_2SH$, $Ca(OH)_2$ (these products are formed depending upon the mol ratio of lime (CaO) and the siliceous material) and differ from a hydrate obtained by a wet curing under a normal pressure. The above described products obtained by a autoclave curing coexist on independently exist depending upon the mol ratio between lime (CaO) and silica ($SiO_2$).

The reason of producing various compounds described above is considered as follows.

① Where the ratio between CaO and $SiO_2$ becomes 1~2 or more, the lime becomes excessive since the quantity of CaO becomes larger than the quantity of $SiO_2$. As a consequence, the $\alpha$ $C_2SH$ coexist with $Ca(OH)_2$ or tobermorite thereby decreasing the strength.

② When the quantity of CaO becomes lower the 0.7 of the quantity of $SiO_2$, silica becomes excessive so that stable tobermorite is formed but not yet reacted silica remains as an aggregate.

③ When the ratio between CaO and $SiO_2$ lies in a range of 0.7 to 1 only the tobermorite is formed. This state is the most advantageous.

However, a case wherein a concrete utilizing normal Portland cement is subjected to an autoclave curing substantially corresponds to the case ① described above so that contents of $\alpha$ $C_2SH$ and $Ca(OH)_2$ become high, while the amount of generated tobermorite becomes small. As a consequence, it is impossible to increase the compression strength and the bending strength. We have confirmed that in a certain case these strengths decrease.

Since such concrete type products have a low bending strength it is necessary to use such reinforcing members as steel frames, iron reinforcing roads, welded metal meshes, wire netting, las netting or the like. Use of many types of such reinforcing members increases the number of the manufacturing steps and the material cost. That greatly decreases the low cost merit of the cement type products.

Usually, such reinforcing materials as steel fibers and resin fibers are incorporated into the admixed and kneaded products. Use of such reinforcing materials also increases the manufacturing cost and the member of manufacturing steps generally, since two or more types reinforcing materials described above are used, not only the important feature of low cost decreases, but also moldability and density degrade.

It is well known that the cement type products have a large thickness and weight, an excellent corrosion proof properly and can be manufactured at a low cost, so that the actual field of use of the cement type products is considerably limited despite the advantage of low cost.

Furthermore, since the cross-sectional area necessary to obtain a desired bending strength becomes large with the result that a large quantity of the raw materials must be used, and the weight and shape of the concrete type products become large and complicated. Consequently, it is necessary to incorporate into the concrete type products a substantial amount of iron bars, reinforcing wires, or fibrous members so as to increase the low bending strength. Such incorporation of a substantial amount of the iron bars, reinforcing iron wires or fibrous material increases the manufacturing steps and the cost of the raw materials. Such incorporation of the reinforcing material not only makes it difficult to adjust the mixing and kneading operations, but also impairs the moldability and filling property. Furthermore, the important feature of low cost of the cement type products is greatly decreased.

As is well known that when constructing concrete structures or buildings by using the cement type product it is necessary to use a molding box using plywood plates. This is not advantageous in view of the recent trend of shortage of wood resource, saving of material resource, shortage of the construction time, and saving of manpower. Where a molding box made of mortar or concrete is substituted for a molding box made of laminated plywood, after pouring concrete into the molding box, a desired concrete structure can be obtained so that a molding box removing operation usually made by a skilled workman becomes unnecessary. According to the conventional technique even when a mold box made of mortar is used, the thickness of the molding box becomes large and its weight is also large so that such molding box is not suitable for practical use.

Furthermore, when the cement type products using mortar or concrete is subjected to a high temperature its mechanical strength decreases greatly. Particularly, its bending strength decreases to one half or ⅓ and the compression strength and the modulus of elasticity also decreases to one half. Even though it is known that when a glazing agent is applied to the cement type product, a beautiful product can be obtained, but products that can be sold can not be obtained.

DISCLOSURE OF INVENTION

Accordingly, it is an object of this invention to solve the problems of cement type products.

Before describing in detail the present embodiment of this invention, essential conditions and materials for manufacturing the hardened cement bodies of this invention will first be described.

The compression strength and the bending strength of the cement bodies were measured after 1 to 4 weeks (in a certain case after 13 weeks) after hardening the cement bodies. Depending upon the time elapsed after mixing and kneading, the compression strength and the bending strength of the hardened cement product vary. It has been well known that these strengths were measured after 1 to 4 weeks, in a certain case 13 weeks, later than the production of the hardened cement bodies. For using the hardened concrete bodies for constructing various concrete structures and buildings the strength characteristics caused by aging described above are sufficient. It has been well known that after 2 to 3 years or more the bending strength slightly increases above that measured 1 to 4 weeks after hardening the cement. The strength characteristic necessary for this invention is the strength necessary for commonly sold goods on products which have been cured for 1 to 4 weeks or 13 weeks and not cured for several years.

It is the feature of this invention to obtain the desired strength characteristic described above by using such hydraulic powdery raw material as cement, a potentially hydraulic fine powder, such fine aggregate as sand, such coarse aggregate as gravel, and water without using such reinforcing material as a synthetic resin, reinforcing iron bar or wire and fiber which have been used for improving the strength characteristics. In a certain case, a metal powder is used as a catalyzer for obtaining a special strength characteristic to be described later. However, it is noted that, in this invention the resinous material and reinforcing material can be used in a suitable amount.

In these cases, the strength value which can be gained by the resinous material and reinforcing material in the said proportion and in the said mixing conditions, are eliminated from the strength value which are confined in these inventions, as mentioned in later.

The hardened concrete body of this invention generally has a compression strength of more than 1000 kgf/cm$^2$ and a bending strength of more than 150 kgf/cm$^2$. After weeks later than the hardening, the bending strength increases to 200 kgf/cm$^2$ or more and the compression strength increases to 1200 to 1600 kgf/cm$^2$. In some cases the bending strength increases to 180 to 300 kgf/cm$^2$ after hardening.

Furthermore, a portion of the not yet hardened cement body is coated with a glaze and then fired. A fired or hardened concrete product has a bending strength of more than 120 kgf/cm$^2$, preferably higher than 150 kgf/cm$^2$, and a compression strength of higher than 700 to 900 kgf/cm$^2$. The glazed mortar or concrete product has a beautiful appearance.

According to this invention, a powder of metal or metal oxide or a metal hydride is added to the mixed and kneaded material in an amount of 0.1 to 1% based on the quantity of cement. Then a quantity of water is added and the mixture is mixed together and kneaded. After the mixture is left standing for 1 to 2 hours, the mixture is again mixed and then molded to form a calcium silicate hydrate. Then the molded body is heat cured.

Furthermore, this invention relates to a method of manufacturing a hardened body wherein a mixture of a hydraulic powder, water and an aggregate, if necessary, is admixed and kneaded and then the admixed and kneaded material is molded and then that cured. Preferably, a potentially hydraulic fine powders having a mean diameter of less than 3 microns is added to the admixed and kneaded material. For the purpose of forming a hydrate of calcium silicate in the molded body, the admixed and kneaded material is pre-cured. Then the pre-cured material is heat cured at a temperature of 37 to 90° C. for polymerizing silicic acid anions contained in the calcium silicate hydrate to obtain a polymer containing a trimer and higher polymers, thereby obtaining a hardened body of cement having a high bending strength. Alternatively, 2 to 20 parts by weight of a potentially hydraulic fine powder having an average diameter of less than 3 microns is added to 98 to 80 parts by weight of Portland cement used as a hydraulic powdery material. Then a quantity of water is added to the resulting mixture, and the weight ratio of water and the hydraulic material is adjusted to be 15 to 35. The mixture is pre-cured for 3 hours or more to form calcium silicate hydride. Preferably, an active hydraulic reaction time of alite, a mineral component of clinker, is selected to be longer than one day. Further, a molded body wherein calcium silicate hydrate was formed during the pre-curing period in a heat cure for 1 hour to 3 days at a temperature of 37 to 95° C. for polymerizing the silicic acid anions contained in the calcium silicate hydride, and the density of fine pores in the hardened body is adjusted to be less than 0.13 ml/ml. A quantity of water (the ratio of water to cement has been adjusted to be 15 to 28) is added to sand, the ratio of sand to cement has been adjusted to 100 to 200. The mixture and sand was admixed to cause the water to cover the sand particles. Then a quantity of cement is added to the mixture and then mixed together and kneaded.

We have made numerous experiments for increasing the bending strength and the compression strength, and succeeded to obtain a bending strength of higher than 250 $kgf/cm^2$, in a certain case higher than 300 $kgf/cm^2$, at one to four weeks after hardening. We have also succeeded to obtain a high compression strength of 1200 to 1600 $kgf/cm^2$ by using a low cost metallic additive having a catalytic function instead of a high price resinous material.

Thus, this invention provides a molded and hardened concrete product by using an admixed and kneaded mixture containing hydraulic powdery material, a potentially hydraulic fine powder and water (if necessary a fine aggregate may be used). In the structure of the molded and hardened body, a large quantity of polymer (higher than trimer) of silicic acid anions are formed in the calcium silicate hydrate. In the hardened structure, a luminous composition was found which increases the mechanical strength of the molded body for widening the field of use of the admixed and kneaded product, thereby providing a hardened cement body having a small thickness and light weight. A molded and hardened body using paste or mortar has a high compression strength of higher than 1000 $kgf/cm^2$ and a high bending strength of higher than 1000 $kgf/cm^2$.

The sound generated when the molded and hardened product is caused to slide along or be stricken by other body is a metallic impact sound. This characteristic effectively increases the strength characteristic of the hardened concrete body, so that the compression strength higher than 1000 $kgf/cm^2$ and the bending strength higher than 150 $kgf/cm^2$ can readily be obtained. As a consequence, the thickness of the molded and hardened body can be made small and its weight can be reduced. Further, it becomes unnecessary to use reinforcing iron bars or fibrous materials. Even when used, the quantity of the reinforcing iron bar or fibrous material can be reduced greatly. Further, the moldability of the body can be improved.

Since the quantity of polymers (trimer and higher) of silicic acid anions in the calcium silicate hydrate formed in the structure of the molded and hardened body is 1.3 times larger than that of the hardened body cured at a normal temperature, the hardened body having a normal composition and mixed together and kneaded under normal conditions. This special characteristic effectively improve the strength characteristic of the product.

Since the quantity of polymers including trimer and higher of silicic acid anions formed is more than twice that of the hardened body having a normal composition and admixed and kneaded under normal conditions, the compression strength increases to 1000 $kgf/cm^2$ or above and the bending strength increases to 200 $kgf/cm^2$ or above. For this reason, the strength characteristics are greatly improved, whereby not only the thickness of the concrete product can be reduced, but also the quantity of the reinforcing iron bars can be reduced. This reduces the weight of the concrete product.

Since the compression strength is larger than 1100 $kgf/cm^2$ and the bending strength is higher than 200 $kgf/cm^2$, excellent concrete products having a large mechanical strength can be obtained.

It is possible to manufacture a molded and kneaded product from an admixed and kneaded material using such hydraulic powder as a cement powder, such potentially hydraulic fine powder as silica fume, water, a fine aggregate and a coarse aggregate. The quantity of the silicic acid anions in the calcium silicate hydrate formed in the structure of the molded and hardened product is increased beyond that of the cured and hardened product under normal temperature. The resulting cement product has a compression strength of more than 1000 $kgf/cm^2$ and a bending strength of more than 120 $kgf/cm^2$, so that a low cost concrete products utilizing a coarse aggregate has a low cost as well as desired strength characteristics. Such concrete product can be made thin and light-weight, so that it can be used as curtain walls or commercially available members.

The concrete of this invention utilizing a coarse aggregate has a high bending strength of more than 150 $kgf/cm^2$ and a bending strength of more than 200 $kgf/cm^2$ after aging in four weeks, so that various concrete products can be produced. More particularly, satisfactory products that can not be provided by the conventional concrete products can be manufactured at a low cost.

The bending strength of the concrete product aged during one to four weeks is 250 $kgf/cm^2$ which is larger by 2 to 3 times than the bending strength of the conventional cement type hardened body. Consequently it is possible to manufacture a concrete layer having a small thickness and the quantity of the reinforcing material can be decreased as far as possible. As a consequence the concrete body of this invention is suitable for constructing various concrete structures and buildings.

This invention also relates to a method of manufacturing a concrete type hardened body which is formed by admixing a hydraulic powdery material, a quantity of water, and an aggregate, if necessary, and then the resulting mixture is molded and hardened. Then, a potentially hydraulic powder having an average diameter of less than 3 microns is added and mixed together. The molded body of the resulting mixture is subjected to a pre-curing for forming calcium silicate hydride. Then the molded body is heated at a temperature at 37 to 95° C. for polymerizing silicic acid anions so as to greatly increase the quantity of anion polymer of the silicic acid. The quantity of the silicic acid anion polymer thus formed in greatly increased compared to the conventional method wherein the silicic acid polymer is cured and hardened at a normal temperature. The silicic acid polymer has a desirable strength especially a high bending strength. These advantageous properties can not be realized by well known conventional cement products.

According to the method of this invention, to 98 to 80 weight of Portland cement acting as the hydraulic powder is added 2 to 20 weight of potentially hydraulic fine powder having a mean particle diameter of less than 3 microns and a quantity of water, the weight ratio of water to the hydraulic material being 18 to 35%, thereby obtaining a molded body having a dense structure. The mechanical strength caused by the formation of the polymer of the silicic acid anions formed in the calcium silicate hydrate is greatly increased. Consequently the resulting concrete type products have excellent bending and compression strength.

Where the pre-curing for forming calcium silicate hydrate is continued during a period longer than three hours, preferably where an active hydration reaction time of alite, a mineral constituting clinker, is elongated by one day or more, a sufficient quantity of calcium silicate hydrate can be formed so that polymerization of silicic acid anions can be made effectively.

After the hydrate is molded, the calcium silicate hydrate is formed by the pre-curing. And then the molded body is heat cured at a temperature of 37 to 95° C. for 1 hour to 3 days so as to polymorize the silicic acid anions in the calcium silicate hydrate. At this time, the total number of fine pores in the hardened body is decreased to be less than 13 ml/ml, whereby the quality of the structure of the molded and hardened body is improved, thus increasing the bending strength values and other mechanical strength.

As a result of our exhaustive research, we have found that where a small quantity of a metal powder including its oxide and hydroxide is added, the novel characteristic of the cement hardened body of this invention can be effectively increased. The metal powder described above includes the powders of iron, aluminum and magnesium and its quantity may be less than 1%, by volume of the cement powder contained in the admixed and kneaded material. Generally, 0.1 to 0.5%, by volume, of the metal powder based on the quantity of the cement is sufficient to obtain the desired result. The maximum quantity of the metal powder including its oxide and hydrate is 1% based on the quantity of cement which is incorporated with a large quantity of sand and gravel. Generally, the quantity of the metal powder may be less than 0.5%, by volume of cement so that use of such small quantity of the metal powder does not increase the cost of the cement product.

Although the function of the metal powder at a temperature of 40 to 80° C. is not yet clearly understood, from the results of our various experiments it is presumed that the metal powder functions as a catalyst. The use of the metal powder greatly increases the bending strength and the compression strength of the concrete product. More particularly, the bending strength can be increased to 250 $kgf/cm^2$ or more and the compression strength can be increased to 1200 $kgf/cm^2$. In a certain case, the compression strength can be increased to more than 1500 $kgf/cm^2$. Even in a concrete body incorporated with a large quantity of coarse aggregate, the bending strength increases to 200 to 250 $kgf/cm^2$, while the compression strength increases to 1200 to 1800 $kgf/cm^2$.

We have also found that the novel effect of this invention can be obtained by controlling the manufacturing operations without using any special additive. According to this invention, after molding and hardening a cement type admixed and kneaded material, the cement type body is heat cured at a temperature of 37 to 100° C. for a suitable time. For the purpose of decreasing the heat curing time and increasing the effect of the heat curing, the admixed and kneaded material is let to stand still for about 1 to 2 hours and then again admixed and kneaded. According to this modified method, it is possible to decrease the heat curing time to one half and the bending strength and the compression strength can be increased to higher values. In a mortar product, the bending strength can be increased to 300 $kgf/cm^2$ and in a concrete product, the bending strength can be increased to 200 to 250 $kgf/cm^2$.

Although the reason why such advantageous effect can be obtained is not yet clearly understood, it is presumed that before hardening of the concrete mixture is not completed, when the concrete mixture is again mixed and kneaded, the structure of the semihardened concrete mixture is destroyed to from more fine crystals. As a consequence, the diameter of fine pours decreases and of silicic acid anions are formed as a result of the Pozzolan reaction. An integrating action of the admixed materials including the interface of the aggregate takes place so that it is presumed that the adhering strength between the aggregate and the paste and the adhering strength between cement particles are increased.

The technical background of this invention will be described in more detail. Thus, as the hydraulic material utilized in this invention can be used Portland cement defined by the Japanese Industrial Standard and ASTM, blast furnace cement and other types of cements. A potentially hydraulic fine powder is added to the cement powder before admixing and kneading or at the time of admixing and kneading. The average particle diameter of the potentially hydraulic fine powder is less than 10 microns. However, it is desirable to use the potentially hydraulic fine powder having a particle diameter smaller than by one order of magnitude than average particle diameter (about 15 microns) of the Portland cement. More particularly, silica fume of by-produced silica dust, various frit and aplite, etc. are suitable. It is advantageous to add such potentially hydraulic fine particle and fine blast furnace slag in a quantity of 2 to 20 parts, by weight, based on the 80 to 98 parts, by weight, of the Portland cement. A more preferred range is 5 to 15% by weight based on the weight of the cement powder. With such composition, it is possible to increase the density and mechanical strength of the molded body.

The hardened cement body of this invention had a suitable moldability and a dense structure when the ratio of water to hydraulic material is selected to 15 to 35%. Where this ratio exceeds 35, many water gap portions would be resulted and the hardened body structure becomes coarse. Whereas, when the ratio is less than 15%, the fluidity of the mixture decreases so that the air entrapped at the time of admixing and kneading form voids in the hardened structure, thereby decreasing the mechanical strength of the cement product. As a consequence, it is impossible to increase the bending strength and the compression strength.

The hardened cement product of this invention is started from a mixture of sand and gravel which have been generally used. The mixture is then molded and cured to obtain a hardened cement body having a high mechanical strength. The most advantageous feature of this invention lies in a molded body having a small mumber of air voids in the hardened cement body having a dense structure. Then the degree of polymerization of silicic acid anions of calcium silicate hydrate (C—S—H) having a property of increasing the mechanical strength is increased to a suitable value, at the same time the polymers of anions or silicic acid are bridge with other C—S—H type compound. The silicic acid substance contained in the C—S—H, sand and gravel is also polymerized for integrating in by bridging; thereby forming a hardened cement body. At the time of polymerization, unless a certain amount of C—S—H compound is formed, the polymerization of the silicic acid ions does not occur. The precuring time increases or accelerates the formation of C—S—H compound to a degree not to cause the structure to become coarse. Anyhow, at the time of forming a certain amount of the C—S—H compound, the mixture is cured at a temperature of 37 to 95° C. more specifically, 40 to 80° C. Then, the silicic acid anions of the C—S—H compound is dehydrated and condensed to cause polymerization, The polymerization of the silicic acid anions of the C—S—H compound is a heat polymerization effected at a temperature of less than 100° C. The equipment used for effective heat polymerization may be warm water curing equipment of low cost.

The silicic acid anions present in a clinker as a monomer ($SiO_4^{4-}$), but at the time of hydration reaction of the cement, a C—S—H hydrate is formed. This hydrate repeats dehydration and condensation together with a dimer ($SiO_2O_2^{6-}$), and polymers of a higher degree polymerization, thus increasing the degree of polymerization.

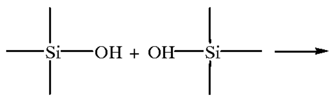

-continued

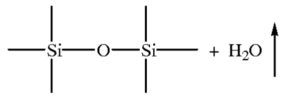

Generally, whether the starting material is inorganic or organic, the degree of polymerization is proportional to the mechanical strength. We have confirmed that as the mechanical strength increases when the degree of polymerization of the silicic acid anions which constitute the C—S—H compounds increases, thereby obtaining cement product having desirable characteristics.

At the time of confirming the degree of polymerization of the silicic acid anions subjected to the curing operation accelerated by warming which is necessary to obtain a high bending strength of this invention, the hydrized product was treated with trimethyl-silyl and analyzed using a gel permeation chromatography(GPC).

The silicating treatment of trimethyl-silyl is effected by treating the Si—O-metal ions of silicic acid salt with an acid to form silinal radical (Si—OH). Thereafter the silinal radicals are caused to react with a trimethyl-silyl silicating agent (trimethyl chlrosilane). The resulting derivative is soluble in an organic solvent so that the derivative can be analyzed by a molecular weight analyzer.

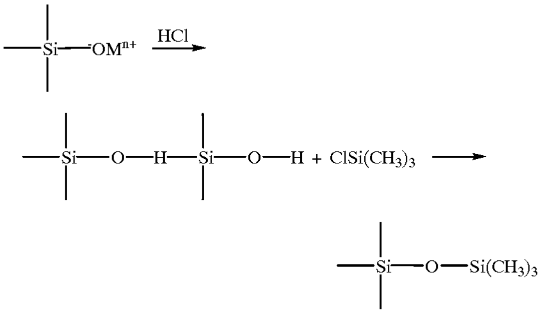

The analysis of the molecular weight of the derivative formed is made by using a liquid chromatograph using a column of GPC. Polystylene whose molecular weight is known is used as the standard.

FIG. 1 shows an example of the result of GPC measurement of trimethyl-silyl derivative. Substance of high molecular weight rapidly passes through the column so that the retention time is short, whereas a low molecular weight substance passes at a low speed. For this reason, a difference occurs in the retention times so that chromatographs as shown in FIG. 1 can be obtained. As a detector of the measurement was used a refractive index meter. The peaks of a monomer and dimers appear beneath the base line, whereas the peaks polymers (trimer and higher) appear above the base line, depending upon the difference of the refractive index of the solution liquid and a sample liquid flowing through the column. Areas of respective peaks represent relative quantity, whereas the width of the retention time shows the molecular weight distribution. A quantity of water corresponding to a water/cement ratio of 15 to 28% is added to a mixture of sand. The mixture having a sand/cement ratio of 100 to 200%. The mixture is mixed together to cause the water to wet sand and cement powders. Thus bending strength of a hardened body of cement obtained after admixing and kneading the mixture, can be greatly increased. The mechanical strength of the hardened cement body of varying raw material ratio is high. Preferred water/cement ratio is 17 to 20%, and sand/cement ratio is 120 to 180%.

BEST MODE FOR CARRYING OUT THE INVENTION

Figure 1:
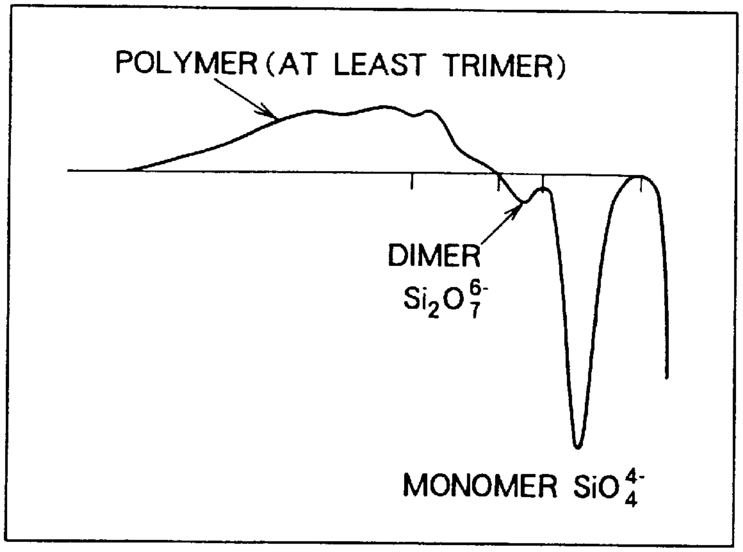
FIG. 1 is a graph showing the result of measurement of trimethyl-silyl silicate derivation by using gel-permeation chromatography (GPC).

The technique of steam curing has been used for rapidly increasing the initial mechanical strength of concrete products and decreasing the mold release time of the molded concrete products so as to improve the productivity. These relationships are shown by the following experimental examples.

Experimental Example 1

By using a mortar containing water cement ratio of 40%, and sand cement ratio of 1:1, a test piece was prepared having dimensions of 4×4×16 cm, according to the JIS (Japanese Industrial Standard) specification. The test piece was cured in water at 20° C. according to the standard. Another test piece was prepared by pouring mortar and cause it to harden 3 hours after pouring, the temperature was increased to 60° C. at a rate of 15° C. per one hour and then cured. The compression strength of these test piece is shown in the following Table 1. As shown in this table, although early strength of the piece subjected to steam curing is high but the strength after a long time is small. After 4 weeks, the bending strength tends to decrease.

TABLE 1

W/C = 40, S/C = 1

| Curing | Strength after one week ($kgf/cm^2$) | | Strength after 4 weeks ($kgf/cm^2$) | | |
|---|---|---|---|---|---|
| Condition | Comp. | Bend. | Comp. | Bend. | Note |
| Standard Curing (20° C., in water) | 464 | 78 | 690 | 92 | |
| Steam Curing (60° C., 8 hours) | 608 | 98 | 630 | 90 | |

Comp.: Compression
Bend.: Bending

Experimental Example 2

Heretobefore, the steam curing was made for the purpose of obtaining the initial strength of the concrete body at an early stage.

A mortar having the same composition as that used in example 1 was poured, and the standard curing was made for 2 days at 20° C. to sufficiently increase the compression strength (about 100 $kgf/cm^2$), and the steam cured for 3 days at 60° C. The test results are shown in the following Table 2. The bending strength of the test piece measured four weeks later is slightly increased, but any remarkable difference was not noted. When the steam curing time is elongated, the compression strength tends to decrease.

TABLE 2

| Curing | Strength after one week ($kgf/cm^2$) | | Strength after 4 weeks ($kgf/cm^2$) | | |
|---|---|---|---|---|---|
| Condition | Comp. | Bend. | Comp. | Bend. | Note |
| Standard Curing (20° C., in water) | 464 | 78 | 690 | 92 | |
| Steam Curing (60° C., 3 days) | 586 | 103 | 620 | 95 | Standard Curing, 2 days; 60° C. Curing, 3 days |

Experimental Example 3

Mortar having a sand/cement ratio of 1 to 1.5 and a water/cement ratio of 27 which are lower than those of examples 1 and 2 was prepared. 3 hours after pouring the mortar, the temperature was increased to 60° C. at a rate of 15° C. per hour and then steam cured. 24 hours after curing the poured mortar was subjected to the standard curing. The identical test piece was subjected to the standard curing for 2 days and then cured by steam for 3 days at 60° C. The results are shown in the following Table 3. The compression strength after four weeks is slightly higher than a test piece which has been cured by steam for 3 days at 60° C. after the strength has been increased. Other characteristics are similar to those shown in Table 2.

TABLE 3 water/cement ratio = 27, sand/cement ratio = 1/1.5

| Curing | Strength after one week ($kgf/cm^2$) | | Strength after 4 weeks ($kgf/cm^2$) | | |
|---|---|---|---|---|---|
| Condition | Comp. | Bend. | Comp. | Bend. | Note |
| Standard Curing (20° C., in water) | 697 | 123 | 872 | 136 | |
| Steam Curing (60° C., 8 hours) | 732 | 138 | 827 | 118 | 3 days precuring; Curing at 60° C. for 8 hours |
| Steam Curing (60° C., 3 days) | 901 | 152 | 891 | 125 | 3 days standard curing; Curing at 60° C. for 3 days |

Further, silica fume having an average particle diameter of 1 micron was used as a potentially hydraulic fine powder. Mortar similar to that of example 1 wherein water/cement ratio is 40% and the sand/cement ratio is 1 was incorporated with silica fume of a quantity of 10% of the cement quantity and then steam cured. Similar mortar was subjected to the standard curing followed by a curing executed for 3 days at 60° C. The compression strength and the bending strength of the two types are shown in the following Table 4. Respective strengths after one week and four weeks are larger than those shown in Table 1. The tendency of decreasing the bending strength after four weeks can not be noted.

TABLE 4

W/C = 27, S/C = 1.5, fumed silica, 10% of cement

| Curing | Strength after one week ($kgf/cm^2$) | | Strength after 4 weeks ($kgf/cm^2$) | | |
|---|---|---|---|---|---|
| Condition | Comp. | Bend. | Comp. | Bend. | Note |
| Standard Curing | 547 | 98 | 691 | 115 | 20° C., in water |
| Steam Curing (60° C., 8 hours) | 732 | 122 | 773 | 131 | precuring for 3 days Curing at 60° C. for 8 hours |
| Steam Curing (60° C., 3 days) | 789 | 130 | 808 | 146 | standard curing for 2 days; Curing at 60° C. for 3 days |

Experimental Example 5

In this example, silica fume described above was used and the water/cement ratio was decreased. Mortar having a water/cement ratio of 25 and sand cement ratio of 1 was mixed with silica fume of a quantity corresponding to 25% of the cement quantity. After pouring the mortar, its temperature was increased to 60° C. at the end of 3 hours at a ratio of 15° C. per hour, and then steam cured, 24 hours after the curing, the solidified mortar was released from the mold and then subjected to the standard curing. An identical test piece was subjected to the standard curing for 2 days to increase the strength to about 30 kgf/cm$^2$. Then the test piece was steam cured for 3 days at 60° C. One and four weeks later than the curing of the test pieces, the strength of the test pieces were measured. Measured values are shown in the following Table 5. The bending strength of the test piece one week after curing was approximately 160 kgf/cm$^2$ and the bending strength was about 170 kgf/cm$^2$. A test piece was cured at 60° C. for 3 days. The mechanical strength of the cured test piece had increased. More particularly, the cured test piece had a bending strength of 234 kgf/cm$^2$, one week later, while the bending strength of the test piece was 258 kgf/cm$^2$ after four weeks. Fine silica powder, silica fume, for example, was added to cement in an amount of 10% thereof. After increasing the mechanical strength to about 30 to 100 kgf/cm$^2$, the test piece was cured with steam for about 3 days and at 60° C. The resulting product had a bending strength of about 40 to 50% higher than the prior art test piece which was steam cured.

TABLE 5

| Curing | W/C = 25, S/C = 1, fumed silica, 10% of cement Strength | | | | |
|---|---|---|---|---|---|
| | Strength after one week (kgf/cm$^2$) | | Strength after 4 weeks (kgf/cm$^2$) | | |
| Condition | Comp. | Bend. | Comp. | Bend. | Note |
| Standard Curing (20° C., in water) | 881 | 138 | 1199 | 186 | |
| Steam Curing (60° C., 8 hours) | 1115 | 162 | 1127 | 169 | precuring for 8 days Curing at 60° C. for 8 hours |
| Steam Curing (60° C., 3 days) | 1245 | 234 | 1221 | 253 | standard curing for 2 days; Curing at 60° C. for 3 days |

As shown in Table 5, the test pieces had a compression strength larger than 1000 kgf/cm$^2$ after one week and 4 weeks and the bending strength is higher than 150 kgf/cm$^2$. These high mechanical strengths are greatly larger than of the prior art cement product so that cement products of this invention can be made thin and light weight without using reinforcing iron bars or wires.

Experimental Example 6 (Heat Curing After the Standard Curing)

A cement paste added with water and cement at a ratio of 25 and 10% of silica fume is kneaded. The kneaded cement paste was subjected to the normal curing for one day. After subjecting the paste to the standard curing for one day and cured with warm water respectively having of a temperature of 20° C., 40° C., 50° C., 60° C., 80° C. and 90° C. 7 days after the curing, the bending and compression strength were measured. The mechanical strength of a test piece cured by steam having a temperature of 80° C. was also measured. The results of measurement are shown in the following table 6.

TABLE 6

| Strength kgf/cm$^2$ | Curing Temp. Curing temperature - standard curing for one day followed by warm water curing for 3 days | | | | | | |
|---|---|---|---|---|---|---|---|
| | 20° C. | 40° C. | 50° C. | 60° C. | 80° C. | 90° C. | 80° C.* |
| Bending Strength | 177 | 219 | 246 | 249 | 261 | 248 | 185 |
| Compression Strength | 843 | 1,145 | 1,139 | 1,238 | 1,286 | 1,164 | 1,083 |

*usual steam curing (80° C.)

As shown in this table, when cured at a temperature of 80° C. the highest bending strength can be increased. This value is higher than the cement product cured at other temperatures by 30 to 40%. This temperature coincides with the temperature at which 14Å tobermorite is formed. The cement product which has been subjected to precuring for 3 hours and immediately thereafter subjected to a curing with steam had a compression strength of 1083 kgf/cm$^2$ and a bending strength of 185 kgf/cm$^2$. The concrete product which has been cured at a temperature of 80° C. after hardening has a 40% or more higher bending strength. As has been described in example 4, when the water/cement ratio is higher than 35, the bending strength is less than 50 kgf/cm$^2$ so that the improved characteristic shown in Table 6 can not be obtained.

Figure 2:
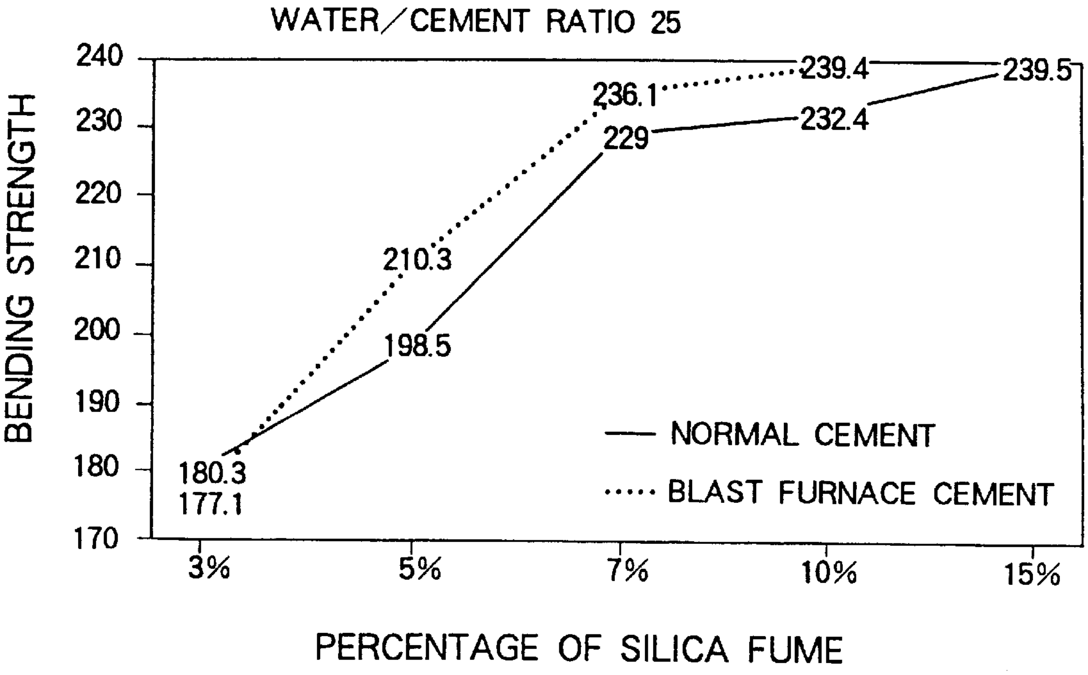
FIG. 2 is a graph showing that the bending strength of ordinary cement and blast furnace cement varies dependent upon the ratio of silica fume and an incooperated material.

The result of measurement of the bending strength of a cement product of an ordinary cement or a blast furnace cement, the cement product has been obtained from a mixture of water cement ratio of 25%, and silica fume and heated at a temperature of 45° C., is shown in FIG. 2 of the accompanying drawing. As shown, when the percentage of contents of the silica fume reaches 5%, the bending force increases steeply (usually more than 25%). When blast furnace cement is used, excellent results can be obtained.

Figure 3:
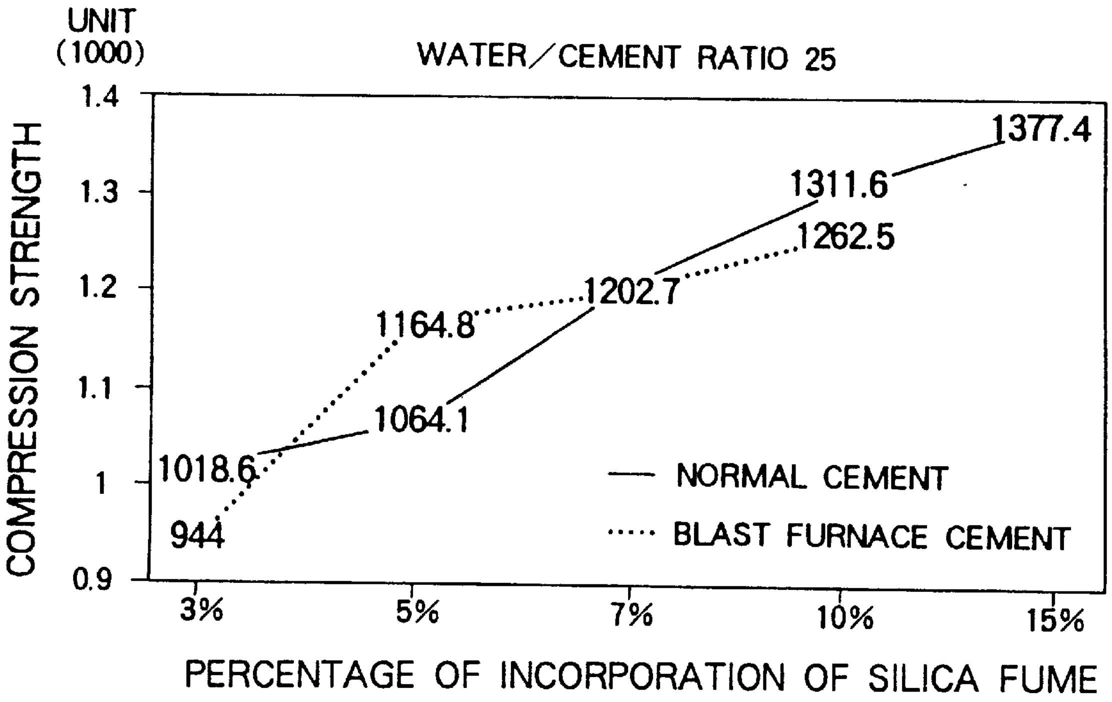
FIG. 3 is a graph showing the compression strength under the same condition as that of FIG. 2.

The relationship between quantity of the silica fume and the compression strength in the experiment described above in FIG. 3. In the same manner as shown in FIG. 2, the percentage of incorporation of the silica fume increases beyond 5%, the compression strength increases to more than 1000 kgf/cm$^2$. The degree of increase of the compression strength is substantially the same or a blast furnace cement. However, when the blast furnace cement is used in an amount of more than 10%, the compression strength decreases.

For the purpose of effectively forming such calcium silicate hydrate as noted as tobermorite it is effective to use such siliceous fine powder as silica fume. The silica fume is a very fine powder having an average particle diameter of 0.1 micron. However, silica fume having an average particle diameter of less than 2 microns is usually used. Such fine siliceous substance exists between a cement powder having an average particle diameter of about 10 micron and suitably combines with the calcium component of the cement for accelerating the formation of the calcium silicate hydrate.

Although, the quantity of incorporation of the fine powder mixture is influenced by the sand/cement ratio and water/cement ratio, usually incorporation of more than 25% is effective to obtain the desired advantages. The upper limit of incorporation of the mixture is advantageously about 10% because since the mixture consists of a mixture of fine powder under a condition wherein the fine powder distribute uniformly and at a definite concentration in the admixed and kneaded material. In a certain case, the percentage may by about 25%. With such percentage it was noted that the desired bending strength of higher than 200 kgf/cm$^2$ can be obtained.

It is advantageous to heat cure the molded body after the coagulation of the cement has been finished under a normal temperature. Advantageously, after stabilizing the structure of the molded body, it is heat cured after one, especially about three days after molding. Before elapsing the number of days described above, or after elapsing an extremely long time, for example several months, even the molded body is heat cured, it is impossible to obtain the desired calcium silicate hydrate.

The curing treatment conditions will now be described. When the concrete body is cured in water at a normal temperature the formation of the hydrate of tobermorite is not sufficient. But only when the hydrate is cured in warm water at 50 to 65° C., the desired hydrate can be formed. It is advantageous to increase curing time to more than one day. About 7 to 10 days can be used. When the curing time longer than 7 to 10 days is used, the energy for maintaining the curing temperature described above increases.

Experimental Example 7

In this example, instead of the silica fume used in Example 5, a frit used as an enamel was pulverized to obtain a frit powder having a particle diameter of less than 10 microns, preferably an average diameter of 4.5 microns. The bending strength of the test piece utilized of this mortar was measured by changing the quantity of frit from 0%, 15%, 20% and finally 25% based on the quantity of mortar. The sand/cement ratio, water/cement ratio and the quantity of water reducing agent for various types of mortar, and their flow values are shown in the following Table 7.

By using various mortar shown in Table 7, test pieces for testing the mechanical strength of the hardened cement body using these mortars were prepared. These test pieces were released from the molds one day after pouring the mortar and cured for two days in wet air at a temperature of 20° C. Certain number of test pieces were subjected to the standard curing in water at a temperature of 20° C., one week and four weeks respectively after pouring the mortar. Other test pieces were subjected to the secondary curing (L2dH4d-ST) for four days in warm water at 60° C., two days after(L2d) pouring the mortar. The results of strength test of these test pieces executed after one week and four weeks are respectively also shown in Table 7. In the mortar incorporated with the frit, the bending strength was greatly increased. The test pieces subjected to heat curing have a bending strength higher than 200 kgf/cm$^2$ (in certain cases larger than 194 to 267 kgf/cm$^2$).

Experimental Example 8

Instead of the frit described above, we have prepared a glass powder having an average particle diameter of about 5 microns. In the same manner as in the previous examples, the quantity of the glass powder was varied as 0%, 15%, 20% and 25%. The mortar incorporated with various quantities of the glass powder was molded and hardened, and the bending strength of the molded and hardened body was measured. The sand/cement ratio, water/cement ratio and the quantity of used water reducing agent and the flow value of the mortars are shown in the following Table 8.

TABLE 7 unit of bending strength and compression strength: kgf/cm$^2$

| test piece | composition ratio | | | water reducing | | one week strength | | four weeks strength | |
|---|---|---|---|---|---|---|---|---|---|
| curing | frit/C | S/C | W/C | agent | flow | bending | compression | bending | compression |
| P-ST | 0 | 1.0 | 30 | 4 | 220 | 107 | 416 | 136 | 497 |
| P15-ST | 15 | 1.0 | 30 | 4 | 197 | 99 | 487 | 145 | 570 |
| P15-L2dH4dST | 15 | 1.0 | 30 | 4 | 197 | 194 | 829 | 230 | 852 |
| P20-ST | 20 | 1.0 | 30 | 4 | 171 | 118 | 560 | 146 | 576 |
| P20-L2dH4dST | 20 | 1.0 | 30 | 4 | 171 | 225 | 705 | 267 | 703 |
| F25-ST | 25 | 1.0 | 30 | 4 | 172 | 187 | 657 | 161 | 610 |
| F25-L2dH4dST | 15 | 1.0 | 30 | 4 | 172 | 229 | 908 | 265 | 988 |

Note
P: plain concrete,
F: frit powder,
L: curing in wet air at 20° C.,
d: day,
H: warm water curing at 60° C.,
ST: curing in water at 20° C.

TABLE 8

| unit of bending strength and compression strength: kgf/cm$^2$ | | | | | | | | | |
|---|---|---|---|---|---|---|---|---|---|
| | composition ratio | | | | | | | | |
| test piece | | | | water reducing | | one week strength | | four weeks strength | |
| curing | glass/C | S/C | W/C | agent | flow | bending | compression | bending | compression |
| P-ST | 0 | 1.0 | 30 | 4 | 250 | 107 | 416 | 136 | 497 |
| G15-ST | 15 | 1.0 | 30 | 4 | 206 | 86 | 503 | 125 | 565 |
| G15-L2dH4dST | 15 | 1.0 | 30 | 4 | 206 | 154 | 703 | 176 | 752 |
| G20-ST | 20 | 1.0 | 30 | 4 | 172 | 85 | 429 | 121 | 526 |
| G20-L2dH4dST | 20 | 1.0 | 30 | 4 | 172 | 148 | 638 | 187 | 703 |
| G25-ST | 25 | 1.0 | 30 | 4 | * | 75 | 419 | 111 | 510 |
| G25-L2dH4dST | 25 | 1.0 | 30 | 4 | * | 149 | 654 | 185 | 688 |

Note
P: plain concrete,
G: frit powder,
L: curing in wet air at 20° C.,
d: day,
H: warm water curing at 60° C.,
ST: curing in water at 20° C.
*impossible to measure By using these mortars test pieces (each having a dimension of 4×4×16 cm) ) for testing the strength were formed, released from the mold on the next day and cured in wet air for 2 days. A certain number of test pieces were subjected to the standard curing in water of 20° C. after one week and four weeks respectively. The remaining test pieces were subjected to the secondary curing (L2dH4dST) for 4 days in warm water at 60° C. two days after pouring the mortar. The results of strength measuring performed at one week and four weeks after pouring the mortar are also shown in Table 8. Test pieces made of the plain concrete (PC) added with the frit had lower bending strength. When subjected to the primary curing at 20° C. and the secondary curing at 60° C., the bending strength of the mortar incorporated with the glass frit was increased in the same manner as the test pieces shown in Table 7. We have noted that the test pieces subjected to the heat curing have a high bending strength of at least about 150 kgf/cm$^2$.

Experimental Example 9

We have also made comparative tests of the mortars respectively added with aplite of the quantity of 0, 15, 20 and 25% respectively. The sand/cement ratio, water/cement ratio, the quantity of the water reducing agent, etc. are also shown in the following Table 9.

TABLE 9

| unit of bending strength and compression strength: kgf/cm$^2$ | | | | | | | | | |
|---|---|---|---|---|---|---|---|---|---|
| | composition ratio | | | | | | | | |
| test piece | | | | water reducing | | one week strength | | four weeks strength | |
| curing | aplite/C | S/C | W/C | agent | flow | bending | compression | bending | compression |
| P-ST | 0 | 1.0 | 30 | 4% | 250 | 107 | 416 | 136 | 497 |
| A15-ST | 15 | 1.0 | 30 | 4% | 250 | 112 | 559 | 143 | 590 |
| A15-L2dH4dST | 15 | 1.0 | 30 | 4% | 250 | 105 | 760 | 199 | 822 |
| A20-ST | 20 | 1.0 | 30 | 4% | 229 | 117 | 605 | 146 | 578 |
| A20-L2dH4dST | 20 | 1.0 | 30 | 4% | 229 | 159 | 1034 | 187 | 1103 |
| A25-ST | 25 | 1.0 | 30 | 4% | 219 | 116 | 528 | 142 | 610 |
| A25-L2dH4dST | 25 | 1.0 | 30 | 4% | 219 | 173 | 905 | 185 | 985 |

Note
P: plain concrete,
A: aplite,
L: curing in wet air at 20° C.,
d: day,
H: warm water curing at 60° C.,
ST: curing in water at 20° C.

In the same manner as the experiments described above, hardened concrete strength testing pieces each having a dimension of 4×4×16 cm were prepared by using various mortars shown in Table 9. The test pieces were released from the molds, one day after pouring, and cured for 2 days in wet air. Certain members of test pieces were subjected to the standard curing in water at 20° C. at the end of one week and four weeks. The remaining test pieces were subjected to the secondary curing during a period of 2 days after pouring and four days. The results of the strength measured after one week and 4 weeks respectively are also shown in Table 9. The results show that the bending strength and compression strength have increased even in the mortar added with aplite. We found that the heat cured test pieces have a high bending strength higher than 150 kgf/cm$^2$. The results of the experimental examples of 4.5, 7 and 8 show that it is advantageous to add and admix potentially hydraulic fine powder to obtain hardened cement bodies having a high mechanical strength. We have also noted that in examples 1 to 4, the quantity of polymers (including a trimer and above) of the silicic acid anions in the calcium silicate formed in the structure of the hardened cement body has increased. After grinding and polishing a substantially large quantity of a bright component could be noted.

Respective hardened bodies obtained by various examples described above were observed in detail. We have noted that the external appearance of the molded and hardened body is the same as the usual cement products. However, we have broken the molded and hardened body and observed the fractured surface. Then very small and bright structure could be observed with naked eyes. Especially in a mortar molded body, we noted that many bright structures were formed at its interface between the aggregate (sand) and mortar. When magnified by a factor of 30 or more, the bright structure can be seen more clearly. When ground slightly in a plane, the bright structure can be confirmed more clearly. The reason why the bright structure is formed is not yet clear, we presume that the admixed compositions particularly, the mixture of silica fume or other siliceous fine powder and cement powder is subjected to the curing, a polymer (including trimer and higher polymer) of silicic acid anions is formed. The polymer further polymerizes with a silicic acid substance which has been adhered to the surface of the aggregate. It is presumed that this adhered material forms a glassily substance, at least a glassily composition. Further, it is considered that the glassily composition is formed in the gaps formed by the primary curing of the composition. It is considered that the composition improves the strength, particularly the bending strength of the portion of the hardened cement containing fine gaps.

The hardened cement body of this invention, particularly the body containing the bright composition creates a metallic tone when these bodies are struck or relatively slid. Due to this fact, the character of the product of this invention can be recognized as a tone or tone wave.

Figure 4:
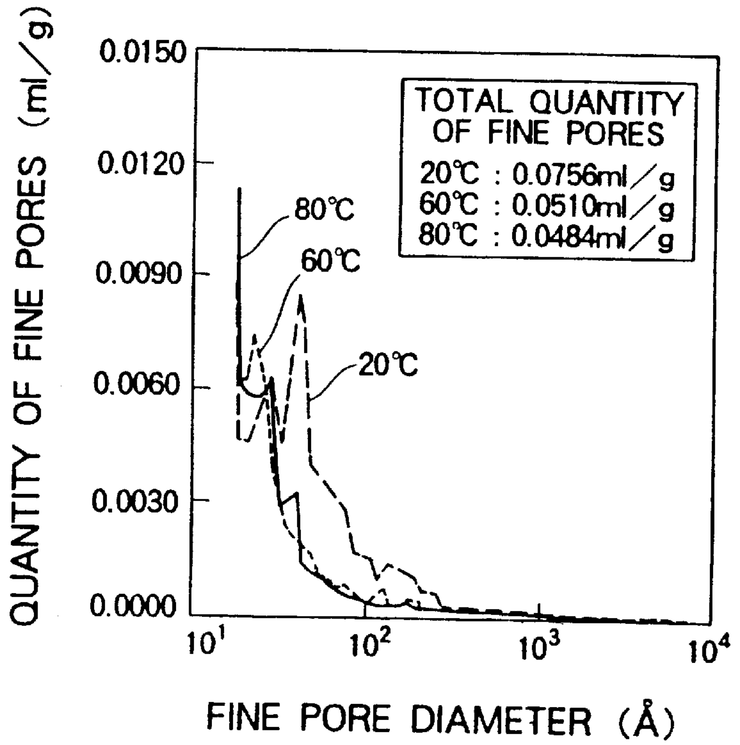
FIG. 4 is a graph showing the relationship between the pore diameter and the number of pores of a cement base hardened material added with silica fume and cured at a temperature of 20 to 80° C.

The relation between the pore diameter(Å) and the number of pores of the hardened cement paste at various temperatures is shown in FIG. 4 which also shows the total number of the pores. As shown in FIG. 4, as the heating temperature increases, the pore diameter becomes small, whereas the number of the pores decreases. More particularly, the total number of the fine pore is 0.075 ml/g when cured at a normal temperature. When cured at 60° C., the total number of the fine pores is 0.0510 ml/g, meaning a large reduction. When cured at 80° C., the total number of the fine pores decreases further.

Figure 5:
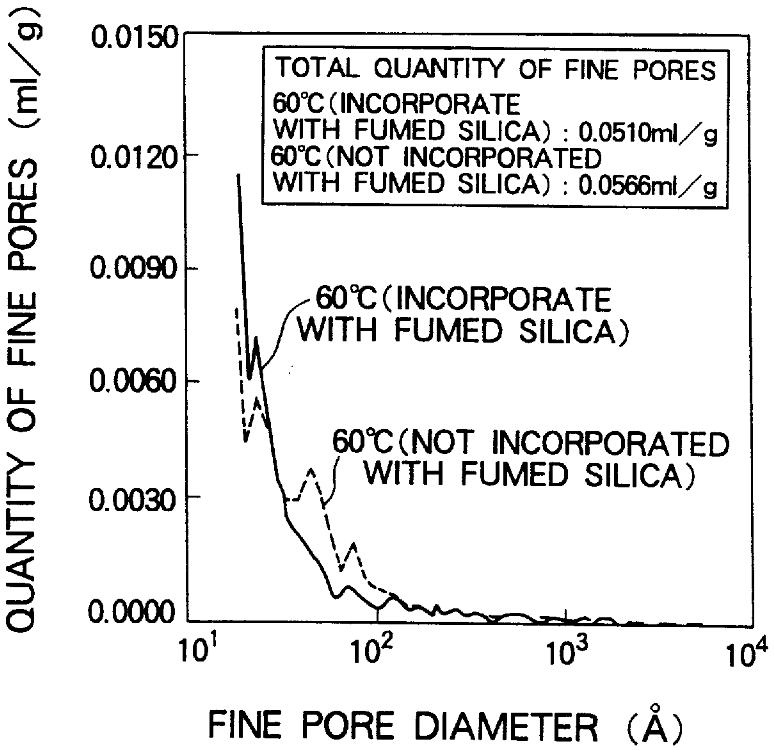
FIG. 5 is a graph showing the relationship between the pore diameter and the number of pores of a cement past hardened material cured at a temperature of 60° C. where silica fume is added or not.

FIG. 5 shows the relationship between the pores diameter and the number of pores of the hardened bodies at 60° C., when silica fume is added and not added. When added with the silica fume, the pore diameter decreases in a range of 50 to 100 Å. In a range below a pore diameter of less than 40 Å, the hardened cement body incorporated with the silica fume contains much more fine pores.

In a molded and hardened body of a cement paste or the like incorporated with the potentially hydraulic fine powder having an average diameter of about one micron contains a small number of fine pores (air gaps). As the temperature rises the tendency of decreasing the number of the fine pores becomes high. This tendency occurs due to the decrease of the water to hydraulic material ratio (W/C) and due to the fine pore filling effect of the potentially hydraulic fine powder. Due to the acceleration function of hydration caused by the temperature rise, the voids in the hardened cement body are filled rapidly with the hydrate. As a consequence, the total volume in the hardened cement body decreases. As a result our analysis, the pore volume of the paste portion is the hardened portion subjected to the accelerated curing at 40° C., 60° C. and 80° C. is extremely decreased than in the cement paste portion of the molded cement body cured at 20° C. It should be noted that although the temperature has been increased to 40° C., 60° C. and 80° C. respectively, as the temperature is increased in a manner just described the bending strength of the molded body has increased over that shown in FIG. 4 in which the total volume of the fine pores did not largely increased. This shows that there is another factor of increasing the bending strength except for the most important factor of increasing the bending strength caused by the decrease in the total volume of the fine pores which have been filled with cement paste caused by the accelerated hydration occurred as a result of temperature rise.

We have also investigated the temperature of heat curing necessary for polymerizing silicil acid anions. More particularly, a cement paste the water/cement ratio thereof have been adjusted to 25 (at this ratio, the mechanical strength of the hardened cement body is the largest) is admixed with silica fume of the quantity of 10% of the cement. The mixture is then kneaded, and subjected to the standard curing for one day. The one day cured paste was cured for 3 days by using warm water at 20° C., 37° C., 40° C., 42° C., 45° C., 50° C., 60° C., 80° C. and 90° C. respectively. Seven days after curing, the bending strength and the compression strength of the hardened cement body were measured. The results of measurement are shown in the following Table 10.

TABLE 10

| Strength | Curing temperature - standard curing for 2 days followed by stream curing for 3 days Curing Temp. | | | | | | | | | |
|---|---|---|---|---|---|---|---|---|---|---|
| kgf/cm$^2$ | 20° C. | 37° C. | 40° C. | 42° C. | 45° C. | 50° C. | 60° C. | 80° C. | 90° C. | 30° C.* |
| Bending Strength | 177 | 190 | 246 | 249 | 261 | 248 | 185 | 261 | 248 | 185 |
| Compression Strength | 843 | 1,050 | 1,145 | 1,180 | 1,220 | 1,137 | 1,238 | 1,236 | 1,164 | 1,083 |

*usual steam curing effected at 80° C.

The cement product obtained by curing at 20° C. and by adding 10% of silica fume based on the quantity of the cement have a bending strength of 177 and the compression strength of 843 kgf/cm$^2$. However, cement products cured at 37° C. and higher have the compression strength of higher than 1000 kgf/cm$^2$ and the bending strength of 190 kgf/cm$^2$ and more. These strength are higher than those of the cement body subjected to the usual steam curing effected at 80° C. These data show that the cement product of this invention is excellent.

Figure 6:
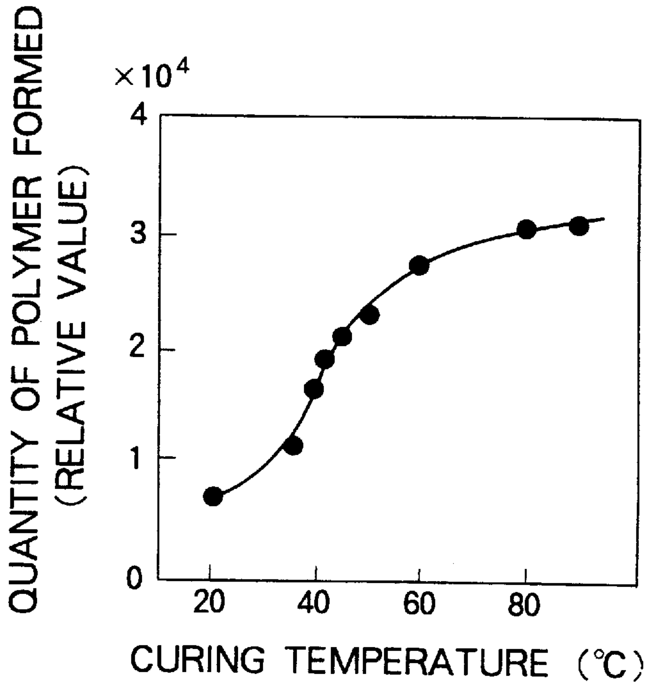
FIG. 6 is a graph showing the relationship between the curing temperature and the quantity of formation of polymers at least a trimer of a silicic acid derivatives.

The relation among the temperature of the heat curing, the quantity (peak area) of formed quantity of polymers (trimer and above) of the silicic acid anions, TMS derivatives and the average molecular weight (Mn) is shown in the following Table 11 and in FIG. 6 and 7. As shown in FIG. 6, the quantity(peak area) of the polymer of the silicic acid anions of C—S—H (obtained by GPC) increases by about 3 times by increasing the curing temperature from 20° C. to 40° C. At the curing temperature of 60° C., the polymer formed increase five times. However in a range of 60° C. to 90° C. there is no large variation.

TABLE 11

| Curing Temperature (° C.) | Quantity of polymer formed (peak area) Hardened Body No. 1 | Hardened Body No. 2 | Average molecular weight (Mn) Hardened Body No. 1 | Hardened Body No. 2 |
|---|---|---|---|---|
| 20 | 6,452 | 9,135 | 1,671 | 1,665 |
| 37 | 11,435 | 12,068 | 1,824 | 1,780 |
| 40 | 17,325 | 16,877 | 1,942 | 1,980 |
| 42 | 19,568 | 18,254 | 2,050 | 2,076 |
| 45 | 21,584 | 21,265 | 2,086 | 2,118 |
| 50 | 24,057 | 23,864 | 2,150 | 2,164 |
| 60 | 28,005 | 27,347 | 2,231 | 2,240 |
| 80 | 30,467 | 30,067 | 2,307 | 2,323 |
| 90 | 30,532 | — | 2,331 | — |

Figure 7:
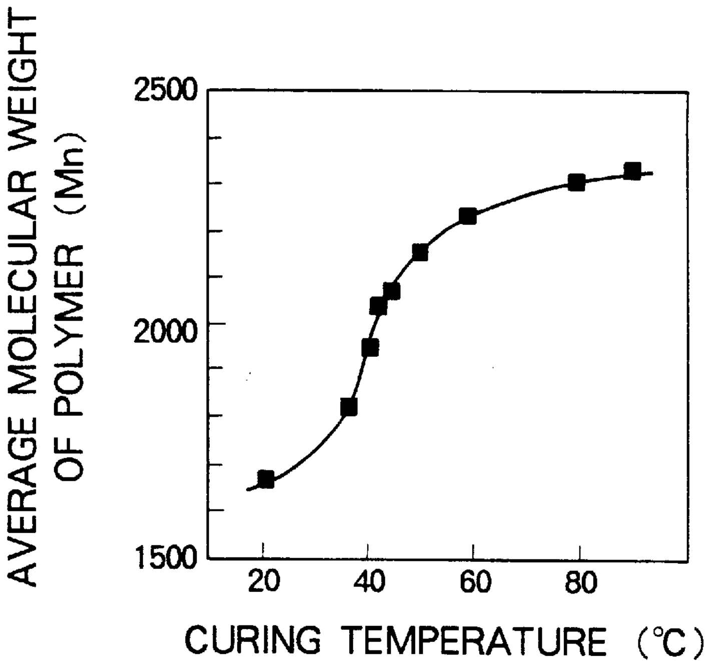
FIG. 7 is a graph showing the relationship between the curing temperature and the average molecular weight of the polymer of a silicic acid ion derivatives.
Figure 8:
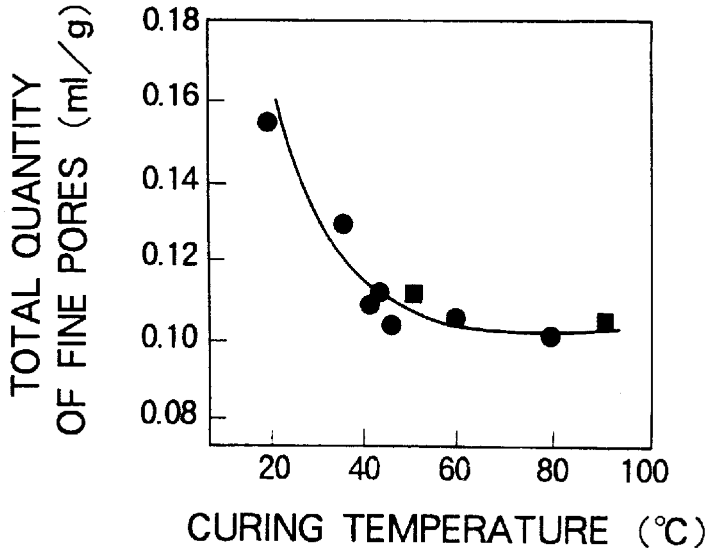
FIG. 8 is a graph showing the relationship between the curing temperature and the total number of pores.

As shown in FIG. 7, regarding the relationship between the average molecular weight (Mn) of a derivative of the polymer TMS and the curing temperature, the average molecular weight increases as the curing temperature increases and the speed of heat polymerization has remarkably increased. However, similar to the case of the quantity of the polymer formed (relatively shown by the peak surface area of the polymer), in a temperature range of 60° C. to 80° C., there is no large difference. The relationship between the total number of fine pores and the curing temperatures shown in FIG. 8 which shows that the total number of the fine pores rapidly decreases near the curing temperature of 40° C., but at the curing temperatures higher than 40° C. the rate of decrease of the total number of the fine pores becomes small. As shown in FIG. 6 to 8, it is most effective to use the curing temperature of 50 to 80° C.

Figure 9:
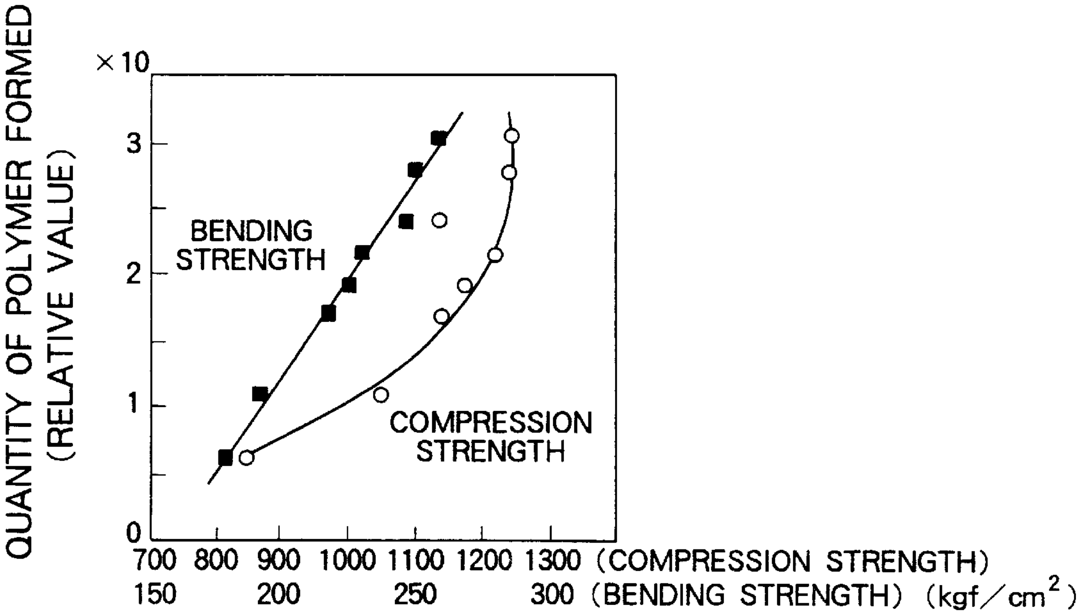
FIG. 9 is a graph showing the relationship between the compression strength and the bending strength and the quantity of polymers produced by the silicic acid derivatives.
Figure 10:
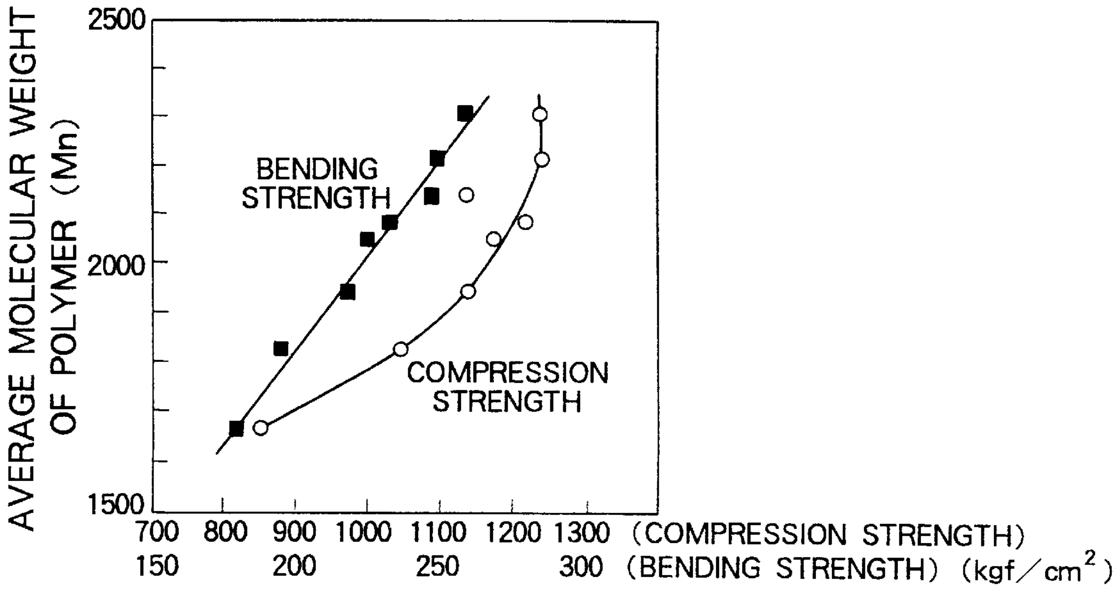
FIG. 10 is a graph showing the relationship between the compression strength and the bending strength and the average molecular weight of the silicic acid ion derivatives.
Figure 11:
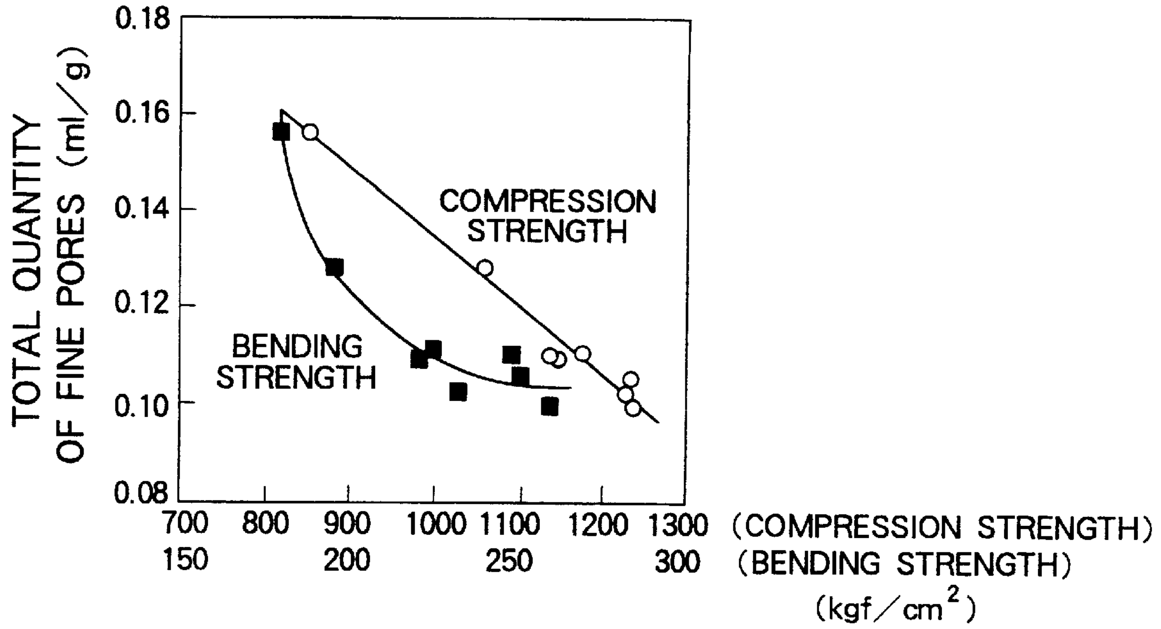
FIG. 11 is a graph showing the relationship among the compression strength, the bending strength and the total number of pores.

FIG. 9 is a graph which shows the relationship between the compression strength and the bending strength of the hardened mortar body and the quantity of polymer (represented by the peak surface area of the polymer measured by GPC) of the silicic acid anions of C—S—H. FIG. 10 is a graph showing the relationship between the average molecular weight of the polymer and the bending and compression strength. FIG. 11 shows the relationship among the compression and bending strength of the hardened concrete body and the total volume of the fine pores. As can be clearly understood from FIG. 11, although the relationship between the compression strength of the hardened and molded body and the total volume of the fine pores, that is the percentage of the hardened body varies linearly, but the bending strength varies along a curve. It is to be noted that the relation between the bending strength (most important characteristic in this invention) and the quantity of polymer of silicic acid anions of C—S—H or the average molecular weight varies lineally as shown in FIG. 9 and FIG. 10. These relationships constitute the most important factors for increasing the bending strength.

A concrete embodiment of this invention will now be described. We have used raw materials as shown in the following Table 12, and the method of admixing the raw materials is shown in Table 13. This method has already been known. However, as will be described later, the advantageous effect of this invention can be obtained by adding a quantity of water to a predetermined quantity of sand, and admixing the sand/water mixture and then kneading the admixed material. In this embodiment, silica fume was used as a typical example of the potentially hydraulic fine powder. Even when such hydraulic powder as enameled frit, a glass powder, aplite made of silicic acid rock and blast furnace fine slag. With these materials similar result can be obtained as has been clearly described in the foregoing experiment.

TABLE 12

| | |
|---|---|
| Cement | Ordinary Portland Cement manufactured by CHICHIBU CEMENT CO., LTD. |
| " | Low Heat Geneation Portland Cement manufactured by CHICHIBU CEMENT CO., LTD. |
| Sand | Land Sand passed through a 2.5 mm sieve and worked at Kashima |
| Admixed Material | Fumed Silica, Fine Slag, Fly Ash of fine particles |
| Water Reducing Agent | FC 1790 (manufactured by FLUISAWA PHARMACEUTICAL) |
| Emulsion | PAC 172C (manufactured by LION CO., LTD.) |

TABLE 13

| | |
|---|---|
| 0 second | 23% of water was added to sand and the mixture was kneaded and admixed |
| 60 seconds | cement was added |
| 120 seconds | water reducing agent was added |
| 300 seconds | keading was completed |

Figure 12:
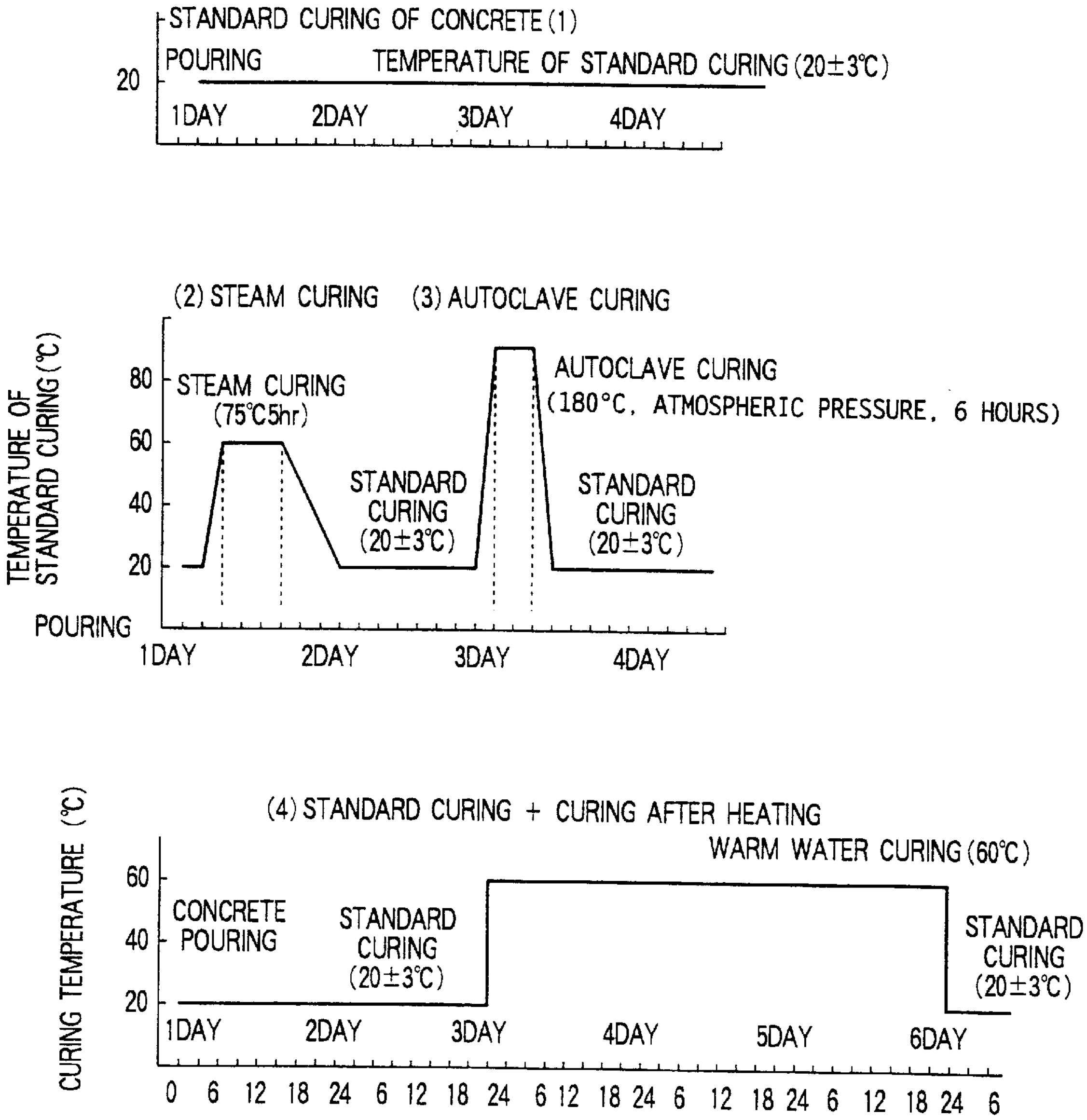
FIG. 12 encompass three graphs showing the progression of various curing steps.

These raw materials were admixed together and the mixture thus prepared was cured under various conditions shown in FIG. 12, in which (1) shows the standard curing, (2) shows the steam curing, (3) shows the autoclave curing, and (4) shows the standard curing and the curing after heating.

Embodiment 1

A low heat generating cement and an ordinary cement were used. The water/cement ratio was adjusted to be 23 to 30. To the water cement mixture was added 10% by weight of silica fume. The admixed and kneaded mixture having a sand/cement ratio of 1.5 was molded. After subjecting the molded body to a standard curing for 2 days, the cured body was further cured in warm water for 3 days. The mechanical strength of the cured body was measured 7 days after the curing, and the results of measuring are shown in the following Table 14.

TABLE 14

| W/C | | Added with 10% of Fumed Silica 23% | 25% | 27% | 30% |
|---|---|---|---|---|---|
| Low | Bend. | 214.8 | 215.8 | 202.2 | 158.7 |
| | Comp. | 1291.7 | 1388.3 | 1143.0 | 1018.1 |
| Ordinary | Bend. | 253.0 | 232.4 | 223.4 | 205.8 |
| | Comp. | 1339.6 | 1311.6 | 1270.9 | 1074.4 |

Notes
Low: Low Heat Generating Cement;
Ordinary: Ordinary Cement;
Standard Curing for 2 days; and Cured in Hot Water of 60° C.;
Bend.: Bending Strength; and
Comp.: Compression Strength It was confirmed that the hardened concrete bodies had a bending strength of 200 kgf/cm$^2$ or more and a compression strength of 1000 $kgf/cm^2$ or more except a case wherein the concrete hardened body whose water/concrete ratio was made to be 30.

Embodiment 2

In the same manner as in embodiment 1, the W/C ratio was selected to be 25, the percentage of silica fume was selected to be 10% and the sand/cement ratio was selected to be 1.5. The mortar obtained by admixing these ingredients, low heat generating cement or an ordinary cement was kneaded and mixed together. Test pieces of hardened cement bodies each having a dimension of 4×4×16 cm were prepared using these mortars. Coagulation tests these mortars were made according to the proctor penetration test as follows.

Mortar was poured into a vessel having a diameter of 16 cm and a height of 15 cm, to a depth of about 14 cm. Thereafter, a rod having a diameter of 1.6 cm was pierced 25 times into the mortar and the side surface of the vessel was struck with a slight force using the rod for rendering the surface of the sample to be horizontal. Then needles having 1, ½, ¼, 1/10, 1/40 $in^2$ respectively were attached to the fore end of a proctor penetration testing member which the needles were successively changed according to the degree of hardening of the mortar. The speed of penetration of the needle was one inch per 10 seconds. The force of penetration was measured. The value obtained by deciding the cross-sectional area of the needle with a predetermined area (penetration resistance (Psi)) was measured. The time when the penetration resistance has reached to 500 (Psi) is generally termed as the starting time, whereas, the time when the penetration resistance reached to 4000 (Psi) is deemed as the terminating point of the coagulation.

In the above described tests wherein the cement used is an ordinary portland cement, the termination of coagulation occurred 8 hours later. In the case of using a low heat generating cement the coagulation was terminated after 14 hours. Immediately after the termination of the coagulation of ordinary cement and low heat generating cement the steam curing at 60° C. was started. The heat curing was continued for 3 days. More particularly, in the case of using the ordinary Portland cement, 8 hours after forming the test piece, the test piece was subjected to the standard curing followed by the heat curing at 60° C. for 3 days. On the other hand, the low heat generating cement was subjected to the standard curing for 14 hours and then heat cured for 3 days of 60° C. As a comparative example, the heat curing was started from a point at which the penetration resistance is less than 4000 (Psi), for example 2000 (Psi). More particularly, in the case of ordinary portland cement, the heat curing effected at 60° C. was started about 5 hours after the test piece was prepared, whereas in the case of the low heat generating cement the heat curing of 60° C. was started, about 10 hours after the test piece was prepared. These heat curing were continued for 3 days. The results of measurements are shown in the following Table 15 which also shows the results of the measurement of the mechanical strength of the test pieces of the embodiment 1 which have been subjected to the standard curing for one day followed by the heat curing.

TABLE 15

| Type of Mortar | Heat Curing Starting Time | Strength ($kgf/cm^2$) Comp. | Bend. | |
|---|---|---|---|---|
| Mortar utilizing ordinary Portland cement W/C: 25% S/a: 1.5 Fumed Silica: 10% | 5 hours | 1230 | 156 | Started 60° C. curing (3 days) from 2000 psi (before termination of coagulation) |
| | 10 hours | 1275 | 206 | Started 60° C. curing (3 days) from 4000 psi (before termination of coagulation) |
| | 24 hours | 1312 | 232 | Started 60° C. curing (3 days) after standard curing for one day |
| Mortar utilizing low heat generating cement W/C: 25% S/a: 1.5 Fumed Silica: 10% | 10 hours | 1295 | 175 | Started 60° C. curing (3 days) from 2000 psi (before termination of coagulation) |
| | 14 hours | 1345 | 202 | Started 60° C. curing (3 days) from 4000 psi (before termination of coagulation) |
| | 24 hours | 1388 | 216 | Started 60° C. curing (3 days) after standard curing for one day |

As can be noted from Table 15 the advantageous effect of this invention can be attained by effecting heat curing for an appropriate period after termination of the coagulation of the heat cured cement. After treatment of the mortar, the mechanical strength of the hardened cement was increased. It is advantageous to effect one day standard curing after termination of the coagulation.

Embodiment 3

After preparing a mortar having a water/cement ratio of 27, instead of the silica fume, 10%, 15% and 20% of a fine slug on the quantity of cement were added to the mortar, and the mortar mixture was subjected to the standard curing for one day in the same manner as in the embodiment 1. Then the hardened cement body was cured for 3 days in warm water at 50° C., 60° C. and 80° C. respectively. The cured cement mortar bodies had a bending strength of 200 $kgf/cm^2$ or more and a compression strength of 1000 $kgf/cm^2$.

Embodiment 4

Cement bodies prepared by adding 10% of silica fume to ordinary cement to prepare mixture having a S/C ratio of 1.0 and a W/C ratio of 18 to 25. The cement mortar bodies were subjected to the standard curing for 2 days in the same manner as in embodiments 1 and 2. Then the cement bodies were immersed in warm water at 60° C. for 3 days for effecting warm water curing. The bending strength and the compression strength of the cured cement bodies are shown in the following Table 16.

TABLE 16

Unit of bending strength and compression strength: $kgf/cm^2$

| W/C | 18% | 19% | 21% | 23% | 25% |
|---|---|---|---|---|---|
| bending strength | 271.3 | 235.8 | 264.7 | 228.0 | 207.2 |
| compression strength | 1389.1 | 1188.5 | 1351.1 | 1251.5 | 1004.7 |

As shown in Table 16, all hardened cement mortar bodies had a bending strength of higher than 200 $kgf/cm^2$ and a compression strength of higher than 1000 $kgf/cm^2$. In the cement mortar bodies having a W/C ratio of 19, it seems that the crystal growth was impaired by a certain unknown factor. Generally stated, mortar product having a W/C ratio of 18 to 21 has a high bending strength and a high compression strength.

Embodiment 5

Cement concrete bodies marked with P-0, S-5, S-10 and S-15 respectively shown in the following Table 17 having a desired slump value of 5 cm and containing an air quantity of 2% and a water/cement ratio of 33 were prepared. And the concrete was prepared by mixing mortar, and then kneading and mixing adding a coarse aggregate. Some concrete bodies admixed with 5 to 15% of silica fume and another concrete not admixed with the silica fume. Test pieces having a dimension of a diameter of 10 cm and a length of 200 cm were manufactured from these concrete.

TABLE 17

| Mark | Slump (cm) | Air quantity (%) | W/C ratio | S/A ratio | Unit quantity ($kgf/cm^2$) Unit water quantity | Cement | Fumed silica | fine aggregate | coarse aggregate | Mixing agent |
|---|---|---|---|---|---|---|---|---|---|---|
| P-0 | 5 ± 2 | 2 | 33 | 40 | 152 | 460 | — | 713 | 713 | 4.6 |
| S-5 | " | " | 31 | 40 | 145 | 438 | 23 | 718 | 718 | " |
| S-10 | " | " | 29 | 40 | 135 | 413 | 46 | 726 | 726 | " |
| S-15 | " | " | 28 | 42 | 130 | 393 | 69 | 765 | 765 | " |

Test pieces obtained by the method described above were subjected to:

1. standard curing as shown in FIG. 12—(2);
2. steam curing followed by autoclave curing as shown in FIG. 12—(3); and
3. standard curing for 3 days followed by warm water curing at 60° C.

The compression strength and the bending strength of the test pieces which have been elapsed 28 days after preparation were measured. The results of measurement are shown in the following Table 18.

TABLE 18

| mark | fumed silica (%) | slump (cm) | air quantity (%) | result of measurement of strength ($kgf/cm^2$) (1) Comp. | (1) Bend. | (2) Comp. | (2) Bend. | (3) Comp. | (3) Bend. | (4) Comp. | (4) Bend. |
|---|---|---|---|---|---|---|---|---|---|---|---|
| P-0 | — | 6.5 | 1.9 | 568 | 57.3 | 516 | 59.4 | 837 | 79.0 | 842 | 76.3 |
| S-5 | 5 | 7.5 | 1.7 | 783 | 58.4 | 711 | 68.7 | 793 | 71.3 | 968 | 123.6 |
| S-10 | 10 | 8.0 | 1.6 | 794 | 59.2 | 724 | 69.5 | 833 | 72.5 | 995 | 135.2 |
| S-15 | 15 | 9.8 | 1.7 | 812 | 65.6 | 755 | 78.3 | 834 | 76.8 | 952 | 128.5 |

(1) standard curing
(2) steam curing
(3) autoclave curing
(4) standard and heat curing As shown in Table 17, concrete bodies to which the coarse aggregate was added in a quantity of more than 1000 $kg/m^3$, were manufactured by the method of this invention. Among these concrete bodies those marked with S-5, S-10 and S-15 respectively and subjected to the standard and heat curing had a bending strength of higher than 120 $kgf/cm^2$ and a compression strength of higher than 950 $kgf/cm^2$. Thus it is clear that these concrete bodies have excellent mechanical strength. But the concrete bodies other than those described just before has a bending strength of less than 80 $kgf/cm^2$ and a compression strength of 500 to 850 $kgf/cm^2$. So, it was found that the mechanical strength, especially the bending strength of the concrete body having the same composition has been appreciably increased.

Other properties of the test pieces P-0, S-5. S-10 and S-15 were measured and the results of measurement are shown in the following Table 19.

TABLE 19

| | | physical properties | | | | | | | | | | | |
|---|---|---|---|---|---|---|---|---|---|---|---|---|---|
| | fumed silica | (1) | | | (2) | | | (3) | | | (4) | | |
| mark | (%) | (a) | (b) | (c) | (a) | (b) | (c) | (a) | (b) | (c) | (a) | (b) | (c) |
| P-0 | — | 3.4 | 0.08 | 6.1 | 3.5 | 0.06 | 5.3 | 4.3 | 0.04 | 3.86 | 3.9 | 0.06 | 4.53 |
| S-5 | 5 | 3.6 | 0.07 | 6.2 | 3.7 | 0.05 | 4.6 | 5.1 | " | 3.11 | 4.8 | 0.03 | 1.89 |
| S-10 | 10 | 3.7 | 0.06 | 6.3 | 3.8 | " | 4.2 | 5.3 | 0.03 | 3.25 | 5.3 | 0.02 | 1.55 |
| S-15 | 15 | 3.8 | 0.07 | 6.1 | 3.6 | " | 4.7 | 5.2 | 0.33 | 3.58 | 5.2 | 0.01 | 1.24 |

(1) standard curing
(2) steam curing
(3) autoclave curing
(4) standard and heat curing
(a) modulus of elasticity (x $10^5$)
(b) percentage of shrinkage (%)
(5) (c) percentage of water absorption (%)

Test pieces marked with S-5, S-10 and S-15 respectively, and subjected to the standard and heat curing have a percentage of water absorption of less than 2%. However test pieces marked with P-0 have a percentage of water absorption of 3 to 6.3% or at least less than ½. Generally, the percentage of water absorption has been described to less than ⅓. The percentage of shrinkage was less than 0.03%, meaning a large decrease.

Such decrease of the percentage of water absorption and the percentage of shrinkage can also be obtained in the case of concrete, paste and mortar of the type described above.

Embodiment 6

Figure 13:
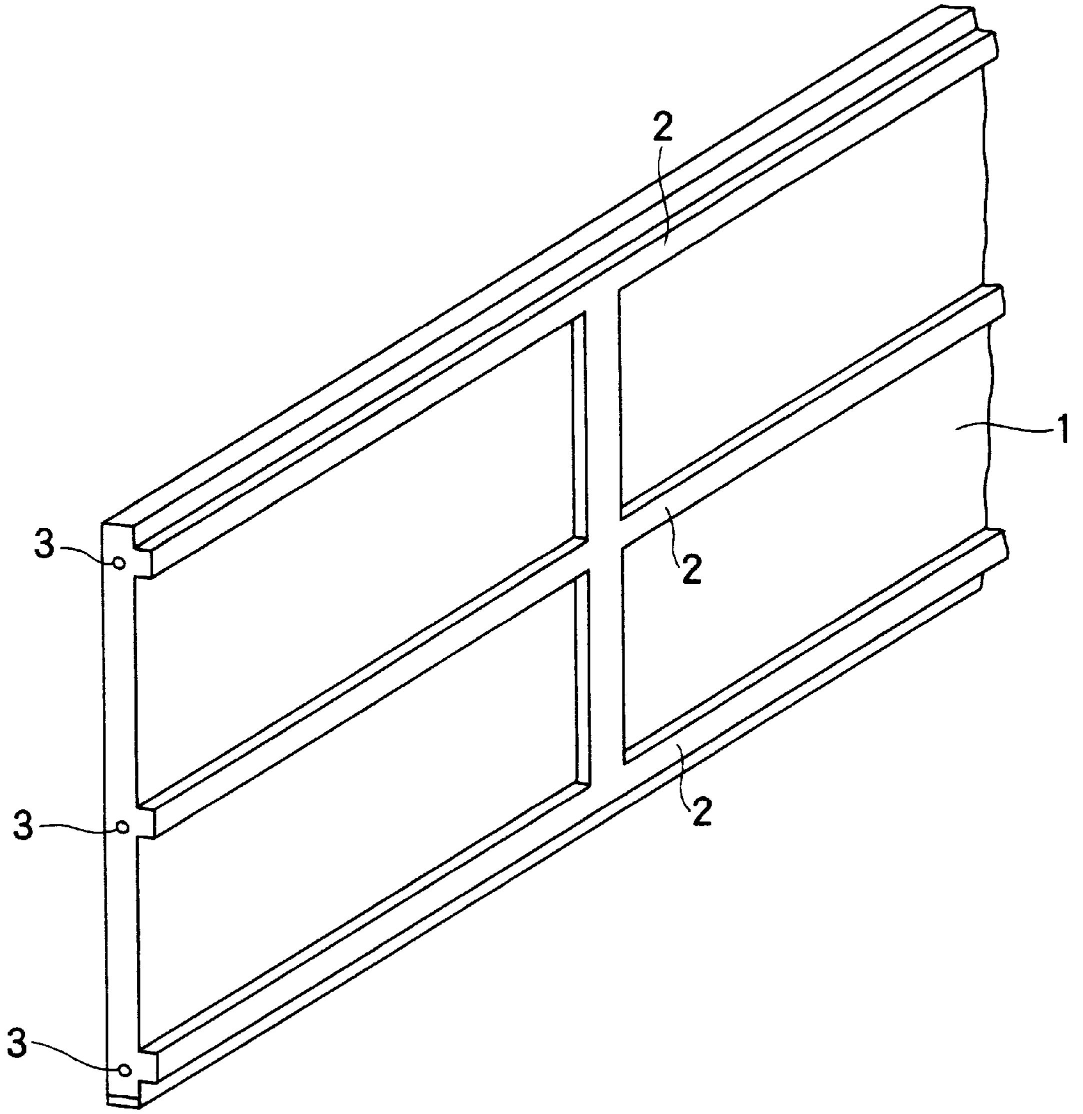
FIG. 13 is a perspective view, partly cut away, showing one example of a molding frame manufactured by the method of this invention

Sand was mixed into ordinary Portland cement at a sand/cement (S/C) ratio of 1.5. Further, 10% of silica fume was added. Then the water/cement (W/C) ratio was adjusted to 21 and a mixed and kneaded mortar was obtained. By using this mortar a mold frame plate as shown in FIG. 13 and having a thickness of 8 mm, width of 300 mm and a length of 1800 mm was manufactured. On one surface of the mold frame plate 1 was formed 3 ribs 2 each having a width of 10 mm and a height of 5 mm. Iron bars 3 were embedded in the mold frame plate 1 which is reinforced by the ribs 2. The embedded iron bars 3 increase the bonding force between them and the concrete or mortar poured into the molding box.

The hardened concrete body was manufactured by a method comprising the steps of molding the cement mixture in a molding box, releasing the molded cement body from the molding box and warm water curing at 60° C. for 72 hours. The weight of one molding frame plate is about 12 kg. The molding frame plate does not break during handling. When a required number of plates are combined to assemble a molding box can be used after pouring the concrete mixture into the molding box. After coagulation of the poured concrete it can be used for constructing a building without releasing the molding box from the hardened concrete body. This method not only makes it unnecessary to use the prior art molding box utilizing wood or metal, but also makes it possible to construct a building or the like by using the cement type members or material.

According to this invention there is an advantage of using a molding body filled with a hardened concrete body for constructing a building or the like. Further, as it is not necessary to release the hardened concrete body from the molding box, the cost of constructing building or the like can be greatly decreased.

Embodiment 7

The advantage of this invention obtained by numerous experiments described above can also be obtained in a case wherein another mortar is used. A bonding mixture was prepared by admixing a quantity of Portland cement (C) with 10% of silica fume. To 1 weight part of this bonding agent were added 0.3 weight part of water, 1.25 weight parts of sand and 0.04 weight part of a water reducing agent. The mixture of these raw materials were admixed and kneaded for 5 minutes in a mixer to obtain a mortars. The measured flow value of the resulting mixture was 139 mm. By using the mortar, test pieces for testing the mechanical strength of the hardened cement body were prepared, each test piece having a dimension of 4×4×16 cm. The test pieces were cured in wet air at 20° C. The next day, the cured test piece were released from the molds. Immediately thereafter the test pieces were subjected to a standard curing in water at 20° C. A certain number of the test pieces were cured with the standard curing at a time later than one week and four weeks, respectively and the mechanical strength of these test pieces were measured.

Figure 14:
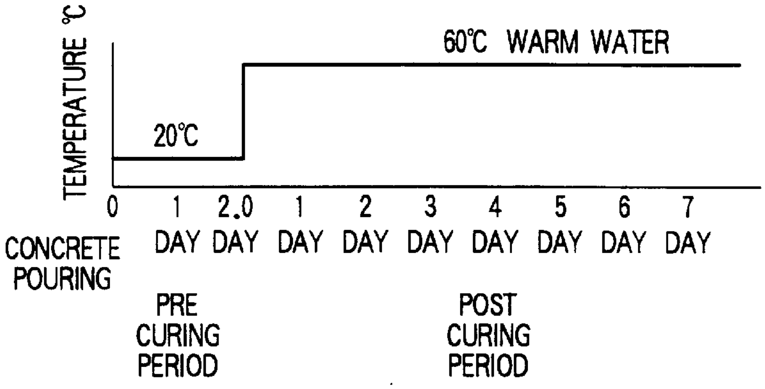
FIG. 14 is a graph showing one example of the curing step according to this invention

The remaining test pieces thus obtained were subjected to a secondary or post curing in warm water at 60° C., 2 days after the pre-curing as shown in FIG. 14. The secondary curing was carried out for 1 to 8 days. Thereafter, the test pieces were subjected to the standard curing in water at 20° C. The mechanical strength of the cured test pieces and a comparative test piece (L2dF) were measured. The results of measurement are shown in the following Table 20. The comparative test piece subjected to the standard curing had a bending strength of 143 kgf/cm$^2$ after one week, and 145 kgf/cm$^2$ after 4 weeks. However, the test pieces of this invention had a bending strength of 200 kgf/cm$^2$ after the secondary curing of only one day and the bending strength had been increased to about 200 kgf/cm$^2$ after 4 weeks.

TABLE 20

Unit of bending strength and compression strength: kgf/cm$^2$

| test piece | composition | | | water reducing | flow | one week strength | | four weeks strength | |
|---|---|---|---|---|---|---|---|---|---|
| curing | silica/C | S/C | W/C | agent | (nm) | bending | compression | bending | compression |
| L2dH1dST | 10 | 1.25 | 20 | 4% | 139 | 200 | 1009 | 196 | 1306 |
| L2dH2dST | " | " | " | " | " | 195 | 1346 | 205 | 1270 |
| L2dH3dST | " | " | " | " | " | 213 | 1293 | 230 | 1342 |
| L2dH4dST | " | " | " | " | " | 237 | 1386 | 266 | 1476 |
| L2dH5dST | " | " | " | " | " | 266 | 1383 | 287 | 1503 |
| L2dH6dST | " | " | " | " | " | 265 | 1393 | 281 | 1510 |
| L2dST | " | " | " | " | " | 143 | 950 | 145 | 1118 |

Note
L: 20° C. wet air curing
H: warm water curing
ST: standard curing
d: day

Figure 15:
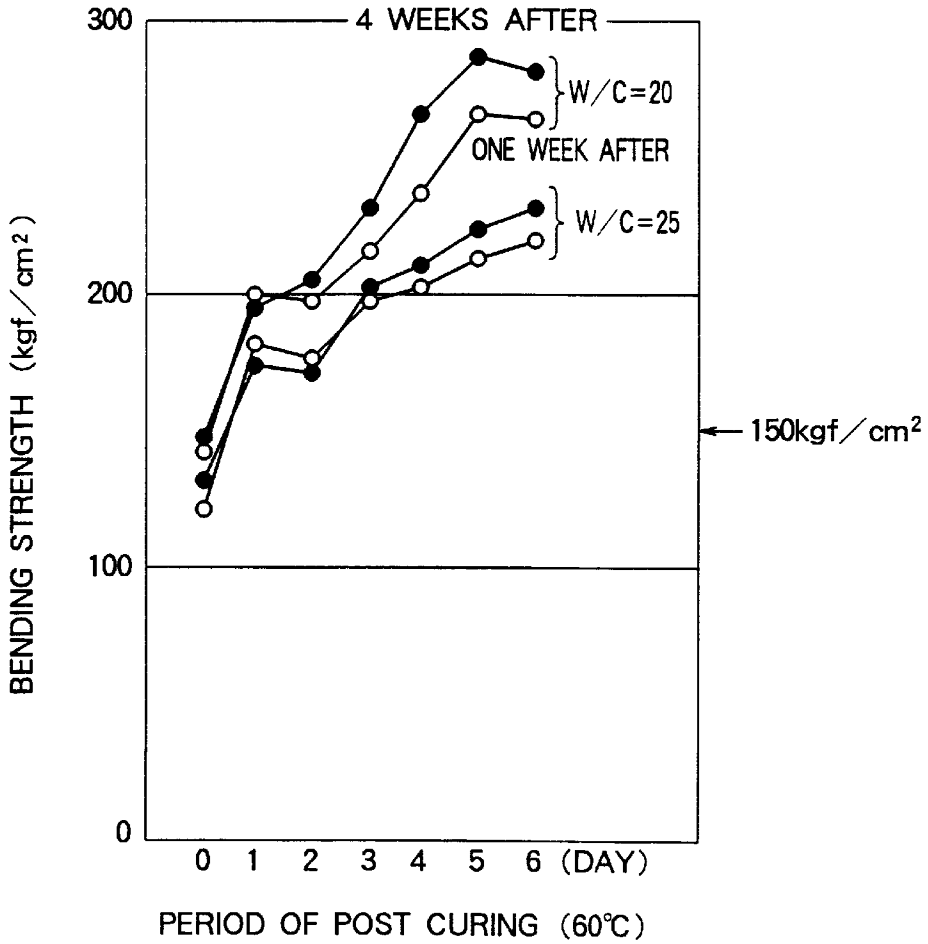
FIG. 15 is a graph showing the relationship between the bending strength of a molded and hardened body obtained by the curing step shown in FIG. 14 and the secondary curing period(days) performed at a temperature of 60° C.

Test pieces subjected to the secondary curing for 3 days had a bending strength of 211 kgf/cm$^2$ one week later, and the bending strength of 231 kgf/cm$^2$ four weeks later. The test piece subjected to the secondary curing for 4 days had a bending strength of 280 to 285 kgf/cm$^2$ 4 weeks later. The test piece had a bending strength of 270 kgf/cm$^2$ one week later. The relationship between the secondary curing period (days) and the bending strength is shown in FIG. 15.

Embodiment 8

To one weight part of the same binder (silica/C=10%) as that used in embodiment 7 was admixed with 0.25 weight part of water. Further, sand of 1.5 weight parts was added. Quantities of the water reducing agent and others had the same quantity for above described test pieces. The mixtures thus prepared was mixed together and kneaded for 5 minutes by using the same mixer. The flow value of the resulting mixture was 196. This mortar was used to prepare test pieces for measuring the mechanical strength, each test piece having a dimension of 4×4×16 cm. The test pieces were cured in wet air at 20° C. And 24 hours later, the test pieces were released form the molds. Immediately thereafter, released test pieces were subjected to the standard curing in water at 20° C. Several test pieces subjected to the standard curing were further cured for one week and 4 weeks respectively and their mechanical strength were measured. Remaining test pieces were divided into four groups. In the same manner as above described, these test pieces were cured in warm water starting from 2 days after pouring. The periods of the secondary curing in warm water were selected as 3 days, 4 days, 5 days, and 6 days respectively. Thereafter, the test pieces were subjected to the standard curing in water at 20° C. The mechanical strength of the test pieces after 1 week and 4 weeks were measured, and the results of measurement are shown in the following Table 21.

TABLE 21

Unit of bending strength and compression strength: kgf/cm$^2$

| test piece | composition | | | water reducing | flow | one week strength | | four weeks strength | |
|---|---|---|---|---|---|---|---|---|---|
| curing | silica/C | S/C | W/C | agent | (mm) | bending | compression | bending | compression |
| L1dH3dST | 10 | 1.5 | 25 | 4% | 196 | 195 | 1173 | 202 | 1180 |
| L1dH4dST | " | " | " | " | " | 203 | 1123 | 211 | 1198 |
| L1dH5dST | " | " | " | " | " | 213 | 1126 | 225 | 1231 |
| L1dH6dST | " | " | " | " | " | 219 | 1191 | 231 | 1250 |

Note
L: 20° C. wet air curing
H: warm water curing
ST: standard curing in water at 20° C.
d: day As shown in Table 21, the quantity of added sand is 1.5 times larger than that of cement, which is larger than that of the previous embodiment and the quantity of added water is also large. In this embodiment too, the compression strength at 1 week and 4 weeks later are larger than 1100 kgf/cm$^2$ and the bending strength is larger than 200 kgf/cm$^2$. These mortars subjected to warm water curing were found to have large mechanical strength and to be desirable for concrete structure.

Embodiment 9

The concrete was prepared by using a composition containing a fine aggregate (the ratio (S/A) of sand and aggregate is 45), a quantity of water (the ratio of water and cement (W/C) is 25), silica fume acting as the potentially hydraulic fine powder (the ratio of the fumed silica and cement is 15%). Then the composition was mixed with a forced mixer for 5 minutes. The slump of fresh concrete was 24 cm and the containing air was 20%. The fresh concrete was poured or casted into mold frames to obtain a cylindrical test piece having a diameter of 10 cm and a length of 20 cm, and to obtain square test piece having a dimension of 10×10 ×40 cm. Hardened concrete test pieces were released from the mold frames one day later. A certain number of the molded test pieces were subjected to the primary standard curing (L1d) for one day in water at 20° C., and the remaining test pieces (divided into groups) were subjected to the standard curing. Two days after curing, test pieces of respective groups were subjected to the secondary heat curing (H1d to H4d) in warm water at 60° C. for one to four days and then again subjected to the standard curing in water at 20° C. The mechanical strength of respective test pieces was measured. The strength of the test pieces in the form of square rods was measured one week after preparation of the test piece, whereas the strength of the test pieces in the form of circular rods was measured four weeks after preparing the test pieces. The results of measurement are shown in the following Table 22.

TABLE 23

| test piece | bending strength | compression strength |
|---|---|---|
| L2d | 142 kgf/cm$^2$ | 1427 kgf/cm$^2$ |
| L3d | 161 kgf/cm$^2$ | 1480 kgf/cm$^2$ |
| L4d | 165 kgf/cm$^2$ | 1498 kgf/cm$^2$ |

Note
L: wet air curing at 20° C.
d: day

In a hardened concrete body, by elongating the period of the primary curing (standard curing in water at 20° C.) the bending strength of about 150 kgf/cm$^2$ was obtained after 4 weeks, but this value is slightly lower than that shown in Table 22. In this embodiment, however, a compression strength of higher than 1400 kgf/cm$^2$ was obtained after 4 weeks. This value of the compression strength is higher than that shown in Table 22 by more than 200 kgf/cm$^2$. The test result of this embodiment shows that for increasing the compression strength while maintaining the bending strength level to 150 kgf/cm$^2$, it is necessary to elongate the period of the primary curing which is the standard curing in water at 20° C. Most suitable primary curing period is 3 to 5 days.

TABLE 22

| test piece | composition | | | | | one week strength | | four weeks strength | |
|---|---|---|---|---|---|---|---|---|---|
| curing | silica/C | S/C | W/C | water reducing agent | slump | bending | compression | bending | compression |
| L1dH1dST | 10 | 45 | 25 | 4% | 24 | 129 | 1037 | 141 | 1140 |
| L1dH2dST | " | " | " | " | " | 156 | 1297 | 152 | 1227 |
| L1dH3dST | " | " | " | " | " | 161 | 1178 | 181 | 1180 |
| L1dH4dST | " | " | " | " | " | 172 | 1128 | 201 | 1198 |
| L1dH5dST | " | " | " | " | " | 180 | 1126 | 225 | 1231 |
| L1dH6dST | " | " | " | " | " | 179 | 1191 | 221 | 1250 |
| L1dH7dST | " | " | " | " | " | 178 | 1182 | 220 | 1255 |
| L1dH8dST | " | " | " | " | " | 177 | 1156 | 211 | 1245 |
| L1dH9dST | " | " | " | " | " | 64 | 845 | 73 | 1020 |

Note
L: wet air curing at 20° C.
H: warm water curing at 60° C.
ST: standard curing in water at 20° C.
d: day By subjecting the test pieces to the secondary curing, the compression strength after one week was increased with about 200 kgf/cm$^2$ stronger by one day, whereas the bending strengths after one week and four weeks respectively were increased by about twice times. By subjecting the test pieces to the secondary curing for less than 2 to 5 days, the bending strength was substantially the same as its maximum value. We have confirmed that the bending strength of the hardened concrete body was increased by about 3 times as that of the concrete body not subjected to the secondary curing. We have noted that the most suitable curing period is 5 to 7 days.

In a hardened concrete body having the same composition shown in Table 22, the period of primary curing, that is the standard curing in water at 20° C. was elongated to 2 to 4 days (L2d to L4d) and the secondary curing was the same as that described in the foregoing embodiments. More particularly, the secondary curing was performed for 3 days in hot water of 60° C. The measured bending strength and compression strength of the test pieces are shown in the following table 23.

Embodiment 10

We have also investigated the conditions of manufacturing the hardened concrete body of this invention which has excellent mechanical strength. Suitable conditions are as followed: 15% by weight of silica fume is added to Portland cement. The ratio of sand to coarse aggregate (S/A) is 45%, the water to cement ratio (W/C) is selected to be 20%, and the quantity of the water reducing agent is selected to be 4% of the quantity of cement of the concrete body. These agents were admixed and kneaded to obtain a mortar having a slump of 24 cm. Then the mortar was molded and hardened to obtain a hardened concrete body. The hardened cement body thus obtained was subjected to the standard or primary curing for 1 to 4 days in water at 20° C. and then subjected to the secondary curing in warm water at 60° C. for 4 days followed by the standard curing in water at 20° C. The mechanical strength of the hardened concrete body thus obtained was measured after one week and 4 weeks respectively. The results of measurements are shown in Table 24. The most suitable secondary curing period of this embodiment was 3 to 4 days.

TABLE 24

| Unit of bending strength and compression strength: kgf/cm² | | | | | | | | | |
|---|---|---|---|---|---|---|---|---|---|
| | composition | | | | | | | | |
| test piece | | | | water reducing | | one week strength | | four weeks strength | |
| curing | silica/C | S/C | W/C | agent | slump | bending | compression | bending | compression |
| L1dH4dST | 15 | 45 | 20 | 4% | 24 | — | 1057 | 201 | 1340 |
| L2dH4dST | " | " | " | " | " | — | 1299 | 222 | 1427 |
| L3dH4dST | " | " | " | " | " | — | 1373 | 241 | 1680 |
| L4dH4dST | " | " | " | " | " | — | 1423 | 245 | 1198 |

Note
L: 20° C. wet air curing
H: warm water curing
ST: standard curing in water at 20° C.
d: day In this embodiment, the hardened concrete has bending strength of 200 kgf/cm$^2$ or more and a compression strength of 1300 kgf/cm$^2$ to 1700 kgf/cm$^2$. These high mechanical strengths are extremely advantageous to the concrete body that can be manufactured at low cost.

Embodiment 11

Mortar containing silica fume of the quantity of 12% of cement, water/cement ratio of 20%, and 4% of water reducing agent was prepared, the mortar having a flow value of 110 cm. The mortar was molded and hardened, and the hardened cement body was subjected to the standard curing, that is the primary curing for 1 to 3 days and then to the secondary curing in warm water at 60° C. Thereafter, the cement body was subjected to the standard curing in water at 20° C. The mechanical strength was measured after 1 week and 4 weeks respectively. The results of measurement are shown in the following Table 25.

The bending strengths of respective test pieces of this mortar were higher than 230 kgf/cm$^2$ and farther, the compression strength were 1240 kgf/cm$^2$ to 1340 kgf/cm$^2$ which are comparable of the strength of the cement type hardened body. The appropriate primary curing period is 2 days.

Embodiment 12

Another embodiment of this invention utilizing a cement paste of this invention will be described as following. 10% by weight of silica fume was added to cement. Water and cement at a ratio of 25% and 2% of a water reducing agent were used. These ingredients were mixed together to obtain a cement paste. A molded body of the cement paste was subjected to the primary curing for 4 to 6 hours and then subjected to the secondary curing in warm water at 60° C. for 4 days. Then the cured molded body, and the mechanical strengths of the cured molded body were measured. The results of measuring are shown in the following Table 26.

TABLE 25

| Unit of bending strength and compression strength: kgf/cm² | | | | | | | | | |
|---|---|---|---|---|---|---|---|---|---|
| | composition | | | | | | | | |
| test piece | | | | water reducing | | one week strength | | four weeks strength | |
| curing | silica/C | S/C | W/C | agent | flow | bending | compression | bending | compression |
| L1dH5dST | 12 | 1.25 | 20 | 4% | 110 | 292 | 1242 | 229 | 1261 |
| L2dH5dST | " | " | " | " | " | 296 | 1301 | 278 | 1341 |
| L3dH5dST | " | " | " | " | " | 250 | 1219 | 243 | 1341 |

Note
L: wet air curing at 20° C.
H: warm water curing
d: day
ST: standard curing in water at 20° C.

TABLE 26

| Unit of bending strength and compression strength: kgf/cm² | | | | | | | | | |
|---|---|---|---|---|---|---|---|---|---|
| | composition | | | | | | | | |
| test piece | | | | water reducing | | one week strength | | four weeks strength | |
| curing | silica/C | S/C | W/C | agent | flow | bending | compression | bending | compression |
| L4hH3dST | 10 | 0 | 25 | 2% | — | 231 | 1206 | 185 | 1253 |
| L5hH3dST | " | " | " | " | — | 225 | 1102 | 196 | 1086 |
| L6hH3dST | " | " | " | " | — | 244 | 1011 | 242 | 1201 |

Note
L: wet air curing at 20° C.
H: warm water curing
h: hour (?)
ST: standard curing in water at 20° C.

With this paste too, the bending strength was 180 to 250 kgf/cm$^2$ while the compression strength was 1000 to 1250 kgf/cm$^2$, showing that the paste products have desired mechanical strengths.

Embodiment 13

Examples of compositions utilizing the various kinds of cement embodying the invention and the measured values of the bending strength and the compression strength of these bodies are shown in the following Table 27. A bond agent of cement which added 10% weight of silica fume was prepared. Water of 0.2 weight part, sand of 1.25 weight parts, a water reducing agent of 0.04 weight part were added to the bonding agent. The resulting mixture was admixed and kneaded for 5 minutes in a mixer, and the measured value of the flow of the mixture was 136 to 182 cm as shown in the following Table 27. By using these mortar test pieces, each having a dimension of 4×4×16 cm, were prepared for measuring the mechanical strength of hardened concrete body. The test pieces were subjected to the wet air curing at 20° C. One day after, the molded test pieces were released from the molds. Immediately thereafter the test pieces were subjected to the standard curing in water at 20° C. On the next day (2 days after pouring) the test pieces were cured in warm water at 60° C. for four days. Then the test pieces were subjected to the standard curing in water at a temperature of 20° C. The bending strength and the compression strength of the test pieces were measured after one week and 4 weeks respectively. The results of measurement are shown in the following Table 27.

TABLE 27

| Unit of bending strength and compression strength: kgf/cm² | | | | | | | | | | |
|---|---|---|---|---|---|---|---|---|---|---|
| test | | composition | | | | | 1 week | | 4 weeks | |
| piece | type of | | | | water | flow | strength | | strength | |
| curing | cement | silica/C | S/C | W/C | reducing agent | (cm) | Bend. | Comp. | Bend. | Comp. |
| N-L2dH4dST | Normal Portland cement | 10 | 1.25 | 20 | 4 | 142 | 247 | 1387 | 269 | 1493 |
| A-L2dH4dST | Rapid strength Portland cement | " | " | " | " | 136 | 259 | 1473 | 289 | 1535 |
| S-L2dH4dST | Blast furnace cement (type A) | " | " | " | " | 155 | 214 | 1338 | 274 | 1503 |
| S-L2dH4dST | Blast furnace cement (type B) | " | " | " | " | 165 | 198 | 1341 | 269 | 1472 |
| S-L2dH4dST | Blast furnace cement (type C) | " | " | " | " | 169 | 183 | 1241 | 259 | 1433 |
| F-L2dH4dST | fly ash cement (type A) | " | " | " | " | 172 | 226 | 1438 | 278 | 1484 |
| F-L2dH4dST | fly ash cement (type B) | " | " | " | " | 178 | 197 | 1375 | 266 | 1462 |
| F-L2dH4dST | fly ash cement (type C) | " | " | " | " | 182 | 188 | 1332 | 257 | 1453 |

TABLE 27-continued

Unit of bending strength and compression strength: $kgf/cm^2$

| test piece curing | type of cement | composition silica/C | S/C | W/C | water reducing agent | flow (cm) | 1 week strength Bend. | Comp. | 4 weeks strength Bend. | Comp. |
|---|---|---|---|---|---|---|---|---|---|---|
| UA-L2dH4dST | extremely rapidly hardening Portland cement | 10 | 1.25 | 20 | 4.4 | 138 | 280 | 1587 | 291 | 1593 |

Note
L: wet air curing at 20° C.
d: day
H: warm water curing at 60° C.
ST: standard curing in water at 20° C.

As can be noted from Table 27, where rapidly hardened cement and extremely rapidly hardening cement are used, the bending strength is large after one week. When blast furnace cement and fly ash cement are used, the bending strength after one week is slightly lower than that of normal cement. But after 4 weeks, the bending strength becomes high irrespective of the type of cements. Especially where rapid hardening cement and extremely rapidly hardening cement are used, a slightly larger bending strength can be obtained. Bending strength after 4 weeks of respective test pieces have exceeded 250 $kgf/cm^2$. In the case of using the extremely rapidly hardening Portland cement, the bending strengths (including the strength one week later) were 290 $kgf/cm^2$.

Figure 16:
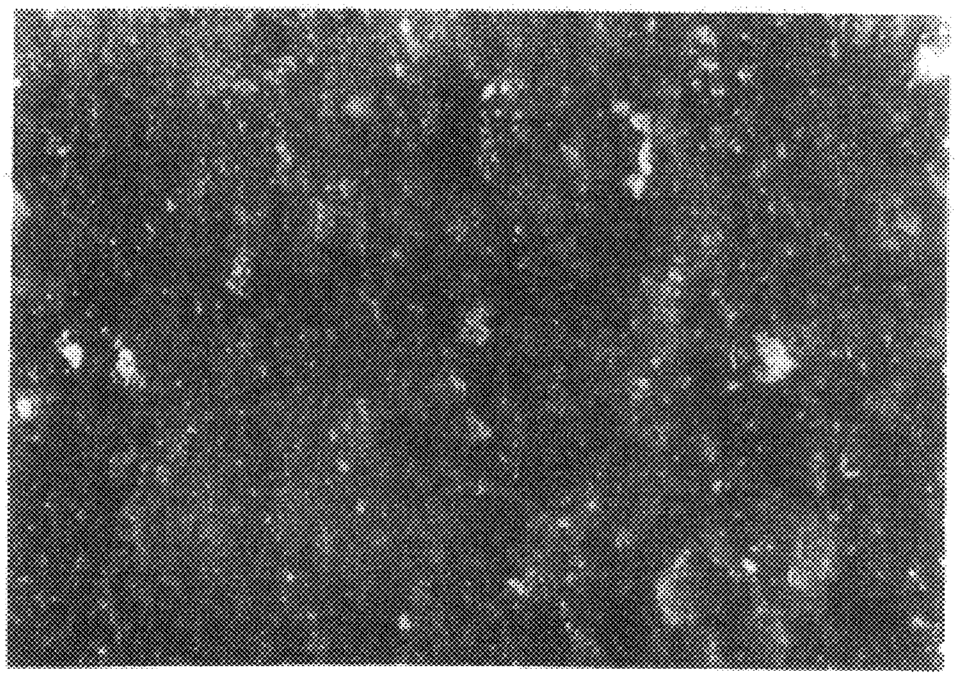
FIG. 16 is an enlarged photograph (degree of enlargement is 75) of the structure of a hardened body of the mortar shown in the embodiment No. 13 of this invention.
Figure 17:
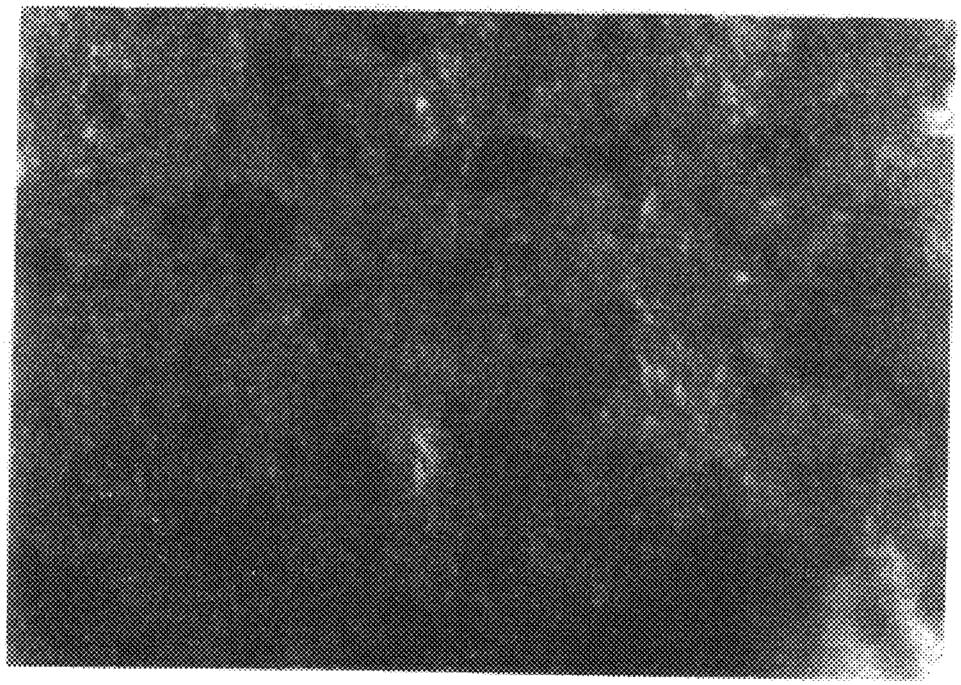
FIG. 17 is an enlarged photograph (degree of enlargement is 75) showing the structure of a hardened body according to a prior art method and using the composition shown in FIG. 16.

For comparison, another test pieces having the same composition as the test piece shown in Table 27 utilizing the normal Portland cement were prepared. The another test pieces were not cured in warm water at 60° C. After grinding the surface of these two types of the test pieces by about 2 mm, the structure of the test pieces was observed. We have found that the test pieces embodying this invention have a bright composition. FIGS. 16 and 17 show photographs of the composition of these test pieces magnified by a factor of 75 wherein FIG. 16 shows the test piece of this invention and FIG. 17 shows a prior art test piece.

More particularly, the test piece shown in FIG. 16 contains substantial quantity of the bright composition, whereas the comparative test piece shown in FIG. 17 contains substantially no bright composition. When the test piece shown in FIG. 16 is thrown against a concrete floor a metallic shock sound was produced, whereas the test piece shown in FIG. 17 created the sound of a prior art mortar molded body. These different sounds show that the test piece of two types have different characteristics.

Embodiment 14

Various experiments were made with regard to a mortar utilized to prepare rapidly hardening cement body. More particularly, 10% of silica fume was added to rapidly hardening cement to form a bonding agent. To one weight part of the bonding agent, were added 0.2 weight part of water, 1.25 weight parts of sand and 0.04 weight part of the water reducing agent, and the resulting mixture was admixed with the bonding agent. The resulting mixture was admixed and kneaded in a mixer for about 5 minutes. The measured value of the flow of the mixture thus obtained was 136 cm as shown in the following Table 28. By using this mortar hardened cement, test pieces were prepared for measuring the mechanical strength, each test piece having a dimension of 4×4×16 cm. The test piece were subjected to the curing in wet air at 20° C. One day after, the test pieces were released from the molds. Immediately thereafter, certain number of the test pieces were cured for 4 days in warm water at 60° C., and then subjected to the standard curing in water at 20° C. Remaining test pieces were subjected to the standard curing in water at 20° C. until 2 days after pouring. Then the test pieces were subjected to the warm water curing at 60° C. for 4 days. The remaining test pieces were subjected to the standard curing for 3 days after pouring. Thereafter, the test pieces were cured for four days in warm water at 60° C. followed by the standard curing in water at 20° C. The bending strength and the compression strength of the test pieces were measured, 1 week and 4 weeks respectively after preparing the test pieces. The results of measurements are shown in the following Table 28. In the case of the rapidly hardening cement, the bending strength of the test pieces, one week later than the preparation of the test pieces is high where the primary curing was executed for 2 to 3 days. The bending strength of the test pieces one week after their preparation is the highest where the primary curing was executed for only 1 day. The measured results of the mechanical strength of the test pieces, types of cements and their composition and test piece curing are shown in the following Table 28.

TABLE 28

Unit of bending strength and compression strength: $kgf/cm^2$

| test piece curing | type of cement | composition silica/C | S/C | W/C | water reducing agent | flow (cm) | 1 week strength Bend. | Comp. | 4 weeks strength Bend. | Comp. |
|---|---|---|---|---|---|---|---|---|---|---|
| N-12dH4dST | Normal Portland | 10 | 1.25 | 20 | 4 | 142 | 247 | 1387 | 269 | 1493 |

TABLE 28-continued

| Unit of bending strength and compression strength: kgf/cm² | | | | | | | | | | |
|---|---|---|---|---|---|---|---|---|---|---|
| test piece curing | type of cement | composition silica/C | S/C | W/C | water reducing agent | flow (cm) | 1 week strength Bend. | Comp. | 4 weeks strength Bend. | Comp. |
| | cement | | | | | | | | | |
| A-L1dH4dST | Rapid strength Portland cement | " | " | " | " | 136 | 255 | 1495 | 294 | 1552 |
| A-L2dH4dST | Rapid strength Portland cement | " | " | " | " | " | 259 | 1473 | 589 | 1535 |
| A-L3dH4dST | Rapid strength Portland cement | " | " | " | " | " | 263 | 1489 | 279 | 1503 |
| A-L1dH2dST | Rapid strength Portland cement | " | " | " | " | " | 241 | 1241 | 287 | 1563 |
| A-L1dH3dST | Rapid strength Portland cement | " | " | " | " | " | 248 | 1438 | 295 | 1589 |
| A-L1dH4dST | Rapid strength Portland cement | 10 | 1.25 | 20 | 4 | 136 | 255 | 1495 | 294 | 1552 |

Note
L: wet air curing at 20° C.
d: day
H: warm water curing at 60° C.
ST: standard curing at 20° C.

The test pieces were also subjected to the primary curing for one day and then subjected to the secondary curing in warm water at 60° C. for 2, 3 and 4 days respectively. The results of measurement of the mechanical strength of the test piece are shown in Table 1. We found that, in the case of the rapidly hardening cement, even when the secondary curing period is only about 2 days, high bending strength was obtained.

Embodiment 15

In this embodiment, mortars utilizing various types of fine aggregates were prepared. More particularly, a bonding agent was prepared by using a normal Portland cement added with 10 weight parts based on the quantity of the cement. Various mixtures were prepared by adding water of 0.2 weight part river sand and 0.25 weight part of crushed sand having different particle sizes and 0.04 weight part of the water reducing agent to the bonding agent. The resulting mixtures were kneaded for 5 minutes in a mixer. The flow value and the mechanical strength of the resulting mixture were measured. The results of measurement are shown in the following Table 29.

TABLE 29

| Unit of bending strength and compression strength: kgf/cm² | | | | | | | | | | |
|---|---|---|---|---|---|---|---|---|---|---|
| test piece curing | type of cement | composition silica/C | S/C | W/C | water reducing agent | flow (cm) | 1 week strength Bend. | Comp. | 4 weeks strength Bend. | Comp. |
| N-12dH4dST river sand (25 mm) | Normal Portland cement | 10 | 1.25 | 20 | 4 | 142 | 247 | 1387 | 269 | 1493 |
| A-L2dH2dST crushed sabd (0.26 mm) | Rapid strength Portland cement | " | 1.15 | " | " | 136 | 253 | 1476 | 284 | 1552 |
| A-L2dH3dST crushed sand (1.2 mm) | Rapid strength Portland cement | " | 1.05 | " | " | 145 | 261 | 1463 | 279 | 1536 |

TABLE 29-continued

Unit of bending strength and compression strength: $kgf/cm^2$

| test piece curing | type of cement | composition silica/C | S/C | W/C | water reducing agent | flow (cm) | 1 week strength Bend. | 1 week strength Comp. | 4 weeks strength Bend. | 4 weeks strength Comp. |
|---|---|---|---|---|---|---|---|---|---|---|
| A-L3dH4dST crushed sand (2 mm) | Rapid strength Portland cement | " | 1.00 | " | " | 152 | 257 | 1477 | 273 | 1512 |

Note
L: wet air curing at 20° C.
d: day
H: warm water curing at 60° C.
ST: standard curing at 20° C.

By using these hardened cement bodies test pieces were prepared for measuring the mechanical strength, each test piece having a dimension of 4×4×16 cm. These test pieces were cured in wet air at 20° C. On the next day, the test pieces were released from the molds. Immediately thereafter, the test pieces were subjected to the standard curing in water at 20° C. Starting from the next day (2 days after pouring the mortar), the test pieces were cured for 4 days in warm water at 60° C. Then, the test pieces were subjected to the standard curing in water at 20° C. The results of measurement of the bending strength and the compression strength of the test pieces, one week after and 4 weeks after preparation thereof, are also shown in Table 29. As can be noted from Table 29 the bending strength of the test pieces is higher where crushed sand is used than that where river sand is used. Anyhow, the bending strength of the test pieces was higher than 250 $kgf/cm^2$ which is about 2.5 times higher than the prior art hardened cement body.

Embodiment 16

For the purpose of preparing concrete utilizing normal cement, 45% by the ratio of fine aggregate and aggregate, water cement ratio is 20% were used. The resulting mixture was mixed together. Then the silica fume acting as the potentially hydraulic fine powder was added, the quantity thereof being 10% by weight of the cement. Above described ingredients, and a quantity of coarse aggregate were admixed and kneaded in the forced mixer for 5 minutes to obtain concrete containing 2 volume quantity of air and having a slump of 24 cm. The concrete having the same composition and using the rapidly hardening cement and being mixed with forced mixer had a slump of 23 cm. This concrete was poured into a molding frame and then molded for preparing cylindrical test pieces each having a diameter of 10×20 cm and a square column test pieces each having a dimension of 10×10×40 cm. On the next day, the molded test pieces were released from the molds. Certain number of the test pieces were subjected to the primary curing (Lld) in water at 20° C. for one day. Thereafter the test pieces were subjected to the secondary heat curing in water at 60° C. for 4 days (H4d) followed by the standard curing (ST) in water at 20° C. The rapidly hardening concrete was subjected to the primary curing for 2 days and 3 days respectively. The result of measurements of the mechanical strength of the rapid hardening concrete are shown in the following Table 30. As can be noted from this table, the bending strength of the rapidly hardening cement is larger than that of a normal cement. We have also noted that the primary curing of about 2 days is the most suitable.

TABLE 30

Unit of bending strength and compression strength: $kgf/cm^2$

| test piece curing | type of cement | composition silica/C | S/A | W/C | water reducing agent | slump | 1 week strength Bend. | 1 week strength Comp. | 4 weeks strength Bend. | 4 weeks strength Comp. |
|---|---|---|---|---|---|---|---|---|---|---|
| N-L1dH4dST | Normal Portland cement | 10 | 45 | 20 | 4 | 24 | 172 | 1123 | 201 | 1340 |
| A-L1dH2dST | Rapidly hardening cement | " | " | " | " | 23 | 186 | 1257 | 241 | 1443 |
| A-L12dH3dTST | Rapidly hardening cement | " | " | " | " | " | 192 | 1357 | 256 | 1540 |

TABLE 30-continued

| Unit of bending strength and compression strength: kgf/cm² | | | | | | | | | | |
|---|---|---|---|---|---|---|---|---|---|---|
| | | composition | | | | | | | | |
| test piece | type of | | | | water reducing | | 1 week strength | | 4 weeks strength | |
| curing | cement | silica/C | S/A | W/C | agent | slump | Bend. | Comp. | Bend. | Comp. |
| A-L2dH4dST | Rapidly hardening cement | " | " | " | " | " | 189 | 1257 | 237 | 1400 |

Note
L: wet air curing at 20° C.
d: day
H: warm water curing at 60° C.
ST: standard curing at 20° C.
N: normal cement
A: rapidly hardening cement As shown in this Table, the compression strength after 1 to 4 weeks of a concrete body utilizing normal Portland cement exceeded 1000 kgf/cm$^2$, and the bending strength also exceeded 170 kgf/cm$^2$. The bending strength of the test pieces after 4 weeks is 200 kgf/cm$^2$. These data show that the hardened concrete body has a high mechanical strength.

In the case of the rapidly hardening cement, the compression strength after 1 to 4 weeks of the hardened concrete body is higher than 1200 to 1500 kgf/cm$^2$ and bending strength is 180 to 260 kgf/cm$^2$. Thus, the bending strength and the compression strength of the hardened concrete body of this invention are much higher than those of a conventional concrete body. These high mechanical strengths are advantageous when the concrete are used as curtain wall members.

Embodiment 17

We have also investigated the reason of increasing the characteristic feature of this invention. At first, an example of adding less than 1% by weight of metallic powder will be described hereinafter. Test pieces of hardened concrete containing an iron powder having a size of 2 to 30 microns were formed. A certain number of the test pieces were subjected to the primary curing for 2 days followed by the standard curing. Other test pieces were subjected to the primary curing and the subjected to the secondary curing in warm water at 60° C. for 4 days. The composition and the bending strength of the test pieces are shown in the following Table 31.

TABLE 31

| Unit of bending strength and compression strength: kgf/cm² | | | | | | | | | | | |
|---|---|---|---|---|---|---|---|---|---|---|---|
| | composition | | | | | | | | | | |
| test piece | | iron | | | water reducing | | 1 week strength | | 4 weeks strength | | method of |
| curing | silica/C | powder/C | S/C | W/C | agent | flow | Bend. | Comp. | Bend. | Comp. | curing |
| L2d-ST | 0 | 0 | 1.25 | 20 | 4% | 142 | 83 | 532 | 135 | 922 | normal curing |
| L2dH4dST | 0 | 0 | " | " | " | 142 | 121 | 346 | 137 | 1018 | warm water curing |
| L2d-ST | 10 | 0 | " | " | " | 156 | 91 | 639 | 151 | 1064 | normal curing |
| L2dH4dST | 10 | 0 | " | " | " | 156 | 238 | 1294 | 258 | 1433 | warm water curing |
| L2d-ST | 10 | 0.30 | " | " | " | 139 | 112 | 850 | 173 | 1251 | normal curing |
| L3dH4d | 10 | 0.30 | " | " | " | " | 282 | 1483 | 292 | 1591 | warm water curing |

Note
iron powder: Fe powder of 2 to 30 μm
L: 20° C. wet air curing
d: day
H: 60° C. warm water curing
ST: curing in water at 20° C.

In a case wherein either silica fume and iron powder is not used, even when the warm water curing (60° C., 4 days) was performed, the maximum bending strength is 137 kgf/cm$^2$ which is lower than 150 kgf/cm$^2$. In contrast, where 10% of the silica fume was added to the cement and the mixture was then subjected to the wet air curing at 20° C. for 2 days, the bending strength was increased to 150 kgf/cm$^2$. The test pieces of this invention obtained by subjecting them to the warm water curing at 60° C. for 4 days had a bending strength of 238 to 250 kgf/cm$^2$. The test pieces obtained by incorporating 0.3% of iron powder to the cement had a bending strength of 282 kgf/cm$^2$ after one week, and 292 kgf/cm$^2$ after 4 weeks, thus increasing the bending strength by 40 to 50 kgf/cm$^2$. The data show that incorporated iron powder creates an effective function in the presence of the silica fume.

Embodiment 18

In this embodiment, iron powder used in the embodiment 17 was substituted by iron oxide powder. The quantity thereof was reduced to 0.1% by volume of the cement powder. This quantity is ⅓ of the iron powder used in the embodiment 17. The results of measurement are shown in the following Table 32.

This table shows that both of the bending and compression strengths are comparable with those of the embodiment 17.

Embodiment 19

A powder of aluminium hydroxide of 0.5%, based on the quantity of cement was incorporated into mortar having the same composition as that of embodiment 17 and 18. The mechanical strength of the test pieces prepared in the same manner as in embodiment 17 and 18 was measured. The results of measurement are shown in the following Table 33. As can be noted from this table, the bending strength and the compression strength after one week and 4 weeks respectively were higher than those of embodiments 17 and 18. More particularly, the bending strength was 300 kgf/cm$^2$ and the compression strength was 1600 kgf/cm$^2$ which are advantageous strengths.

TABLE 32

Unit of bending strength and compression strength: kgf/cm$^2$

| test piece curing | composition silica/C | iron oxide/C | S/C | W/C | water reducing agent | flow | 1 week strength Bend. | 1 week strength Comp. | 4 weeks strength Bend. | 4 weeks strength Comp. | method of curing |
|---|---|---|---|---|---|---|---|---|---|---|---|
| L2d-ST | 10 | 0.16 | 1.25 | 20 | 4% | 137 | 129 | 894 | 165 | 1237 | normal curing |
| L2dH4dST | 10 | 0.10 | 1.25 | 20 | 4% | 137 | 272 | 1395 | 286 | 1468 | warm water curing |

Note
iron oxide: $Fe_2O_3$ of 2 to 20 μm
L: 20° C. wet air curing
d: day
H: 60° C. warm water curing
ST: curing in water at 20° C.

-

TABLE 33

Unit of bending strength and compression strength: kgf/cm$^2$

| test piece curing | composition silica/C | iron oxide/C | S/C | W/C | water reducing agent | flow | 1 week strength Bend. | 1 week strength Comp. | 4 weeks strength Bend. | 4 weeks strength Comp. | method of curing |
|---|---|---|---|---|---|---|---|---|---|---|---|
| L2d-ST | 10 | 0.10 | 1.25 | 20 | 4% | 137 | 129 | 894 | 165 | 1237 | normal curing |
| L2d-ST | 10 | 0.10 | 1.25 | 20 | 4% | 137 | 272 | 1395 | 286 | 1468 | warm water curing |

Note k iron oxide: $Fe_2O_3$ of 2 to 20 μm
L: 20° C. wet air curing
d: day
H: 60° C. warm water curing
ST: curing in water at 20° C.

Embodiment 20

A MgO powder having a particle size of 2 to 50 microns was added to mortar having the same composition as those of the embodiments 17 to 19. The results of measurement of the mechanical strength are shown in the following Table 34 which shows that, by adding 0.25 volume % of cement, the bending strength of 260 to 280 kgf/cm$^2$ and the compression strength of 1300 to 1500 kgf/cm$^2$ were obtained.

TABLE 34

Unit of bending strength and compression strength: kgf/cm$^2$

| test piece curing | composition silica/C | MgO/C | S/C | W/C | water reducing agent | flow | 1 week strength Bend. | Comp. | 4 weeks strength Bend. | Comp. | method of curing |
|---|---|---|---|---|---|---|---|---|---|---|---|
| L2d-ST | 10 | 0.25 | 1.25 | 20 | 4% | 136 | 101 | 813 | 155 | 1213 | normal curing |
| L2dH4dST | 10 | 0.25 | 1.25 | 20 | 4% | 136 | 262 | 1298 | 276 | 1457 | warm water curing |

Note size of magnesium oxide powder: 2 to 50 μm
L: 20° C. wet air curing
d: day
H: 60° C. warm water curing
ST: curing in water at 20° C.

Embodiment 21

In this embodiment, the silica fume was subjected by fine blast furnace slag having a particle size of 2 to 10 microns and the ratios of S/C, W/C and the quantity of the water reducing agent were the same as in embodiments 17 to 20. These ingredients were admixed to form mortar. Magnesium powder of 2 to 50 microns was added to the mortar, and the mechanical strength of the hardened concrete body was measured. The results of measurement are shown in the following Table 35. The bending strength of the test pieces was 250 kgf/cm$^2$.

TABLE 35

Unit of bending strength and compression strength: kgf/cm$^2$

| test piece curing | composition slag/C | MgO/C | S/C | W/C | water reducing agent | flow | 1 week strength Bend. | Comp. | 4 weeks strength Bend. | Comp. | method of curing |
|---|---|---|---|---|---|---|---|---|---|---|---|
| L2d-ST | 15 | 0.45 | 1.25 | 20 | 4% | 141 | 87 | 618 | 144 | 1138 | normal curing |
| L2dH4dST | 15 | 0.45 | 1.25 | 20 | 4% | 141 | 246 | 1178 | 253 | 1368 | warm water curing |

Note size of magnesium oxide powder: 2 to 50 μm
L: 20° C. wet air curing
d: day
H: 60° C. curing in water curing
ST: curing in water at 20° C.
blast furnace fine slag having a diameter of 2 to 10 μm Embodiment 22

High strength concrete body was obtained from a composition comprising water and cement ratio of 25% (having a slump value of 21 to 24 cm), 45 volume % of a fine aggregate and aggregate ratio and an air quantity of 2% by volume. These ingredients and other ingredients as shown in the following Table 36 were mixed together and kneaded. Iron powder of the quantity of 50% of the cement was added to a plain concrete and to concrete incorporated with 10% by volume of silica fume. These concretes were admixed and kneaded in a forced mixer for 5 minutes. The fresh concrete thus prepared were poured into a molding box to obtain cylindrical test pieces each having a diameter of 10 cm, and a length of 20 cm, and square column test pieces each having a dimension of 10×10×40 cm. On the next day, the test pieces were released from the molds. Certain number of test pieces were subjected to the standard curing in water at 20° C. Remaining test pieces were subjected to the standard curing. 2 days after, the test pieces were subjected to the warm water (60° C.) curing for 5 days followed by the standard curing in water at 20° C. The results of measurement of the mechanical strength are shown in the following Table 36.

TABLE 36

Unit of bending strength and compression strength: $kgf/cm^2$

| test pieceg curing | composition: silica/C | composition: iron powder/C | composition: S/A | composition: W/C | composition: water reducing | slamp | 1 week strength: Bend. | 1 week strength: Comp. | 4 weeks strength: Bend. | 4 weeks strength: Comp. | method of curing |
|---|---|---|---|---|---|---|---|---|---|---|---|
| L2d-ST | 0 | 0 | 45 | 25 | 4% | 21 | 62 | 827 | 88 | 983 | normal curing |
| L2dH5dST | 0 | 0 | " | " | " | 21 | 81 | 963 | 83 | 1113 | standard curing |
| L2d-ST | 10 | 0 | " | " | " | 24 | 74 | 845 | 95 | 1120 | normal curing |
| L2dH5dST | 10 | 0 | " | " | " | 24 | 176 | 1138 | 206 | 1238 | standard curing |
| L2d-ST | 10 | 0.50 | " | " | " | 20 | 79 | 865 | 91 | 1125 | normal curing |
| L2dH5dST | 10 | 0.50 | " | " | " | 20 | 189 | 1123 | 228 | 1281 | standard curing |

Note Fe powder having a particle of 2 to 30 μm
L: wet air curing at 20° C.
d: day
H: warm water curing at 60° C.
ST: curing in water at 20° C.

The measurements of the bending and compression strengths after 1 week and 4 weeks respectively were performed by using square column test pieces while 4 weeks measurements were performed by using cylindrical test pieces. The results of measurement are also shown in Table 36. The bending strength of the test pieces incorporated with the iron powder was increased by about 10%.

We have also noted that the bending strength of the test pieces not using the fumed silica and subjected to the warm water curing has been increased by about 3 times.

Embodiment 23

Instead of the iron powder 0.3% by volume of cements, of iron oxide powder having a particle size of 2 to 30 microns was added to the concrete having the same composition as in embodiment 22. The concrete was treated in the same manner, and the mechanical strength of the test pieces were measured. The results of measurement are shown in the following Table 37. We have noted that the bending strength and the compression strength of the test pieces after one week and four weeks respectively were higher than those shown in Table 36 in which 0.5% by volume of cement, of iron powder was used.

TABLE 37

Unit of bending strength and compression strength: $kgf/cm^2$

| test pieceg curing | composition: silica/C | composition: iron oxide/C | composition: S/A | composition: W/C | composition: water reducing agent | slamp | 1 week strength: Bend. | 1 week strength: Comp. | 4 weeks strength: Bend. | 4 weeks strength: Comp. | method of curing |
|---|---|---|---|---|---|---|---|---|---|---|---|
| L2d-ST | 10 | 0.3 | 45 | 25 | 4% | 20 | 81 | 878 | 94 | 1142 | normal curing |
| L2dH5dST | 10 | 0.3 | 45 | 25 | 4% | 20 | 193 | 1162 | 238 | 1298 | standard curing |

Note iron oxide powder habing a particel size of 2 to 30 μm
L: 20° C. wet air curing
d: day
H: 60° C. warm water curing
ST: curing in water at 20° C.

Embodiment 24

Aluminium hydroxide of 0.06% based on the quantity of cement was added to concrete having the same composition as those described in embodiments 22 and 23. The concrete mixture thus obtained was treated in the same manner as before. The results of measurement of the mechanical strength of the test pieces of hardened concrete are shown in the following Table 38. As can be noted from this Table, bending strength and the compression strength of this embodiment have been increased than those shown in Tables 36 and 37.

TABLE 38

Unit of bending strength and compression strength: $kgf/cm^2$

| test piece curing | composition silica/C | $Al(OH)_3$/C | S/A | W/C | water reducing agent | slamp | 1 week strength Bend. | Comp. | 4 weeks strength Bend. | Comp. | method of curing |
|---|---|---|---|---|---|---|---|---|---|---|---|
| L2d-ST | 10 | 0.60 | 45 | 25 | 4% | 20 | 79 | 865 | 91 | 1125 | normal curing |
| L2dH5dST | 10 | 0.60 | 45 | 25 | 4% | 20 | 198 | 1172 | 251 | 1324 | standard curing |

Note $Al(OH)_3$ hydooxide:
L: 20° C. wet air curing
d: day
H: 60° C. warm water curing
ST: curing in water at 20° C.

Embodiment 25

In this embodiment magnesium oxide of 0.55%, by volume of cement, of magnesium oxide was added to cement having the same composition and treated under the same conditions as those of embodiments 22 to 24. The results of measurement of the mechanical strength of the test pieces made of hardened concrete are shown in the following Table 39 which show similar increase of the mechanical strength to that of embodiment 22.

Embodiment 26

In this embodiment, the quantity of magnesium oxide was reduced to 0.35% on the weight of cement. This quantity of the magnesium oxide is about ½ of that of embodiment 25. The mechanical strength and the composition of the hardened cement body are shown in the following Table 40. The bending strength and the compression strength are higher than those shown in Table 39. Incorporation of MgO of more than 0.5% by volume of cement, does not cause higher mechanical strength.

TABLE 39

Unit of bending strength and compression strength: $kgf/cm^2$

| test piece curing | composition silica/C | MgO/C | S/A | W/C | water reducing agent | slamp | 1 week strength Bend. | Comp. | 4 weeks strength Bend. | Comp. | method of curing |
|---|---|---|---|---|---|---|---|---|---|---|---|
| L2d-ST | 10 | 0.55 | 45 | 25 | 4% | 20 | 72 | 815 | 81 | 1111 | normal curing |
| L2dH5dST | 10 | 0.55 | 45 | 25 | 4% | 20 | 181 | 1132 | 218 | 1251 | standard curing |

Note MgO powder having a particel size of 2 to 50 $\mu$m
L: 20° C. wet air curing
d: day
H: 60° C. warm water curing
ST: curing in water at 20° C.

TABLE 40

Unit of bending strength and compression strength: $kgf/cm^2$

| test piece curing | composition silica/C | MgO/C | S/A | W/C | water reducing agent | slamp | 1 week strength Bend. | Comp. | 4 weeks strength Bend. | Comp. | method of curing |
|---|---|---|---|---|---|---|---|---|---|---|---|
| L2d-ST | 10 | 0.35 | 45 | 25 | 4% | 20 | 73 | 865 | 91 | 1125 | normal curing |

TABLE 40-continued

Unit of bending strength and compression strength: $kgf/cm^2$

| test piece curing | composition | | | | water reducing agent | slamp | 1 week strength | | 4 weeks strength | | method of curing |
|---|---|---|---|---|---|---|---|---|---|---|---|
| | silica/C | MgO/C | S/A | W/C | | | Bend. | Comp. | Bend. | Comp. | |
| L2dH5dST | 10 | 0.35 | 45 | 25 | 4% | 20 | 193 | 1162 | 239 | 1250 | standard curing |

Note MgO powder having a particel size of 2 to 50 μm
L: 20° C. wet air curing
d: day
H: 60° C. warm water curing
ST: curing in water at 20° C.

Embodiment 27

Silica fume of 10%, by volume of cement was added to Portland cement for preparing a bonding material. To one weight part of the bonding material were added 0.20 weight part of water, 1.25 weight parts of sand and 0.04 weight part of a water reducing agent. These ingredients were admixed and kneaded in a mixer for about 5 minutes (this kneading is called a normal kneading). The flow value of the resultant mixture was measured. The measured flow was 145 mm. The mortar was poured into a mold frame (having a dimension of 4×4×16 cm) to form test pieces used for measuring the mechanical strength of the hardened concrete body. The mold box filled with mortar was cured in wet air at 20° C. On the next day, the hardened concrete body was released from the mold box and subjected to various types of curing. Namely, mortar having a similar component to that described above was admixed and kneaded. Then the mortar was maintained in a mixer for 1 to 2 hours, and then admixed and kneaded again for 1 minute (hereinafter this mortar is termed as "kneaded and then admixed and kneaded again"). These mortar were poured into a mold box (having a dimension of 4×4×16 cm) for forming test pieces of hardened cement body. The mechanical strength of the test pieces was measured. The test pieces were cured in wet air at 20° C., and on the next day the test pieces were released from the mold box. Thereafter, the test pieces were cured by various methods as follows.

Figure 18:
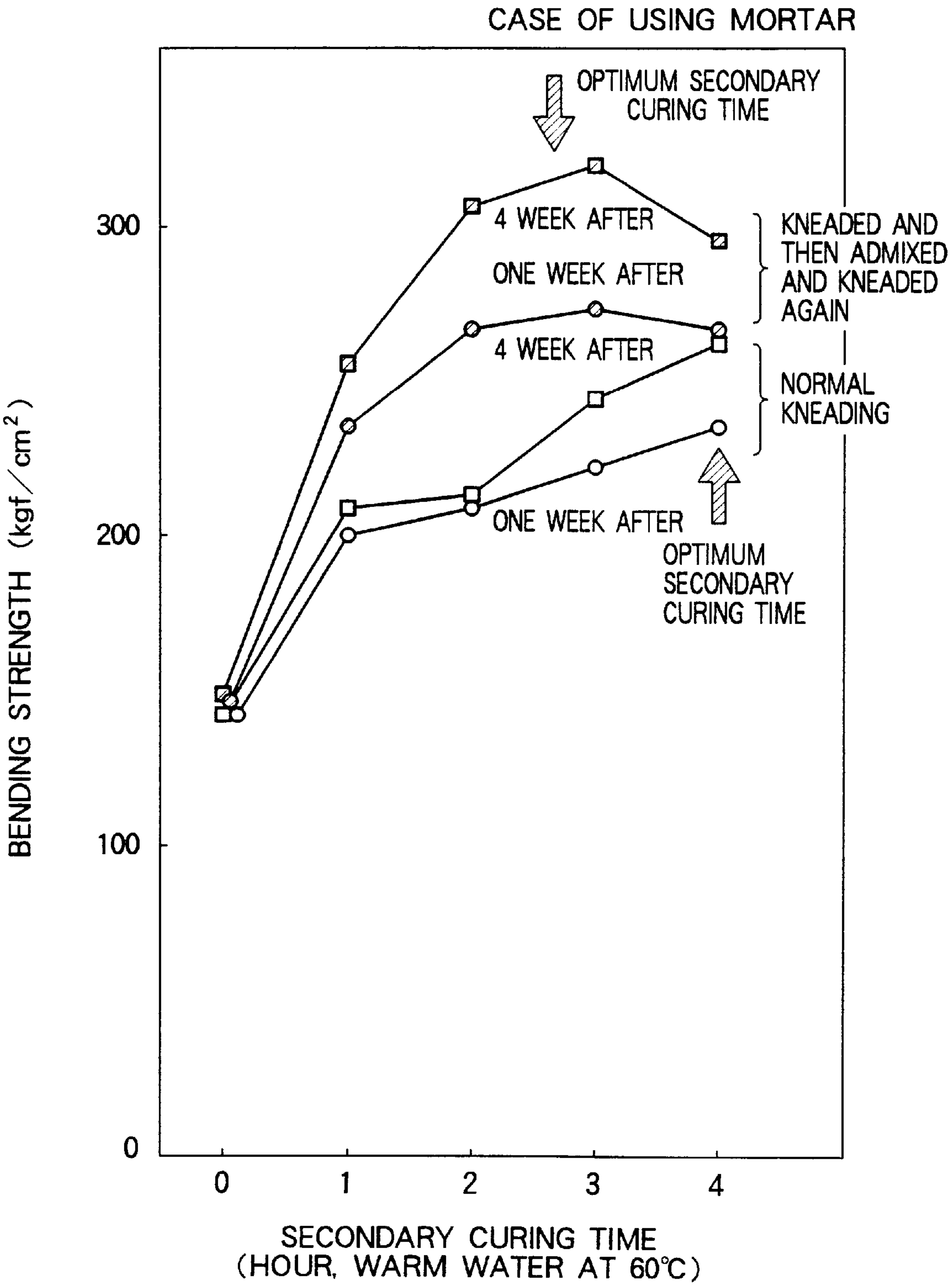
FIG. 18 is a graph showing the effect of the secondary curing of a mortar obtained by admixing and kneading and subjected to after kneading of a previously kneaded material.

More particularly, two days after mold release, normally kneaded mortar and the "kneaded and then admixed and kneaded again" mortar were subjected to the secondary curing in warm water at 60 ° C. The period of the secondary curing was 1, 2, 3 and 4 days respectively. The compression strength and the bending strength of the test pieces were measured. For comparison, the mechanical strength of the test pieces which have been subjected to the standard curing only and not subjected to the secondary curing, was measured. The results of measurement are shown in the following Table 41 and FIG. 18. The bending strength of the test pieces prepared by using the kneaded and then admixed and kneaded mortar was 20 to 30% higher than that of the hardened concrete body formed by using mortar subjected to a normal kneading. The bending strength was the highest where the curing time is 2 to 3 hours. In the case of normal kneading, more than about 4 hours of the secondary curing is necessary. In the case of the normal kneading the most suitable curing time is about 4 days, whereas in the case of "the kneaded and then admixed and kneaded again", the most suitable curing time can be reduced to 2 to 3 days as shown in FIG. 18. We consider that the reduction of the most suitable curing time is caused by the fact that the crystals of cement formed at the early time of crystallization are broken before starting hardening with the result that more finer crystals are formed and the fine pore diameter is reduced, and that due to the Pozzolan reaction a polymer of silica acid anions is formed. This polymer causes integration of the composite material growths and formation at various portions including the interfaces of the aggregate so as to increase the bonding strength between the aggregate and the paste and to increase the bonding strength between cement crystals. Reduction of the manufacturing time of the hardened cement body is economical. Following Table 41 shows the composition of the mortar, and the mechanical strength of the test pieces or hardened concrete body and method of admixing and kneading.

TABLE 41

Unit of bending strength and compression strength: $kgf/cm^2$

| test piece curing | composition | | | water reducing agent | flow | 1 week strength | | 4 weeks strength | | method of admixing and kneading |
|---|---|---|---|---|---|---|---|---|---|---|
| | silica/C | S/C | W/C | | | Bend. | Comp. | Bend. | Comp. | |
| L2dH1dST | 10 | 1.25 | 20 | 4% | 145 | 203 | 1015 | 211 | 1312 | normal kneading |
| L2dH1dST | " | " | " | " | 151 | 238 | 1386 | 255 | 1415 | kneaded and then admixed and kneaded again |
| L2dH1dST | " | " | " | " | 145 | 210 | 1346 | 215 | 1270 | normal kneading |

TABLE 41-continued

| Unit of bending strength and compression strength: kgf/cm² | | | | | | | | | | |
|---|---|---|---|---|---|---|---|---|---|---|
| | composition | | | | | | | | | method of |
| test piece | | | | water reducing | | 1 week strength | | 4 weeks strength | | admixing and |
| curing | silica/C | S/C | W/C | agent | flow | Bend. | Comp. | Bend. | Comp. | kneading |
| L2dH1dST | " | " | " | " | 151 | 270 | 1389 | 309 | 1521 | kneaded and then admixed and kneaded again |
| L2dH1dST | " | " | " | " | 145 | 225 | 1294 | 246 | 1346 | normal kneading |
| L2dH1dST | " | " | " | " | 159 | 275 | 1394 | 321 | 1623 | kneaded and then admixed and kneaded again |
| L2dH1dST | " | " | " | " | 145 | 239 | 1346 | 264 | 1483 | normal kneading |
| L2dH1dST | " | " | " | " | 154 | 268 | 1326 | 297 | 1532 | kneaded and then admixed and kneaded again |
| L2dH1dST | " | " | " | " | 145 | 141 | 947 | 149 | 1107 | normal kneading |
| L2dH1dST | 10 | 1.25 | 20 | 4% | 151 | 145 | 952 | 145 | 1128 | kneaded and then admixed and kneaded again |

Note
L: wet air curing at 20° C.
d: day
H: warm water curing at 60° C.
ST: standard curing in water at 20° C.

Embodiment 28

Fine aggregate and aggregate ratio of 45% by volume, water in an cement ratio (W/C) of 20%, and silica fume of 10%, based on the volume of cement, acting as a potentially hydraulic fine powder were mixed together to obtain a mortar having a slump of 24 cm and containing 2%, by volume, of air. This mortar was mixed in a forced mixer for 5 minutes. This mortar was poured into molding boxes for preparing a number of cylindrical test pieces, each having a dimension of 10 cm diameter and a length of 20 cm, and square column test pieces, each having a dimension of 10×10×40 cm. On the next day, the molded test pieces were released from the mold boxes. Some of the molded test pieces were subjected to the primary curing (L1d) in water at 20° C. for one day. The remaining test pieces were subjected to the secondary curing for 2 days followed by the secondary curing in warm water at for 1 to 4 days (H1d, H2d, H3d, H4d). All of the test pieces thus cured were subjected again to the standard curing in water at 20° C.

On the other hand, mortar having a composition similar to that described above was mixed for 5 minutes in a mixer and let standstill for 1 to 3 hours. The mortar thus obtained was admixed and kneaded again to obtain mortar having a slump of 27 cm. The mortar thus treated was poured into and molded in molding boxes to obtain cylindrical test pieces each having a diameter of 10 cm and a length of 20 cm, and square column test pieces each having a dimension of 10×10×40 cm. On the next day, the test pieces were released from respective mold boxes. The molded bodies thus obtained was subjected to the primary standard curing (L1d) in water at 20° C. The remaining test pieces were subjected to the standard curing for 2 days followed by the secondary curing in warm water at 60° C. for 1 to 4 days (H1d, H2d, H3d, H4d). Thereafter, all test pieces were subjected to the standard curing in water at 20° C., and the mechanical strength of them were measured. The results of measurement are shown in the following Table 42 and FIG. 19.

TABLE 42

| Unit of bending strength and compression strength: kgf/cm² | | | | | | | | | | |
|---|---|---|---|---|---|---|---|---|---|---|
| | composition | | | | | | | | | method of |
| test piece | | | | water reducing | | 1 week strength | | 4 weeks strength | | admixing and |
| curing | silica/C | S/C | W/C | agent | slump | Bend. | Comp. | Bend. | Comp. | kneading |
| L2dH1dST | 10 | 45 | 25 | 4% | 24 | 129 | 1037 | 141 | 1140 | normal kneading |
| L2dH1dST | " | " | " | 5% | 29 | 163 | 1174 | 186 | 1186 | kneaded and then admixed and kneaded again |

TABLE 42-continued

Unit of bending strength and compression strength: $kgf/cm^2$

| test piece curing | composition silica/C | S/C | W/C | water reducing agent | slump | 1 week strength Bend. | 1 week strength Comp. | 4 weeks strength Bend. | 4 weeks strength Comp. | method of admixing and kneading |
|---|---|---|---|---|---|---|---|---|---|---|
| L2dH1dST | " | " | " | 4% | 24 | 156 | 1297 | 164 | 1227 | normal kneading |
| L2dH1dST | " | " | " | 5% | 29 | 178 | 1297 | 216 | 1227 | kneaded and then admixed and kneaded again |
| L2dH1dST | " | " | " | 4% | 24 | 161 | 1173 | 181 | 1180 | normal kneading |
| L2dH1dST | " | " | " | 5% | 27 | 192 | 1312 | 245 | 1263 | kneaded and then admixed and kneaded again |
| L2dH1dST | " | " | " | 4% | 24 | 172 | 1123 | 201 | 1198 | normal kneading |
| L2dH1dST | " | " | " | 5% | 27 | 187 | 1231 | 236 | 1198 | kneaded and then admixed and kneaded again |
| L2dH1dST | " | " | " | 4% | 24 | 180 | 1126 | 225 | 1231 | normal kneading |
| L2dH1dST | " | " | " | 5% | 27 | 184 | 1126 | 229 | 1256 | kneaded and then admixed and kneaded again |
| L2dH1dST | " | " | " | " | 24 | 64 | 843 | 75 | 1020 | normal kneading |
| L2dH1dST | 10 | 45 | 25 | " | 27 | 68 | 890 | 81 | 1113 | kneaded and then admixed and kneaded again |

Note
L: wet air curing at 20° C.
d: day
H: warm water curing at 60° C.
ST: curing in water at 20° C.

Figure 19:
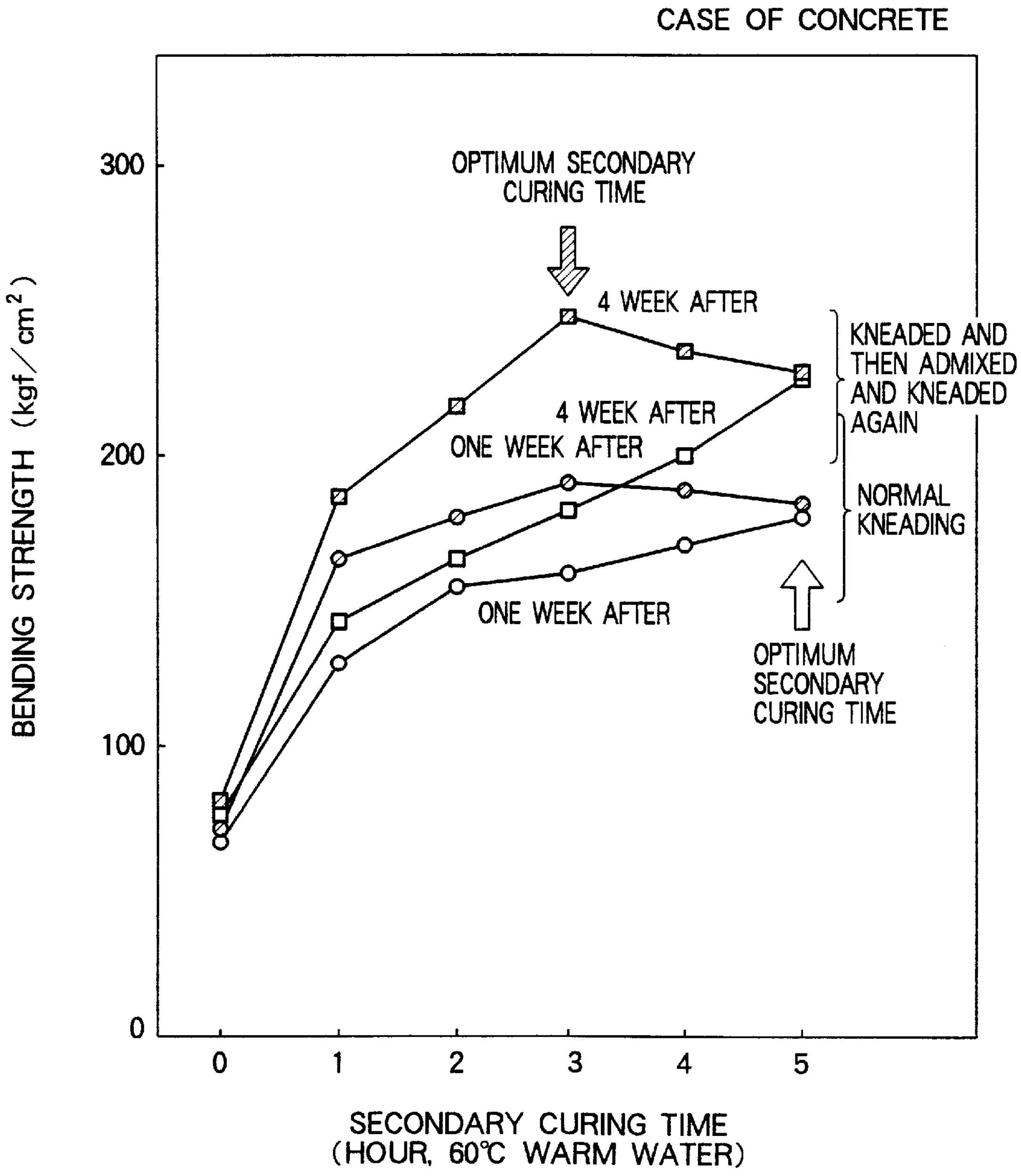
FIG. 19 is a graph showing the effect of the secondary curing of concrete subjected to after mixing and kneading treatment of a previously kneaded material.

As can be noted from this table, the concrete kneaded and then admixed and kneaded again and incorporated with a potentially hydraulic fine powder had about 20% higher bending strength than concrete subjected to the normal kneading . Especially, the bending strength is the highest when subjected to the secondary curing for about 3 days. In the case of the normal kneading, the necessary secondary curing time is about 5 days. As shown in FIG. 19, the most suitable secondary curing time can be reduced to 3 days. Similar to embodiment 27, it is presumed that this short secondary curing time is caused by the fact that the crystalline product of cement becomes dense due to kneaded and then admixed and kneaded again treatment, thereby decreasing the diameter of the fine pores, and that by the formation of the polymer of the silica acid anions caused by the Pozzalan reaction. The integrative of the composite materials is created at various portions including the interfaces of the aggregates, thereby increasing the adhering strength of the paste to the aggregate as well as the adhering strength between the cement crystals. Shortening of the manufacturing time of the hardened concrete body having a high bending strength is extremely advantageous for manufacturing a large quantity of mortar.

Embodiment 29

In this embodiment, an iron powder was added, and the method of kneading and then admixing and kneaded again is adopted. More particularly, to one weight part of cement were added 1.25 weight parts of sand, 0.20 weight part of water, 0.04 weight part of a high efficiency AE water reducing agent, 0.10 weight part of silica fume and 0.003 weight part of an iron powder having a particle size of 2 to 30 microns. At first, a mixture of sand and water was kneaded and mixed together for removing air on the surface of sand particles. Thereafter, cement, silica fume and iron powder were mixed together and the resultant mixture was kneaded for 5 minutes. Thereafter, a high efficiency AE water reducing agent was added. Then the mixture was further kneaded for 1 minute to obtain mortar having a flow value of 139 mm. Test pieces, each having a dimension of 4×4×16 cm, were prepared by using a portion of this mortar. After curing the test pieces in water at 20° C., they had a bending strength of 117 $kgf/cm^2$ after one week and of 178 $kgf/cm^2$ after 4 weeks. The test pieces were subjected to the standard curing for 2 days in water at 20° C. followed by the curing for 4 days in warm water at 60° C. As shown in the following Table 43, the test pieces had a bending strength of 281 $kgf/cm^2$ after one week and 295 $kgf/cm^2$ after 4 weeks. Remaining mortar was let standstill in a mixer for about 2 hours. The mortar was kneaded again while adding a high efficiency AE water reducing agent for obtaining mortar having a flow value of 146 mm. The test pieces subjected to the standard curing at 20° C. had a bending strength of 116 $kgf/cm^2$ after one week and 171 $kgf/cm^2$ after 4 weeks.

These test pieces which have been subjected to the standard curing for 2 days followed by the warm water curing in warm water at 60° C. for five days had a bending strength of 282 $kgf/cm^2$ after one week and 295 $kgf/cm^2$ after 4 weeks as shown in the following Table 43. This table shows that the iron powder is effective to the reaction of the silica fume and the kneaded, and then admixed and kneaded again treatment causes dense the crystals of the cement formed. As a result, in the spaces between cement powders and sand, and the spaces between cement powders are formed a polymer of the silicic acid anions, thereby increasing the bonding force between these powders. We have noted that these facts had improved the bending strength.

TABLE 43

| Unit of bending strength and compression strength: kgf/cm² | | | | | | | | | | | | |
|---|---|---|---|---|---|---|---|---|---|---|---|---|
| | composition | | | | | | | | | | | |
| test piece curing | silica/C | iron powder/C | S/C | W/C | water reducing agent | flow | 1 week strength Bend. | 1 week strength Comp. | 4 weeks strength Bend. | 4 weeks strength Comp. | method of curing | method of kneading |
| L2d-ST | 10 | 0.30 | 1.25 | 20 | 4% | 139 | 112 | 850 | 173 | 1251 | normal curing | normal kneading |
| L2dH4dST | 10 | 0.30 | 1.25 | 20 | 4% | 146 | 282 | 1483 | 292 | 1531 | warm water curing | |
| L2d-ST | 10 | 0.30 | 1.25 | 20 | 4% | 149 | 116 | 863 | 171 | 1251 | normal curing | * |
| L2dH4dST | 10 | 0.30 | 1.25 | 20 | 4% | 146 | 289 | 1491 | 298 | 1541 | warm water curing | |

Note Fe powder having a particle size of 2 to 30 μm
*: kneaded and then admixed and kneaded again
L: wet air curing ata 20° C.
d: day
H: warm water curing 60° C.
ST: curing in water at 20° C.

Embodiment 30

As shown in the following Table 44, to a composition similar to that used in the previous Embodiment 29, one weight part of cement, 0.1 weight part of the silica fume, and 0.001 weight part of a powder of iron oxide having a particle diameter of 2 to 20 microns were incorporated. The resulting mixture was mixed together and kneaded in the same manner as above described. The resulting mortar had a flow value of 137 mm.

A portion of this mortar was subjected to the standard curing in water at 20° C. The cured test pieces had a bending strength of 129 kgf/cm² one week after, and 165 kgf/cm² after 4 weeks. The test pieces were subjected to the standard curing for 2 days and then cured in warm water at 60° C. for 4 days followed by the standard curing. The test pieces thus treated had a high bending strength of 272 kgf/cm² after one week, and of 286 kgf/cm² after 4 weeks. The remaining portion of the mortar was let standstill in a mixer for about 2 hours. Thereafter, the mortar was kneaded again while adding a high efficiency AE water reducing agent. The mortar thus treated had a flow value of 145 mm. Test pieces of the hardened cement body made of this mortar had a bending strength of 116 kgf/cm² after one week, and of 171 kgf/cm² after 4 weeks. The test pieces subjected to the standard curing for 2 days followed by the heat curing in warm water at 60° C. for 5 days had a bending strength of 289 kgf/cm² after one week and 298 kgf/cm² after 4 weeks which are higher than those of the test pieces subjected to the normal kneading.

TABLE 44

| Unit of bending strength and compression strength: kgf/cm² | | | | | | | | | | | | |
|---|---|---|---|---|---|---|---|---|---|---|---|---|
| | composition | | | | | | | | | | | |
| test piece curing | silica/C | iron oxide/C | S/C | W/C | water reducing agent | flow | 1 week strength Bend. | 1 week strength Comp. | 4 weeks strength Bend. | 4 weeks strength Comp. | method of curing | method of kneading |
| L2d-ST | 10 | 0.10 | 1.25 | 20 | 4% | 137 | 129 | 894 | 165 | 1237 | normal curing | normal kneading |
| L2dH4dST | 10 | 0.10 | 1.25 | 20 | 4% | 145 | 272 | 1305 | 286 | 1468 | warm water curing | |
| L2d-ST | 10 | 0.10 | 1.25 | 20 | 4% | 137 | 131 | 898 | 171 | 1318 | normal curing | * |
| L2dH4dST | 10 | 0.10 | 1.25 | 20 | 4% | 145 | 281 | 1425 | 297 | 1532 | warm water curing | |

Note $Fe_2O_3$ powder having a particle size of 2 to 20 μm
*: kneaded and then admixed and kneaded again
L: wet air curing ata 20° C.
d: day
H: warm water curing at 60° C.
ST: curing in water at 20° C.

This Table shows that the iron oxide powder is effective to the reaction of the silica fume. The method of kneading and then admixing and kneading again increases the density of the crystals of cement formed, thereby forming polymers of silicic acid anions in the spaces between cement and sand, and between cement particles, whereby the bonding force between cement particles and sand is increased. As a consequence, the bending strength is increased.

Embodiment 31

To a composition similar to the previous Embodiment 29 and 30 were added 0.1 weight part of silica fume and 0.005 weight part of aluminum hydroxide powder as shown in the following Table 45. These ingredients were kneaded in the same manner as above described. The resulting mortar had a flow value of 154 cm. A portion of this mortar was hardened to obtain test pieces of the same dimension as above described. The test pieces subjected top the standard curing in water at 20° C. had a bending strength of 106 kgf/cm$^2$ after one week and 166 kgf/cm$^2$ after 4 weeks. The test pieces were subjected to the standard curing for 2 days. Thereafter the test pieces were cured in warm water for four days followed by the standard curing. The test pieces thus treated had a high bending strength of 291 kgf/cm$^2$ after one week and 299 kgf/cm$^2$ after 4 weeks. The remaining mortar was let to stand still in a mixer for about 2 hours and then kneaded again while adding thereto a high efficiency AE water reducing agent. The resulting mortar had a flow value of 158 mm. Test pieces of hardened concrete body prepared from this mortar after subjecting to the standard curing at 20° C. had a bending strength of 111 kgf/cm$^2$ after one week and 171 kgf/cm$^2$ after 4 weeks. According to this invention, test pieces of the hardened cement body utilizing this mortar were subjected to the standard curing for 2 days followed by a curing in warm water at 60° C. for 5 days. Test pieces made of a hardened concrete body had a bending strength of 298 kgf/cm$^2$ after one week and 311 kgf/cm$^2$ after 4 weeks. These high values of the bending strength are much higher than those of the test pieces of the hardened concrete body using a mortar subjected to the normal kneading. The method of curing and the method of kneading are shown in composition of the cement, mechanical strengths, the the following Table 45.

TABLE 45

Unit of bending strength and compression strength: kgf/cm$^2$

| test piece curing | composition silica/C | Al(OH)/ C | S/C | W/C | water reducing agent | flow | 1 week strength Bend. | Comp. | 4 weeks strength Bend. | Comp. | method of curing | method of kneading |
|---|---|---|---|---|---|---|---|---|---|---|---|---|
| L2d-ST | 10 | 0.50 | 1.25 | 20 | 4% | 154 | 106 | 789 | 166 | 1186 | normal curing | normal kneading |
| L2dH4dST | 10 | 0.50 | 1.25 | 20 | 4% | 154 | 299 | 1498 | 299 | 1583 | warm water curing | |
| L2d-ST | 10 | 0.50 | 1.25 | 20 | 4% | 154 | 111 | 823 | 178 | 1269 | normal curing | * |
| L2dH4dST | 10 | 0.50 | 1.25 | 20 | 4% | 155 | 298 | 1511 | 311 | 1592 | warm water curing | |

Note *: kneaded and then admixed and kneaded again
L: wet air curing ata 20° C.
d: day
H: warm water curing at 60° C.
ST: curing in water at 20° C.

In this embodiment too, aluminum hydroxide is effective to the reaction of the silica fume and by the treatment of kneading and then admixing and kneading again, the density of the crystals of cement became large so as to form polymers of silicic acid anions in the spaces between cement powder and sand, and between cement powders, thereby improving the bonding force between these ingredients. We presume that these facts have increased the bending strength.

Embodiment 32

In this embodiment a magnesium oxide powder was used. In the same manner as in Embodiments 29 to 31, the ingredients were kneaded and then admixed and kneaded again. The composition of the mortar and the bending and compression strength of the test piece are shown in the following Table 46. For comparison, identical data obtained from hardened cement body utilizing mortar subjected to the normal kneading are also shown in Table 46. When a small quantity, for example, 0.25% of magnesium based on the volume of cement is added to the mortal, the bending strength had increased to more than 280 kgf/cm$^2$ where the mortar is kneaded and then admixed and kneaded again in the same manner as above described, the density of the crystals of cement became large and sufficient quantity of the polymer of the silicic acid anions were formed in the spaces between cement and sand and between cement powders. As a consequence, bonding strength between the ingredients was increased, thereby increasing the bending strength.

TABLE 46

Unit of bending strength and compression strength: $kgf/cm^2$

| test piece curing | composition silica/C | MgO/C | S/C | W/C | water reducing agent | flow | 1 week strength Bend. | Comp. | 4 weeks strength Bend. | Comp. | method of curing | method of kneading |
|---|---|---|---|---|---|---|---|---|---|---|---|---|
| L2d-ST | 10 | 0.25 | 1.25 | 20 | 4% | 136 | 101 | 813 | 155 | 1213 | normal curing | normal kneading |
| L2dH4dST | 10 | 0.25 | 1.25 | 20 | 4% | 144 | 262 | 1298 | 276 | 1457 | warm water curing | |
| L2d-ST | 10 | 0.25 | 1.25 | 20 | 4% | 136 | 111 | 833 | 167 | 1321 | normal curing | * |
| L2dH4dST | 10 | 0.25 | 1.25 | 20 | 4% | 144 | 283 | 1321 | 288 | 1493 | warm water curing | |

Note MgO powder having a particle diameter of 2 to 50 μm
*: kneaded and then admixed and kneaded again
L: wet air curing ata 20° C.
d: day
H: warm water curing at 60° C.
ST: curing in water at 20° C.

Embodiment 33

Blast furnace fine slag and magnesium powder were added to mortar. Similar composition to those of embodiments 29 to 32 was used. A mixture of ingredients was subjected to the normal kneading and to the treatment of kneading and then admixing and kneaded again. The composition, mechanical strength and the method of curing and the method of kneading are shown in the following Table 47.

TABLE 47

Unit of bending strength and compression strength: $kgf/cm^2$

| test piece curing | composition slag/C | MgO/C | S/C | W/C | water reducing agent | flow | 1 week strength Bend. | Comp. | 4 weeks strength Bend. | Comp. | method of curing | method of kneading |
|---|---|---|---|---|---|---|---|---|---|---|---|---|
| L2d-ST | 15 | 0.45 | 1.25 | 20 | 4% | 141 | 87 | 618 | 144 | 1138 | normal curing | normal kneading |
| L2dH4dST | 15 | 0.45 | 1.25 | 20 | 5% | 141 | 246 | 1178 | 253 | 1368 | warm water curing | |
| L2d-ST | 15 | 0.45 | 1.25 | 20 | 4% | 141 | 92 | 724 | 156 | 2241 | normal curing | * |
| L2dH4dST | 15 | 0.45 | 1.25 | 20 | 5% | 149 | 251 | 1282 | 266 | 1435 | warm water curing | |

Note MgO powder having a particle diameter of 2 to 50 μm
Blast furnace fine slag having a particle diameter of 2 to 10 μm
*: kneaded and then admixed and kneaded again
L: wet air curing ata 20° C.
d: day
H: warm water curing at 60° C.
ST: curing in water at 20° C.

In this embodiment too, the bending strength of the test pieces was about 250 $kgf/cm^2$ when the test pieces were subjected to the warm water curing. Where the test pieces were subjected to the treatment of kneading and then admixing and kneading again, the bending strength after 4 weeks was at least 260 $kgf/cm^2$. These high values of the bending strength are similar to those of embodiments 29 to 32.

Embodiment 34

Silica fume of 10%, by volume was added to Portland cement for preparing a bonding material. To one weight part of the boding material were added 0.20 weight part of water, 1.25 weight parts of sand and 0.4 weight part of the water reducing agent to obtain mortar. The mortar was admixed and kneaded in a mixer for about 5 minutes, and the mortar thus treated had a flow value of 145 mm. The mortar was poured into a mold box for preparing test pieces of the hardened concrete, each test piece having a dimension of 4×4×16 cm. The test pieces were used to measure the mechanical strength of the hardened concrete. Certain number of the test pieces were cured in wet air at 20° C. On the next day, the test pieces were released from the mold boxes and subjected to the standard curing (in water at 20° C.) for 7 days (S7 series). The remaining test pieces were subjected to the standard curing for one day followed by the secondary curing for 4 days in warm water at 60° C.(D7 series). The compression strength, bending strength and the modules of elasticity were measured and are shown in the following Table 48.

TABLE 48

| physical property | mark | 7 days after standard curing | after firing at 850° C. | 7 days after recovering curing | 14 days after recovering curing | condition of curing |
|---|---|---|---|---|---|---|
| bending strength $kgf/cm^2$ | S7-RN | 144 | 78 | 91 | 118 | S7: in water at 20° C.<br>RN: in water at 20° C. |
| | S7-RD | | | 143 | 203 | S7: in warm water at 60° C.<br>RD: in warm water at 60° C. |
| | D7-RN | 262 | 91 | 123 | 138 | D7: in warm water at 60° C.<br>RN: in water at 20° C. |
| | D7-RD | | | 156 | 216 | D7: in warm water at 60° C.<br>RD: in warm water at 60° C. |
| compression g strength $kgf/cm^2$ | S7-RN | 757 | 658 | 692 | 747 | S7: in water at 20° C.<br>RN: in water at 20° C. |
| | S7-RD | | | 867 | 1011 | S7: in warm water at 60° C. |
| | D7-RN | 1158 | 662 | 746 | 798 | D7: in warm water at 60° C.<br>RN: in water at 20° C. |
| | D7-RD | | | 906 | 1013 | D7: in warm water at 60° C.<br>RD: in warm water at 60° C. |
| modulus of elasticity $kgf/cm^2$ | S7-RN | $5.0 \times 10^5$ | $1.0 \times 10$ | $4.8 \times 10^5$ | $4.8 \times 10^5$ | S7: in water at 20° C.<br>RN: in water at 20° C. |
| | S7-RD | | | $4.9 \times 10^5$ | $5.1 \times 10^5$ | S7: in warm water at 60° C.<br>RD: in warm water at 60° C. |
| | D7-RN | " | $1.1 \times 10$ | $4.1 \times 10^5$ | $4.2 \times 10^5$ | D7: in warm water at 60° C.<br>RN: in water at 20° C. |
| | D7-RD | | | $4.8 \times 10^5$ | $5.1 \times 10^5$ | D7: in warm water at 60° C.<br>RD: in warm water at 60° C. |

In the S7 series, the test pieces after the standard curing had a bending strength of 144 $kgf/cm^2$, a compression strength of 757 $kgf/cm^2$ and a modules of elasticity of $5.0 \times 10^5$. After drying the test pieces, and applying a glaze, the test pieces were fired for 30 minutes at a temperature of 850° C. This temperature was obtained by increasing the temperature at a rate of 400° C./hour in about 120 minutes. After natural cooling, the bonding strength of the test pieces had decreased to 73 $kgf/cm^2$ which is about one half of that before firing with glaze. The compression strength of the test pieces was 658 $kgf/cm^2$ and the modules of elasticity was $1.0 \times 10^5$ $kgf/cm^2$. After immersing in water for 7 days and then cured the test pieces had a bending strength of 91 $kgf/cm^2$. This strength was recovered to 113 $kgf/cm^2$ when cured for 14 days. On the other hand, the test pieces which were cured in warm water at 60° C. for 7 days in accordance with this invention had a bending strength of 143 $kgf/cm^2$, a compression strength of 867 $kgf/cm^2$ and a modulus of elasticity of $4.9 \times 10^5$ $kgf/cm^2$, whereas the test pieces subjected to the curing in water at 60° C. for 14 days had a bending strength of 203 $kgf/cm^2$, a compression strength of 1011 $kgf/cm^2$ and a modulus of elasticity of $5.1 \times 10^5$ $kgf/cm^2$. The bending strength of the test pieces had increased by about 60 $kgf/cm^2$, whereas the compression strength and the modulus of elasticity were substantially the same as those of the test pieces before the firing. Moreover, since strong product could be obtained.

Regarding the D7 series, immediately after the standard curing the test pieces had a bending strength of 262 $kgf/cm^2$, a compression strength of 1158 $kgf/cm^2$ and a modulus of elasticity of $1 \times 10^5$ $kgf/cm^2$. After drying, the test pieces were fired at a temperature of 850° C. for 30 minutes. This temperature was obtained by increasing the temperature at a rate of 400° C./hour in about 120 minutes by using an electric furnace. After natural cooling, the bending strength of the test pieces had decreased from 262 $kgf/cm^2$ to 91 $kgf/cm^2$, while the compression strength was 662 $kgf/cm^2$ and the modulus of elasticity was $1.1 \times 10^6$ $kgf/cm^2$. The test pieces fired and then cured in water at 20° C. for 7 days had a bending strength of 123 $kgf/cm^2$. After curing for 14 days in warm water at 60° C., the bending strength was recovered to 138 $kgf/cm^2$. On the other hand, the test pieces cured for 7 days in warm water at 60° C. had a bending strength of 156 $kgf/cm^2$, a compression strength of 906 $kgf/cm^2$ and a modulus of elasticity of $1 \times 10^5$ $kgf/cm^2$. The test pieces further subjected to a curing in warm at 60° C. for 14 days had a bending strength of 216 $kgf/cm^2$, a compression strength of 1013 $kgf/cm^2$ and a modulus of elasticity of $5.1 \times 10^5$ $kgf/cm^2$. We have noted that these physical characteristics were recovered to the characteristics obtained before the firing. We presume this recovering is caused by the fact that the destroyed polymer of silicic acid anions by the higher temperature has recovered by the curing in warm water at 60° C. effected after the firing. We have noted that these treatments are greatly efficient as the physical recovering treatment after applying the glaze.

Embodiment 35

A fine aggregate (sand) of 45% of fine aggregate and aggregate ratio, by volume of cement, water of 20%, by volume of cement, and 10% by volume of cement of silica fume acting as a potentially hydraulic fine powder were mixed together and then mixed for 5 minutes in a forced mixer to obtain a mortar containing 2 volume % of air and having a slump of 24 cm. The stirred mortar was poured into mold frames. One of the mold box was cylindrical to obtain cylindrical test pieces, each having a dimension of 10 cm diameter and a length of 20 cm, and the other mold flame was square column to obtain test pieces each having a dimension of 10×10×40 cm. The hardened test pieces were released from the mold on the next day. A certain number of the test pieces were subjected to the standard curing in water at 20° C. (S series). The remaining test pieces were subjected to the standard curing for 2 days followed by the secondary curing in warm water at 60° C. for 4 days (D series). Thereafter, the test pieces were again subjected to the standard curing in water at 20° C. The results of measurement of the physical properties are shown in the following Table 49.

TABLE 49

| physical property | mark | 7 days after standard curing | after firing at 850° C. | 7 days after recovering curing | 14 days after recovering curing | condition of curing |
|---|---|---|---|---|---|---|
| bending strength kgf/cm$^2$ | S7-RN | 65 | 48 | 59 | 68 | S7: in water at 20° C.<br>RN: in water at 20° C. |
| | S7-RD | | | 113 | 133 | S7: in warm water at 60° C.<br>RD: in warm water at 60° C. |
| | D7-RN | 169 | 61 | 73 | 138 | D7: in warm water at 60° C.<br>RN: in water at 20° C. |
| | D7-RD | | | 136 | 156 | D7: in warm water at 60° C.<br>RD: in warm water at 60° C. |
| compression g strength kgf/cm$^2$ | S7-RN | 1189 | 895 | 989 | 1039 | S7: in water at 20° C.<br>RN: in water at 20° C. |
| | S7-RD | | | 1087 | 1103 | S7: in warm water at 60° C.<br>RD: in warm water at 60° C. |
| | D7-RN | 1258 | 931 | 1006 | 1098 | D7: in warm water at 60° C.<br>RN: in water at 20° C. |
| | D7-RD | | | 1136 | 1223 | D7: in warm water at 60° C.<br>RD: in warm water at 60° C. |
| modulus of elasticity kgf/cm$^2$ | S7-RN | $4.6 \times 10^5$ | $1.0 \times 10$ | $4.8 \times 10^5$ | $4.8 \times 10^5$ | S7: in water at 20° C.<br>RN: in water at 20° C. |
| | S7-RD | | | $4.9 \times 10^5$ | $5.1 \times 10^5$ | S7: in warm water at 60° C.<br>RD: in warm water at 60° C. |
| | D7-RN | $4.7 \times 10^5$ | $1.1 \times 10$ | $4.1 \times 10^5$ | $4.2 \times 10^5$ | D7: in warm water at 60° C.<br>RN: in water at 20° C. |
| | D7-RD | | | $4.8 \times 10^5$ | $5.1 \times 10^5$ | D7: in warm water at 60° C.<br>RD: in warm water at 60° C. |

The data shown in this table will now be described in detail. In the case of the S series, at a time just after the standard curing, the test pieces had a bending strength of 65 kgf/cm$^2$, a compression strength of 1189 kgf/cm$^2$, and a modulus of elasticity of $4.6\times10^6$ kgf/cm$^2$. After drying and applying a glaze, the test pieces were fired in an electric furnace for 30 minutes at a temperature of 850° C. The temperature was obtained by increasing the temperature at a rate of 400° C. per hour in a time of 120 minutes. After natural cooling, the bending strength of the test pieces had decreased to about 48 kgf/cm$^2$ from 65 kgf/cm$^2$. At this time, the compression strength of the test pieces was 895 Kgf/cm$^2$, and the modulus of elasticity was $1.0\times10^5$ kgf/cm$^2$. When the test pieces made of the fired concrete was cured in warm water at 60° C. for 7 days, the bending strength was recovered to 68 kgf/cm$^2$. When these test pieces were cured in warm water at 60° C. for 7 days the bending strength was recovered to 113 kgf/cm$^2$. When this warm water curing was performed for 14 days, the bending strength was recovered to 138 kgf/cm$^2$, the compression strength was recovered to 1087 kgf/cm$^2$ and the modulus of elasticity was recovered to $5.1\times10^5$ kgf/cm$^2$.

In the case of the D series, after subjecting to the standard curing, the bending strength was 169 kgf/cm$^2$, the compression strength was 1258 kgf/cm$^2$ and the modulus of elasticity was $4.7\times10^5$ kgf/cm$^2$. After drying the test pieces, and applying a glaze thereto, they were fired for 30 minutes at a temperature of 850° C. in an electric furnace. This temperature of 850° C. was obtained by increasing the temperature at a rate of 400° C. per hour. After natural cooling, the bending strength of the test pieces had decreased to about 61 kgf/cm$^2$ from 169 kgf/cm$^2$, and the compression strength was 931 kgf/cm$^2$, while the modulus of elasticity was $1.1\times10^5$ kgf/cm$^2$. After curing for 7 days in water at 20° C., the bending strength of the test pieces made of hardened concrete was 73 kgf/cm$^2$. But when cured for 14 days, the bending strength had been recovered to 138 kgf/cm$^2$. On the other hand, when the fired test pieces were cured in water at 60° C., their bending strength were recovered to 136 kgf/cm$^2$. Furthermore, when these test pieces were subjected to the warm water curing for 14 days, the bending strength was recovered to 136 kgf/cm$^2$, the compression strength was recovered to 1223 kgf/cm$^2$ and the modulus of elasticity was recovered to $5.1\times10^5$ kgf/cm$^2$. We consider that the polymer of silicic acid anions which was once destroyed by a high temperature was recovered by the warm water curing at 60° C. performed after the firing. Since the glaze was applied the mechanical strength has been substantially recovered, according to this invention, a new type of beautiful concrete products can be obtained.

Industrial Applicability

As has been described in detail hereinafter, according to this invention such cement type product as mortar, concrete and paste having high mechanical strength can be obtained without using any reinforcing fiber or the like or if used only a small quantity. Especially, the bending strength, a defective characteristic of these cement type products, can be efficiently improved. As a consequence, a normal cement type products can be obtained at a low cost. Moreover, by coating and firing glazed cement type products, beautiful cement type products having high bending strength, compression strength and modulus of elasticity can be obtained at a low cost. It should be particularly noted that use of the glaze became possible. Heretobefore, the glaze could not be used because it decreases the mechanical strength of the concrete type products.

We claim:

1. A hardened cement body manufactured by a process comprising admixing a mixture consisting essentially of 98 to 80 parts by weight of a cementitious hydraulic powder, 2 to 20 parts by weight of a hydraulic powder precursor selected from the group consisting of silica fume, enameled frit, glass powder, aplite made of silicic acid rock and blast furnace slag, and having an average diameter of less than 3 microns, water and optionally a fine aggregate, to obtain a mortar, the water is added to a resulting mixture of the hydraulic powder precursor and the cementitious hydraulic powder such that a weight ratio of the water to the cementitious hydraulic powder is 0.15 to 0.35, to obtain a molded body, and subjecting the molded body to a two step curing comprising (a) precuring the molded body at a temperature of 20±3° C. for at least one day to form a hydrate of calcium silicate in the molded body and (b) curing at a temperature of 37° C. to less than 100° C. for 1 to 10 days to polymerize silicic acid anions in the calcium silicate hydrate to obtain a trimer or higher polymer, to form a glassy composition in fine pores of said hardened cement body, wherein the silicic acid anions being in an amount of at least 1.3 times greater than that of said hardened cement body and wherein said hardened cement body has a compression strength of at least 1000 kgf/cm$^2$, and a bending strength of at least 150 kgf/cm$^2$.

2. The hardened cement body according to claim 1, wherein when said hardened cement body is caused to slide along with another hardened body or is struck by another hardened body, a metallic impact sound is generated.

3. The hardened cement body according to claim 1, wherein said hardened cement body has a bending strength of at least 200 kgf/cm$^2$.

4. The hardened cement body according to claim 1, wherein said hardened cement body has a compression strength of at least 1100 kgf/cm$^2$.

5. The hardened cement body according to claim 1, wherein said mortar further comprises (i) a powder selected from the group consisting of a metal powder, a metal oxide powder and a metal hydroxide powder, and (ii) a non-metallic fine aggregate.

6. The hardened cement body according to claim 5, wherein the non-metallic fine aggregate is sand.

7. A hardened cement body manufactured by a process comprising admixing a mixture consisting essentially of (i) 98 to 80 parts by weight of a cementitious hydraulic powder, (ii) 2 to 20 parts by weight of a hydraulic powder precursor selected from the group consisting of silica fume, enameled frit, glass powder, aplite made of silicic acid rock and blast furnace slag, and having an average particle diameter of less than 3 microns, (iii) a metal-containing powder selected from the group consisting of a metal powder, a metal oxide powder and a metal hydroxide powder, (iv) water, (v) a non-metallic fine aggregate and (vi) a coarse aggregate, wherein the metal-containing powder is contained in an amount of less than 1% by volume of the cementitious hydraulic powder, the water is in an amount such that the weight ratio of water to the cementitious hydraulic powder is 0.15 to 0.30, to obtain a molded body, and subjecting the molded body to a two step curing comprising (a) precuring the mold body at a temperature of 20±3° C. for at least one day to form a hydrate of calcium silicate in the molded body and (b) curing at a temperature of 37° C. to less than 100° C. for 1 to 10 days to polymerize silicic acid anions in the calcium silicate hydrate to obtain a trimer or higher polymer, to form a glassy composition in fine pores of said hardened cement body, wherein said hardened cement body has a compression strength of at least 1000 kgf/cm$^2$, and a bending strength of at least 150 kgf/cm$^2$.

8. The hardened cement body according to claim 7, wherein said cement body has a compression strength of at least 1100 kgf/cm$^2$.

9. The hardened cement body according to claim 8, wherein said hardened cement body has a bending strength of at least 200 kgf/cm$^2$ after 4 weeks.

10. The hardened cement body according to claim 7, wherein said hardened cement body has a compression strength of 1300 to 1600 kgf/cm$^2$ after 1 to 4 weeks, and a bending strength of 180 to 265 kgf/cm$^2$ after 1 to 4 weeks.

11. A hardened cement body manufactured by a process comprising admixing a mixture consisting essentially of a cement powder, a coarse aggregate, a fine aggregate, a hydraulic powder precursor selected from the group consisting of silica fume, enameled frit, glass powder, aplite made of silicic acid rock and blast furnace slag, and optionally a powder selected from the group consisting of a metal powder, a metal oxide powder, and a metal hydroxide powder, and water to obtain a mortar, and carrying out a two step curing comprising a first curing at a temperature of 20±3° C. for at least one day and a second curing at a temperature of 37° C. to less than 100° C. for 1 to 10 days, wherein crystals of calcium silicate hydrate are formed in air voids formed in said hardened cement body, said hardened cement body having a compression strength of at least 950 kgf/cm$^2$ and a bending strength of at least 120 kgf/cm$^2$.

12. The hardened cement body according to claim 11, wherein said mixture includes a powder selected from the group consisting of a metal powder, a metal oxide powder and a metal hydroxide powder.

13. In a mold frame made from a hardened cement body, wherein the hardened cement body is produced by a process comprising admixing a mixture consisting essentially of a cement powder, either one or both of a mixing agent and an aggregate, a hydraulic powder precursor selected from the group consisting of silica fume, enameled frit, glass powder, aplite made of silicic acid rock and blast furnace slag, water, and optionally a powder selected from the group consisting of a metal powder, a metal oxide powder and a metal hydroxide powder, molding said admixed mixture to obtain a molded body, and carrying out a two step curing comprising a first curing at a temperature of 20±3° C. for at least one day and a second curing at a temperature of 37° C. to less than 100° C. for 1 to 10 days, wherein crystals of calcium silicate hydrate are formed in air voids in said molded body said hardened cement body having a thickness of 3 to 35 mm, and a bending strength of at least 200 kgf/cm$^2$.

14. The mold frame according to claim 13, wherein said mixture includes a powder selected from the group consisting of a metal powder, a metal oxide powder and a metal hydroxide powder.

15. A method of manufacturing a hardened cement body consisting essentially of:

(a) adding 2 to 20 parts by weight of a hydraulic precursor powder selected from the group consisting of silica fume, enameled frit, glass powder, aplite made of silicic acid rock and blast furnace slag, and having an average diameter of less than 3 microns, to 98 to 80 parts by weight of a cementitious hydraulic powder and mixing to obtain a mixture;

(b) adding water and optionally a fine aggregate to the mixture from step (a) such that a weight ratio of the water and the cementitious hydraulic powder is 0.15 to 0.30;

(c) admixing the resultant mixture from step (b) to obtain a molded and hardened cement body containing calcium silicate hydrate;

(d) subjecting said molded and hardened cement body from step (c) to a first step of a two step curing at a temperature of 20±3° C. for at least one day and in the presence of steam for more than 3 hours to form silicic acid anions in the calcium silicate hydrate formed in said hardened cement body to form a cured hardened cement body; and (e) subjecting said cured hardened cement body from step (d) to a second step of a two step curing at a temperature of 37° C. to less than 100° C. in the presence of added water or steam for 1 to 10 days to dehydrate and polymerize said silicic acid anions.

16. The method of manufacturing a hardened cement body according to claim 15, wherein said second curing step is carried out 1 to 3 days after said first curing.

17. The method of manufacturing a hardened cement body according to claim 15, wherein said second curing is carried out 1 to 3 days after said first curing step and after coagulation of said cementitious hydraulic powder in a mold box is finished.

18. The method of manufacturing a hardened cement body according to claim 15, wherein at least one powder selected from the group consisting of a metal powder, a metal oxide powder and a metal hydroxide powder is added to said mixture in step (c).

19. The method of manufacturing a hardened cement body according to claim 18, wherein said at least one powder is in an amount of less than 1 volume % of the cementitious hydraulic powder.

20. The method of manufacturing a hardened cement body according to claim 15, wherein resulting mixture from step (b) is admixed in a mixer and maintained for 1 or 2 hours, and then admixed again to obtain the molded and hardened cement body.

21. A method of manufacturing a hardened cement body consisting essentially of (a) mixing sand to water to obtain a first mixture;

(b) mixing 2 to 20 parts by weight of a hydraulic precursor powder selected from the group consisting of silica fume, enameled frit, glass powder, aplite made of silicic acid rock and blast furnace slag, and having an average diameter of less than 3 microns, to 98 to 80 parts by weight of a cementitious hydraulic powder to obtain a second mixture and adding said second mixture to the said first mixture, wherein a ratio of the water to the cementitious hydraulic powder is 0.15 to 0.28 and a ratio of the sand to the cementitious hydraulic powder is 1 to 2;

(c) admixing the resultant mixture from step (b) to obtain a molded and hardened cement body containing calcium silicate hydrate;

(d) subjecting said molded and hardened cement body from step (c) to a first step of a two step curing at a temperature of 20±3° C. in the presence of steam for more than 3 hours to form silicic acid anions in the calcium silicate hydrate formed in said hardened cement body to form a cured hardened cement body; and (e) subjecting said cured hardened cement body from step (d) to a second step of a two step curing at a temperature of 37 to less than 100° C. in the presence of added water or steam for 1 to 10 days to dehydrate and polymerize said silicic acid anions.

22. The method of manufacturing a hardened cement body according to claim 15, wherein the second step of the two step curing is carried out in the presence of added warm water at a temperature of 50 to 65° C. for 7 to 10 days.

23. The method of manufacturing a hardened cement body according to claim 21, wherein the second step of the two step curing is carried out in the presence of added warm water at a temperature of 50 to 65° C. for 7 to 10 days.

* * * * *